(12) United States Patent
Sakai

(10) Patent No.: US 7,471,644 B2
(45) Date of Patent: Dec. 30, 2008

(54) INFORMATION PROCESSING APPARATUS AND METHOD, RECORDING MEDIUM, AND PROGRAM

(75) Inventor: Yusuke Sakai, Kanagawa (JP)

(73) Assignee: Sony Corporation (JP)

( * ) Notice: Subject to any disclaimer, the term of this patent is extended or adjusted under 35 U.S.C. 154(b) by 590 days.

(21) Appl. No.: 11/272,899

(22) Filed: Nov. 14, 2005

(65) Prior Publication Data
US 2006/0135114 A1    Jun. 22, 2006

(30) Foreign Application Priority Data
Nov. 16, 2004  (JP) ................. P2004-331870

(51) Int. Cl.
*H04L 12/28* (2006.01)
(52) U.S. Cl. ............... 370/254; 370/395.41; 455/412.2; 455/456.1
(58) Field of Classification Search ................. 370/254, 370/395.41, 395.42; 455/412.2, 456.1
See application file for complete search history.

(56) References Cited

U.S. PATENT DOCUMENTS

2003/0004644 A1 * 1/2003 Farmer ..................... 701/301

2004/0180672 A1 * 9/2004 Hirano et al. ............ 455/456.1

FOREIGN PATENT DOCUMENTS

| JP | 2001-154966 A | 6/2001 |
| JP | 2001-160154 A | 6/2001 |

* cited by examiner

*Primary Examiner*—Chirag G Shah
*Assistant Examiner*—Salvador E Rivas
(74) *Attorney, Agent, or Firm*—Lerner, David, Littenberg, Krumholz & Mentlik, LLP

(57) ABSTRACT

An information processing apparatus communicates through a network. The apparatus includes an updating decision section, a notification information production section, an output controller, a receiver, and an operation controller. The updating decision section decides whether at least one of a plurality of connection priority degrees between a different information processing apparatus and opposite parties of communication including the information processing apparatus has been updated. The notification information production section produces notification information to be used for notification of the connection priority degree between the different information processing apparatus and the information processing apparatus. The output controller controls the output of the notification information produced by the notification information production section. The receiver receives data from the different information processing apparatus. The operation controller controls execution of control corresponding to the received data based on the connection priority degree.

9 Claims, 27 Drawing Sheets

| NODE NAME | CONNECTION PRIORITY DEGREE | ORDER NUMBER | POSITION |
|---|---|---|---|
| B | 100 | 1 | ... |
| N | 65 | 2 | ... |
| ... | ... | ... | ... |

FIG. 8
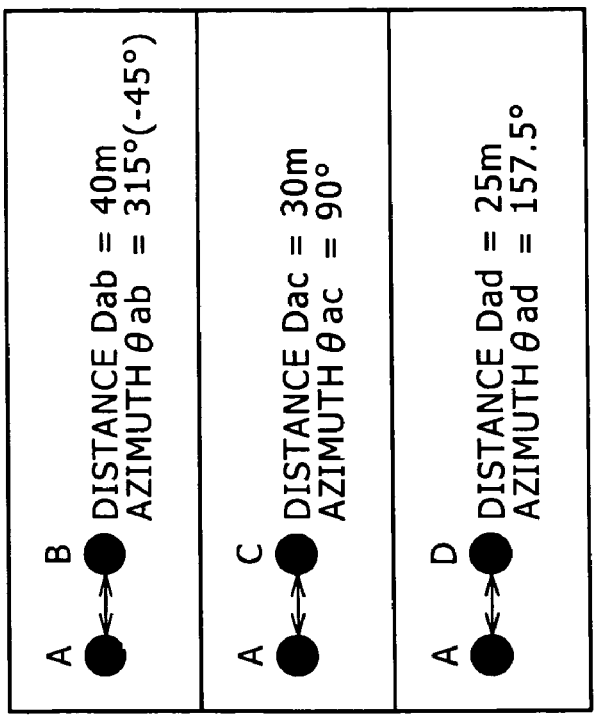
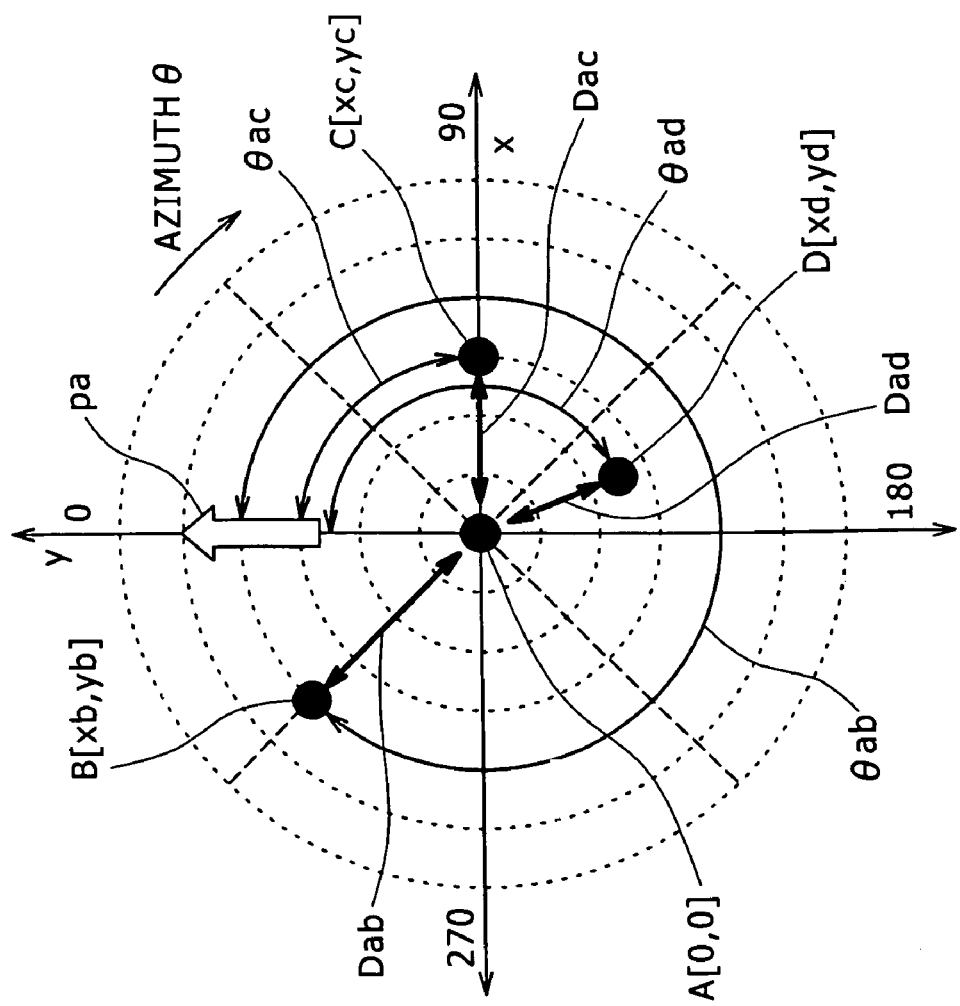

FIG. 11

| NODE NAME | CONNECTION PRIORITY DEGREE | ORDER NUMBER | POSITION | DIRECTION | ADDRESS | DIRECTIONAL FILTER INDEX | CONNECTION ESTABLISHMENT INDEX |
|---|---|---|---|---|---|---|---|
| B | 100 | 2 | [xb,yb,zb] | $(\theta_B, \Phi_B)$ | xx-xx-xx- | $f_B(\theta,\Phi)$ | 45 |
| C | 65 | 3 | [xc,yc,zc] | $(\theta_C, \Phi_C)$ | 090-xxxx | $f_C(\theta,\Phi)$ | 21 |
| N | 123 | 1 | [xn,yn,zn] | $(\theta_N, \Phi_N)$ | x.xx.x.xx | $f_N(\theta,\Phi)$ | 70 |
| ... | ... | ... | ... | ... | | ... | ... |

INFORMATION PROCESSING APPARATUS AND METHOD, RECORDING MEDIUM, AND PROGRAM

CROSS-REFERENCE TO RELATED APPLICATIONS

The present application claims priority from Japanese Patent Application No. JP 2004-331870 filed on Nov. 16, 2004, the disclosure of which is hereby incorporated by reference herein.

BACKGROUND OF THE INVENTION

This invention relates to an information processing method and apparatus, a recording medium, and a program, and more particularly to an information processing method and apparatus, a recording medium, and a program that the communication balance between a plurality of nodes can be controlled optimally based on connection priority degrees calculated from positions, directions, and directionalities between the nodes in communication.

Various methods are known that a plurality of users communicate with each other, and one of such methods uses a virtual spade. According to the method, a user can access a server through a network and use a common virtual space provided by the server to communicate with other users on the real-time basis. In the virtual space, the user sets the other self thereof called avatar such that such users chat with each other through the respective avatars.

For example, Japanese Patent Laid-open No. 2001-160154 discloses a display apparatus which displays avatars where a plurality of users share a virtual space such that, when one of the users moves, a corresponding avatar moves in response to position information, direction information, and so forth of the user. Meanwhile, Japanese Patent Laid-open No. 2001-154966 discloses a system in which an avatar in a virtual space uses a virtual portable telephone set to transmit or receive a message to or from another avatar who is in an another virtual space or another user who is in an actual space.

Incidentally, not only a communication system in related art that such a virtual space as described above is used to perform communication with a plurality of nodes but also another communication system in related art that an actual space is used for communication with a plurality of nodes have a problem in that, as the number of nodes used for communication increases, simultaneous establishment of circuits between a plurality of nodes becomes difficult from a limitation to communication channels.

As a countermeasure for the problem, methods are available that the communication balance is controlled by limiting those nodes from which information can be transmitted within a certain time zone through the same communication network. As one of such methods, for example, a PTT (Push to Talk) controlling method for controlling communication with a plurality of transceiver terminals is available.

Also another method is available that circuits between a plurality of nodes are established simultaneously like sound chat software by which a VoIP (Voice over IP) function or the like is used to perform communication with a plurality of persons through a network.

However, the former method has a subject to be solved in that it is difficult to originate information to a plurality of nodes at a time because a fault occurs if a plurality of nodes transmit information within the same time.

Meanwhile, the latter method has a subject in that, as the number of nodes increases, sound information of such nodes becomes liable to interfere with each other, which makes optimum communication difficult. It is to be noted that, even if such interference can be eliminated by adjusting the sound balance between the node circuits or the like, complicated operation is required in order to adjust the sound balance in response to a situation of communication which varies every moment. Therefore, the latter method has another subject in that such adjustment of the sound balance is difficult.

Such problems as described above occur not only with communication between such a plurality of nodes owned by a user as described above but also with communication between a remote controller terminal of the user and controlled apparatus such as, for example, a television receiver, a stereo apparatus, an illumination apparatus, an automatic door, and an air conditioner in a home.

In particular, it is difficult to achieve origination of a plurality of control signals for controlling a plurality of controlled apparatus simultaneously from a single remote control terminal. Even if a plurality of control signals are originated, it is difficult to change the ratio of control and besides it is not clear which apparatus receive the control signals. Further, even if it is tried to control a single controlled apparatus at a time using a plurality of remote controller terminals conversely, the controlled apparatus accepts only one of the control signals and besides it is not known to the user which one of the control signals is accepted by the controlled apparatus. Therefore, such systems as just described are difficult to handle and cannot be implemented readily.

From the foregoing, there is a subject that it is difficult to implement communication between a plurality of remote controller terminals and a plurality of controlled apparatus. This gives rise to another subject that the user must properly use a plurality of remote controller terminals for a plurality of respective controlled apparatus and operate the remote controller terminals separately for the individual controlled apparatus.

It is desirable to provide an information processing method and apparatus, a recording medium and a program in which a plurality of circuits can be established at a time among a plurality of nodes and the communication balance between the nodes can be controlled optimally by simple and natural operation.

SUMMARY OF THE INVENTION

According to an embodiment of the present invention, an information processing apparatus which communicates through a network includes updating decision means for deciding whether at least one of a plurality of connection priority degrees between a different information processing apparatus and opposite parties of communication which share a predetermined space and communicate with each other has been updated, the opposite parties of communication including the information processing apparatus, the plurality of connection priority degrees being calculated based on characteristic information including position information and direction information of the different information processing apparatus and the opposite parties of communication relative to each other, connection request degree information representative of a degree of a connection request to each of the opposite parties of communication, and directional information representative of degrees of a connection request for individual azimuths; notification information production means for producing notification information when it is decided by the updating decision means that at least one of the plurality of connection priority degrees between the different information processing apparatus and the opposite parties of communication has been updated, the notification information to be used for notification of the connection priority degree between the different information processing apparatus and the information processing apparatus from among the plurality of connection priority degrees; output control means for controlling the output of the notification information; receiver means for receiving data from the different information processing apparatus; and operation control means for controlling the execution of control corresponding to the received data based on the connection priority degree between the different information processing apparatus and the information processing apparatus.

According to another embodiment of the present invention, an information processing method for an information processing apparatus which communicates through a network includes deciding whether at least one of a plurality of connection priority degrees between a different information processing apparatus and opposite parties of communication which share a predetermined space and communicate with each other has been updated, the opposite parties of communication including the information processing apparatus, the plurality of connection priority degrees being calculated based on characteristic information including position information and direction information of the different information processing apparatus and the opposite parties of communication relative to each other, connection request degree information representative of a degree of a connection request to each of the opposite parties of communication, and directional information representative of degrees of a connection request for individual azimuths; producing notification information when it is decided that at least one of the plurality of connection priority degrees between the different information processing apparatus and the opposite parties of communication has been updated, the notification information to be used for notification of the connection priority degree between the different information processing apparatus and the information processing apparatus from among the plurality of connection priority degrees; controlling the output of the notification information; receiving data from the different information processing apparatus; and controlling the execution of control corresponding to the received data based on the connection priority degree between the different information processing apparatus and the information processing apparatus.

According to a further embodiment of the present invention, a recording medium is recorded with a program for causing an information processing apparatus to execute a process of communicating through a network. The process includes deciding whether at least one of a plurality of connection priority degrees between a different information processing apparatus and opposite parties of communication which share a predetermined space and communicate with each other has been updated, the opposite parties of communication including the information processing apparatus, the plurality of connection priority degrees being calculated based on characteristic information including position information and direction information of the different information processing apparatus and the opposite parties of communication relative to each other, connection request degree information representative of a degree of a connection request to each of the opposite parties of communication, and directional information representative of degrees of a connection request for individual azimuths; producing notification information when it is decided that at least one of the plurality of connection priority degrees between the different information processing apparatus and the opposite parties of communication has been updated, the notification information to be used for notification of the connection priority degree between the different information processing apparatus and the information processing apparatus from among the plurality of connection priority degrees; controlling the output of the notification information; receiving data from the different information processing apparatus; and controlling the execution of control corresponding to the received data based on the connection priority degree between the different information processing apparatus and the information processing apparatus.

According to a still further embodiment of the present invention, a system is provided for communicating through a network. The system includes an information processing apparatus operable to execute instructions; and instructions for executing a process of communicating through the network, the instructions including deciding whether at least one of a plurality of connection priority degrees between a different information processing apparatus and opposite parties of communication which share a predetermined space and communicate with each other has been updated, the opposite parties of communication including the information processing apparatus, the plurality of connection priority degrees being calculated based on characteristic information including position information and direction information of the different information processing apparatus and the opposite parties of communication relative to each other, connection request degree information representative of a degree of a connection request to each of the opposite parties of communication, and directional information representative of degrees of a connection request for individual azimuths; producing notification information when it is decided that at least one of the plurality of connection priority degrees between the different information processing apparatus and the opposite parties of communication has been updated, the notification information to be used for notification of the connection priority degree between the different information processing apparatus and the information processing apparatus from among the plurality of connection priority degrees; controlling the output of the notification information; receiving data from the different information processing apparatus; and controlling the execution of control corresponding to the received data based on the connection priority degree between the different information processing apparatus and the information processing apparatus.

According to a still further embodiment of the present invention, an information processing apparatus communicates through a network. The apparatus includes an updating decision section operable to decide whether at least one of a plurality of connection priority degrees between a different information processing apparatus and opposite parties of communication which share a predetermined space and communicate with each other has been updated, the opposite parties of communication including the information processing apparatus, the plurality of connection priority degrees being calculated based on characteristic information including position information and direction information of the different information processing apparatus and the opposite parties of communication relative to each other, connection request degree information representative of a degree of a connection request to each of the opposite parties of communication, and directional information representative of degrees of a connection request for individual azimuths; a notification information production section operable to produce notification information when it is decided by the updating decision section that at least one of the plurality of connection priority degrees between the different information processing apparatus and the opposite parties of communication has been updated, the notification information to be used for notification of the connection priority degree between the different information processing apparatus and the information processing apparatus from among the plurality of connection priority degrees; an output controller operable to control the output of the notification information; a receiver operable to receive data from the different information processing apparatus; and an operation controller operable to control execution of control corresponding to the received data based on the connection priority degree between the different information processing apparatus and the information processing apparatus.

In the information processing apparatus and method, recording medium, and system, it is decided whether at least one of a plurality of connection priority degrees between a different information processing apparatus and opposite parties of communication including the information processing apparatus which share a predetermined space and communicate with each other has been updated. The plurality of connection priority degrees are calculated based on characteristic information including position information and direction information of the different information processing apparatus and the opposite parties of communication relative to each other, connection request degree information representative of a degree of a connection request to each of the opposite parties of communication, and directional information representative of degrees of a connection request for individual azimuths. Then, when it is decided that at least one of the plurality of connection priority degrees between the different information processing apparatus and the opposite parties of communication has been updated, notification information is produced, the notification information to be used for notification of the connection priority degree between the different information processing apparatus and the information processing apparatus from among the plurality of connection priority degrees. Then, the output of the produced notification information is controlled. Further, data are received from the different information processing apparatus, and execution of control corresponding to the received data is controlled based on the connection priority degree between the different information processing apparatus and the information processing apparatus.

The network is a mechanism which includes at least two apparatus connected to each other such that information can be transmitted from one to another one of the apparatus. The apparatus which communicate with each other through the network may be apparatus which are independent of each other or internal blocks which construct one apparatus.

Meanwhile, the communication may be radio communication or wire communication, or communication which includes both of radio communication and wire communication such that radio communication is used within a certain section while wire communication is used within another section. Further, wire communication may be used for communication from a first apparatus to a second apparatus whereas radio communication is used for communication from the second apparatus to the first apparatus.

BRIEF DESCRIPTION OF THE DRAWINGS

FIG. 8 is a diagrammatic view illustrating another example of a reference space coordinate system of the node;

FIG. 11 is a view illustrating another example of the connection priority degree list;

DETAILED DESCRIPTION

Before preferred embodiments of the present invention are described in detail, a corresponding relationship between several features recited in the accompanying claims and particular elements of the preferred embodiment described below is described. It is to be noted, however, that, even if some mode for carrying out the invention which is recited in the specification is not described in the description of the corresponding relationship below, this does not signify that the mode for carrying out the invention is out of the scope or spirit of the present invention. On the contrary, even if some mode for carrying out the invention is described as being within the scope or spirit of the present invention in the description of the corresponding relationship below, this does not signify that the mode is not within the spirit or scope of some other invention than the present invention.

Further, the following description does not signify all of the invention disclosed in the present specification. In other words, the following description does not deny the presence of an invention which is disclosed in the specification but is not recited in the claims of the present application, that is, the description does not deny the presence of an invention which may be filed for patent in a divisional patent application or may be additionally included into the present patent application as a result of later amendment.

Figure 19:
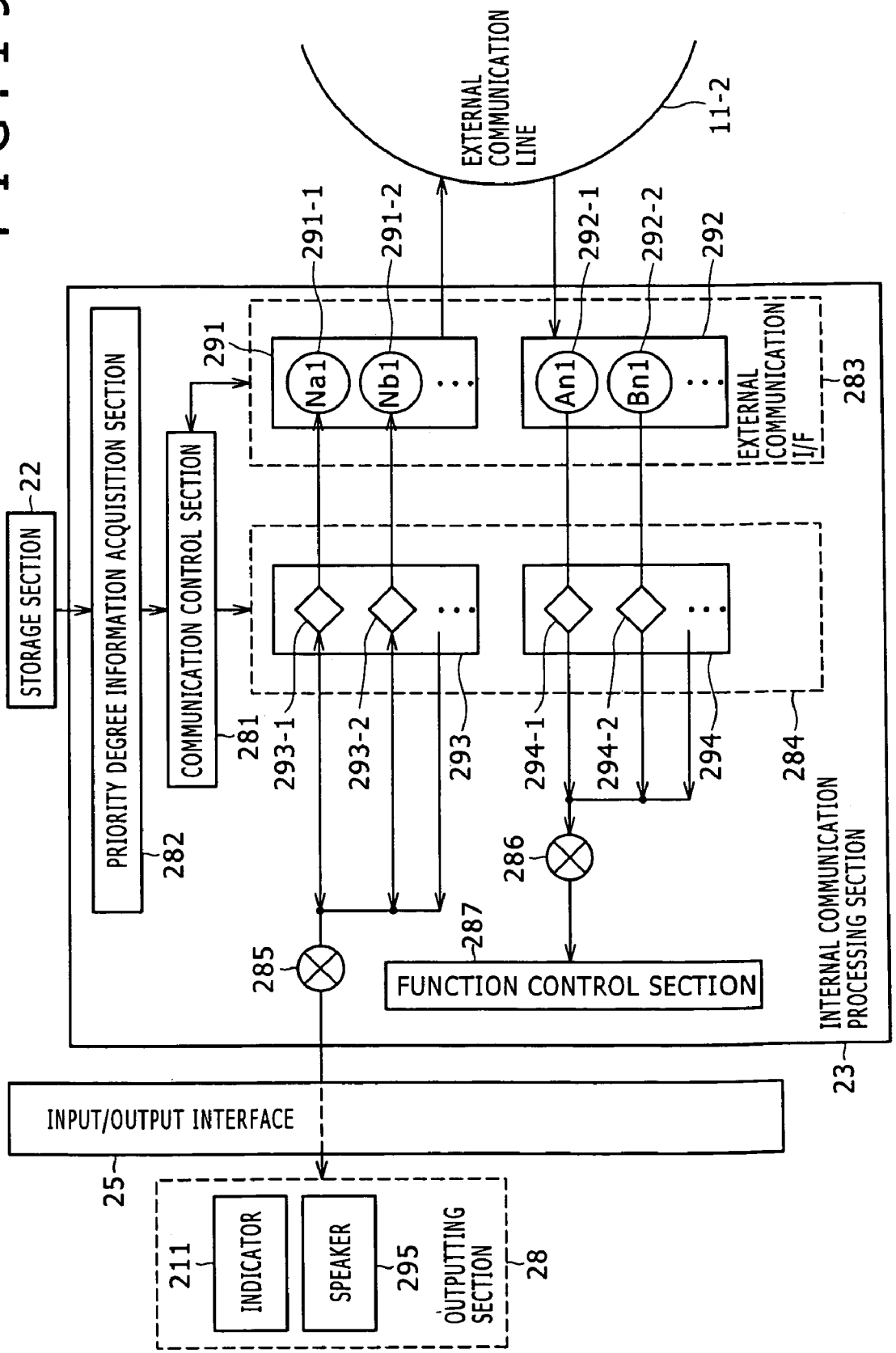
FIG. 19 is a block diagram showing an example of a detailed configuration of an internal communication processing section of a controlled terminal of FIG. 16.

According to an embodiment of the invention, an information processing apparatus (for example, a controlled terminal 202-1 of FIG. 16) includes updating decision means (for example, a priority degree information acquisition section 282 of FIG. 19) for deciding whether or not any of connection priority degrees (for example, a connection priority degree list of FIG. 11) between a different information processing apparatus (for example, a controlling terminal 201 of FIG. 16) and opposite parties of communication (for example, controlled terminals 202-1 to 202-6 of FIG. 16) which share a predetermined space (for example, a room internal space of FIG. 16) and communicate with each other is updated, the opposite parties of communication including the information processing apparatus, the connection priority degrees being calculated based on characteristic information including position information and direction information of the different information processing apparatus and the opposite parties of communication relative to each other, connection request degree information representative of a degree of a connection request to each of the opposite parties of communication, and directional information representative of degrees of a connection request for individual azimuths, a notification information production means (for example, a presentation information production section 293 of FIG. 19) for producing, when it is decided by the updating decision means that any of the connection priority degrees between the different information processing apparatus and the opposite parties of communication is updated, notification information to be used for notification of the connection priority degree between the different information processing apparatus and the information processing apparatus from among the connection priority degrees between the different information processing apparatus and the opposite parties of communication, output control means (for example, a mixer 285 of FIG. 19) for controlling outputting of the notification information (for example, notification information 321 of FIG. 21) produced by the notification information production means, receiver means (for example, a data receiver section 292 of FIG. 19) for receiving data from the different information processing apparatus, and operation control means (for example, a control information adjustment section 294 of FIG. 19) for controlling execution of control corresponding to the data received by the receiver means based on the connection priority degree between the different information processing apparatus and the information processing apparatus.

The information processing apparatus (for example, a controlling terminal 202-1 of FIG. 21) is configured such that the operation control means controls the control corresponding to the data received by the receiver means to be executed at a rate according to the connection priority degree between the different information processing apparatus and the information processing apparatus.

The information processing apparatus (for example, a controlled terminal 201-1 of FIG. 20) further includes comparison decision means (for example, a communication control section 281 of FIG. 19) for deciding whether or not the connection priority degree between the different information processing apparatus and the information processing apparatus is highest among the connection priority degrees between the different information processing apparatus and the other parties of communication. When the comparison decision means decides that the connection priority degree between the different information processing apparatus and the information processing apparatus is not highest among the connection priority degrees between the different information processing apparatus and the other parties of communication, the control of the production of the notification information by the notification information production means and the execution of the control by the operation control means are inhibited.

The information processing apparatus (for example, a controlling terminal 201-1 of FIG. 22) is configured such that the output control means controls an output of an indicator (for example, an indicator 211-1 of FIG. 22), and where a plurality of different information processing apparatus communicate with the opposite parties of communication, when the updating decision means decides that any of the connection priority degrees between the plural different information processing apparatus and the other parties of communication is updated, the notification information production means produces the notification information so that the notification information is outputted divisionally in different colors or in different directions according to the connection priority degrees between the plural different information processing apparatus and the information processing apparatus from the indicator.

The information processing apparatus further includes sender means (for example, a data sender section 291 of FIG. 19) for transmitting the notification information by the notification information production means to the different information processing apparatus.

Figure 25:
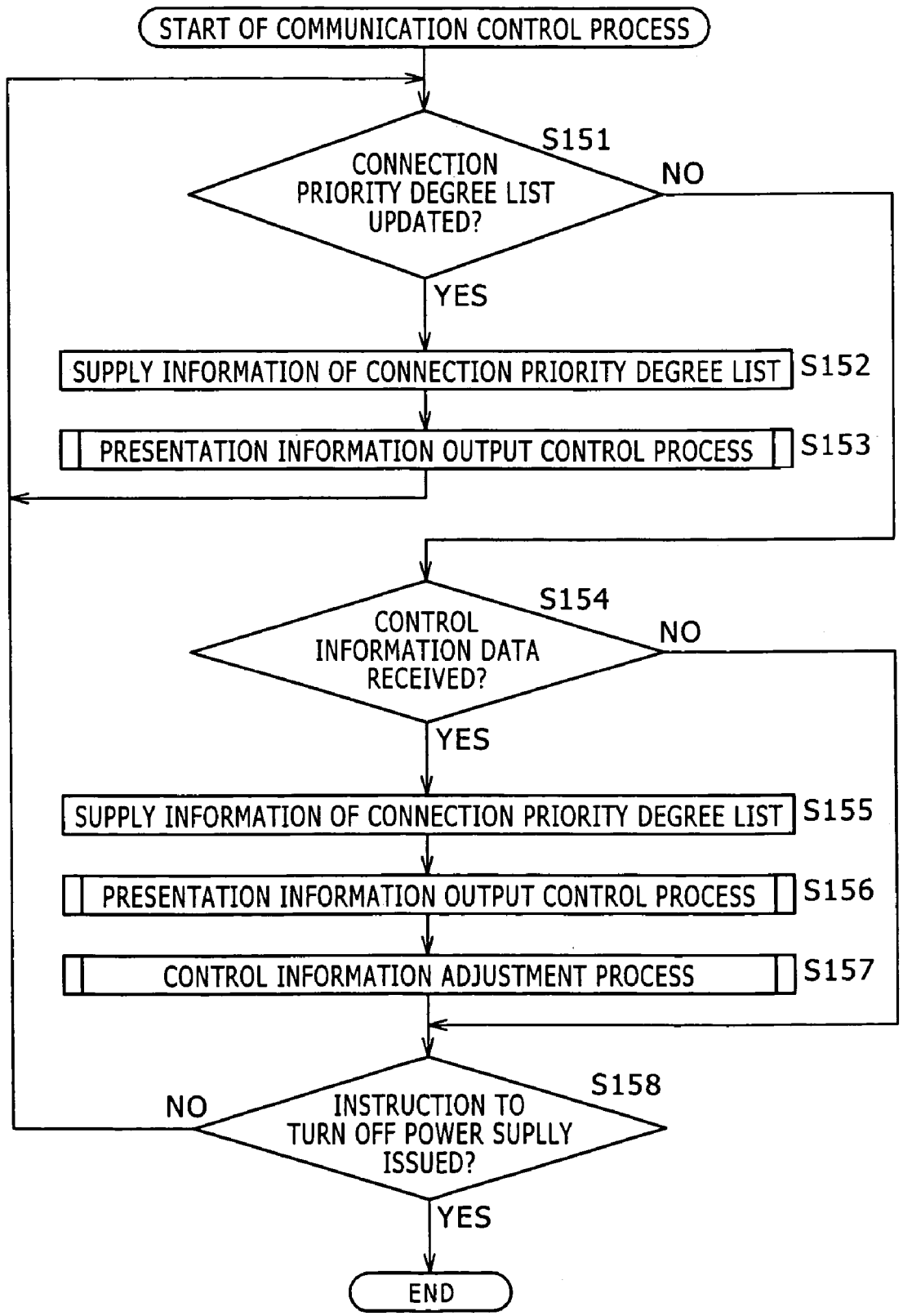
FIG. 25 is a flow chart illustrating a communication control process of the controlled terminal of FIG. 16.
Figure 26:
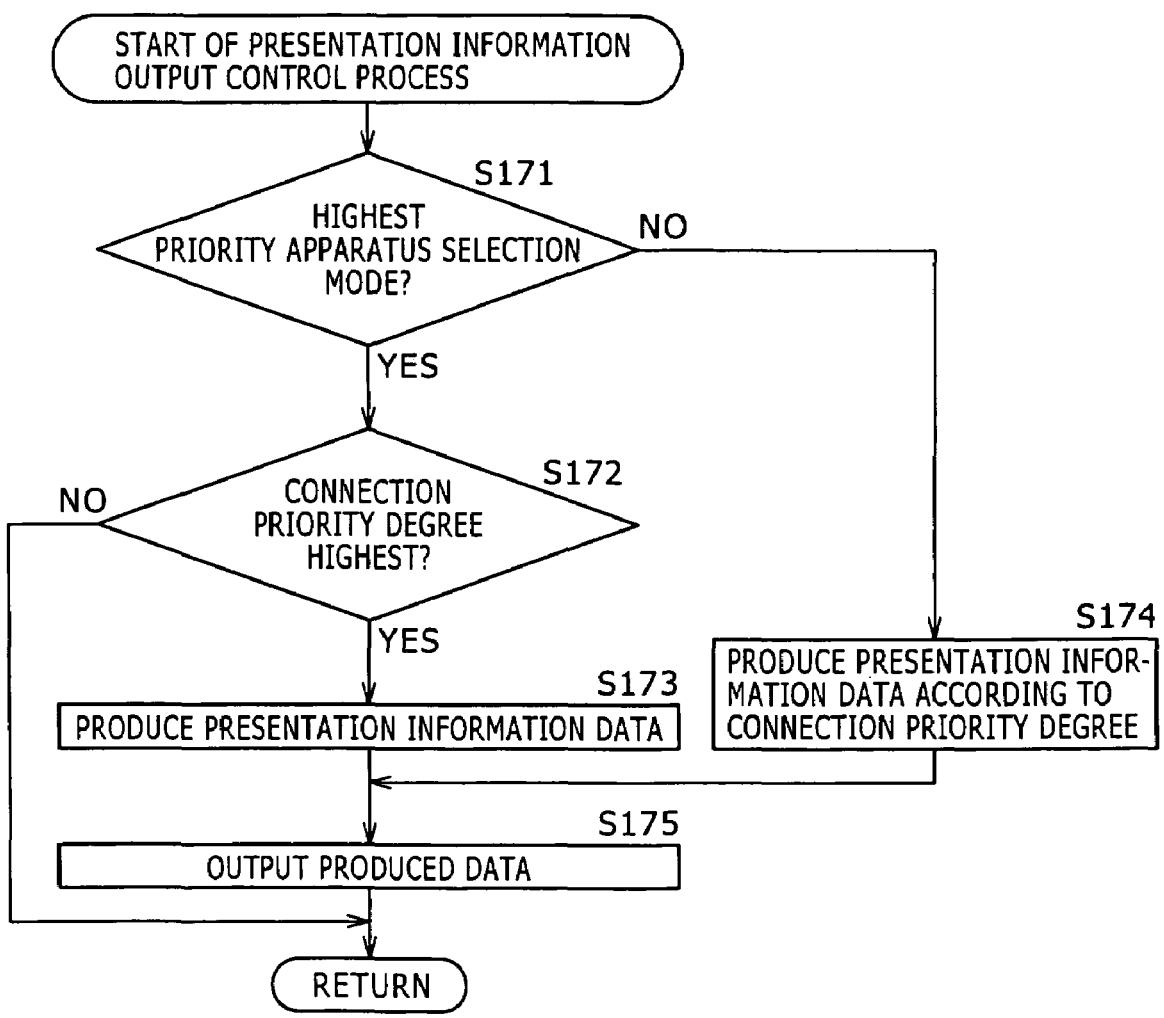
FIG. 26 is a flow chart illustrating a presentation information output control process in the communication control process of FIG. 25.

According to an embodiment of the invention, an information processing method for an information processing apparatus which communicates through a network, includes the steps of deciding whether or not any of connection priority degrees between a different information processing apparatus and opposite parties of communication which share a predetermined space and communicate with each other is updated, the opposite parties of communication including the information processing apparatus (for example, a step S151 of FIG. 25), the connection priority degrees being calculated based on characteristic information including position information and direction information of the different information processing apparatus and the opposite parties of communication relative to each other, connection request degree information representative of a degree of a connection request to each of the opposite parties of communication, and directional information representative of degrees of a connection request for individual azimuths, producing, when it is decided by the process at the updating decision step that any of the connection priority degrees between the different information processing apparatus and the opposite parties of communication is updated, notification information to be used for notification of the connection priority degree between the different information processing apparatus and the information processing apparatus from among the connection priority degrees between the different information processing apparatus and the opposite parties of communication (for example, a step S173 of FIG. 26), controlling outputting of the notification information produced by the process at the notification information production step (for example, a step S174 of FIG. 26), receiving data from the different information processing apparatus (for example, a step S154 of FIG. 25), and controlling execution of control corresponding to the data received by the process at the receiver step based on the connection priority degree between the different information processing apparatus and the information processing apparatus (for example, a step S157 of FIG. 25).

It is to be noted that also a recording medium and a program have a configuration basically similar to the information processing method described above, and therefore, description of them is omitted herein to avoid redundancy.

In the following, a preferred embodiment of the present invention is described in detail with reference to the accompanying drawings.

Figure 1:
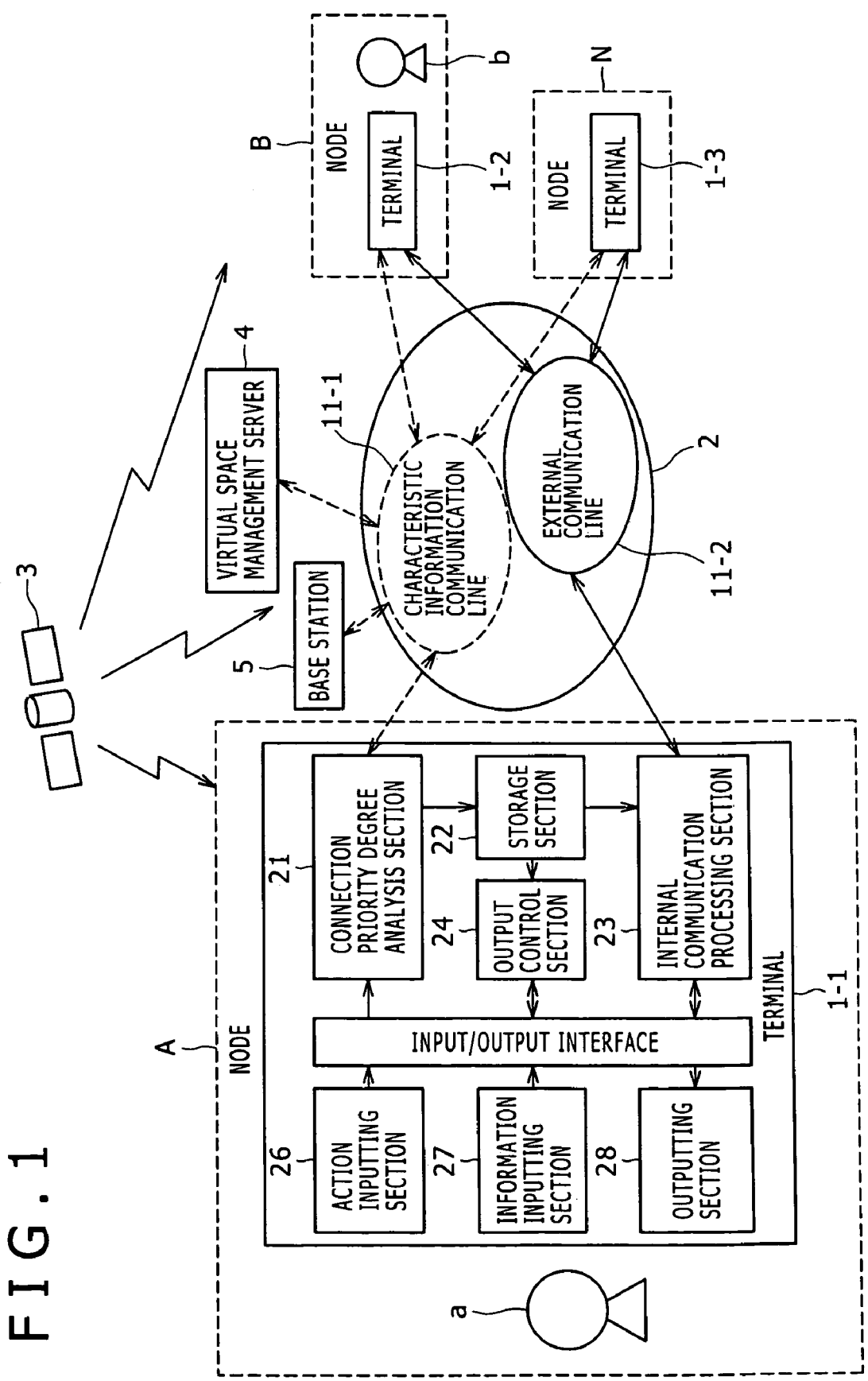
FIG. 1 is a block diagram showing an example of a configuration of a communication system according to an embodiment of the present invention.

Referring first to FIG. 1, there is shown an example of a configuration of a communication system to which the present invention is applied.

The communication system shown includes a plurality of terminals 1 (in the system of FIG. 1, terminals 1-1, 1-2, and 1-3), a network 2, GPS (Global Positioning System) satellites 3, a virtual space management server 4, and a base station 5. In the communication system, when the terminal 1-1 tries to communicate with a plurality of terminals 1 (in the system of FIG. 1, terminals 1-2 and 1-3) with which the terminal 1-1 shares a predetermined space (an actual space or a virtual space) at a time through the network 2 it acquires information of the terminal 1-1 itself and the opposite parties of the communication from the terminals 1 of the opposite parties, GPS satellites 3, virtual space management server 4, base station 5 or the like. Then, the terminal 1-1 controls the communication balance among the terminals 1 in response to communication priority degrees of the terminals 1 calculated based on the acquired information to perform the communication with the terminals 1 optimally. It is to be noted that, in the following description, where there is no necessity to distinguish the terminals 1-1 to 1-3 individually, each of them is referred to generally as terminal 1.

In the communication system of FIG. 1, the terminal 1-1 operated by a user "a", terminal 1-2 operated by another user "b", and terminal 1-3 (not operated by any user) are connected to the network 2 represented by the Internet. It is to be noted that, in the following description, the user "a" and the terminal 1-1 are generally referred to as node A, and the user "b" and the terminal 1-2 are generally referred to as node B while the terminal 1-3 is referred to as node N. While only three terminals 1 are shown in the communication system of FIG. 1, actually an arbitrary number of terminals 1 are connected to the network 2.

The virtual space management server 4 connected to the network 2 manages and provides a virtual space to be displayed as a CG (Computer Graphic) image on the screen of the terminal 1, position information and direction information of a mascot (avatar) as a symbol of a user in the virtual space, and other necessary information. Also the base station 5 is connected which detects the position of the terminal 1 through a radio IC tag (RFID (Radio Frequency Identification) tag not shown which is embedded in the terminal 1 and provides position information according to a local positioning system (Local Positioning System) or the like. An arbitrary number of virtual space management servers 4 and base stations 5 are connected to the network 2.

The network 2 is formed from a characteristic information communication line 11-1 which is a communication path by which characteristic information of the terminals 1 is communicated between the terminals 1 or between a terminal 1 and the virtual space management server 4 or base station 5, and an external communication line 11-2 which is a communication path by which various data are communicated between the terminals 1. While the network 2 in the communication system of FIG. 1 is shown as the two paths for the convenience of illustration, not only characteristic information but also various data are communicated actually by a single communication path.

It is to be noted that the network 2 may be a wire network which makes use of, for example, the Ethernet (registered trademark) or an IEEE (Institute of Electrical and Electronic Engineers) 1349 network or a radio network which makes use of, for example, the IEEE 802.1a, IEEE 802.11b, or IEEE 802.11g standard.

The terminal 1-1 is formed from a personal computer or the like. The terminal 1-1 includes a connection priority degree analysis section 21, an internal communication processing section 23, and an output control section 24 which are connected through an input/output interface 25 to an action inputting section 26, an information inputting section 27, and an outputting section 28 which are suitably connected to the input/output interface 25.

In particular, information from the action inputting section 26 or the information inputting section 27 is inputted to the connection priority degree analysis section 21, internal communication processing section 23, or output control section 24 through the input/output interface 25. Further, information from the internal communication processing section 23 or the output control section 24 is outputted to the outputting section 28 through the input/output interface 25.

The connection priority degree analysis section 21 has a GPS function or a radio IC tag (not shown) incorporated therein so that it acquires position information through GPS satellites 3 or the base station 5 and stores the position information. It is to be noted that, where the GPS function is used, the connection priority degree analysis section 21 receives signals (radio waves) signaled from the GPS satellites 3 to the earth, analyzes the signals, and calculates the receiver position (latitude and longitude or the like). Further, the connection priority degree analysis section 21 stores also direction information of the node A inputted from the action inputting section 26.

When the connection priority degree analysis section 21 tries to communicate with the terminals 1-2 and 1-3 through the external communication line 11-2, it acquires characteristic information of the node B and the node N from the terminals 1 (or the virtual space management server 4) through the characteristic information communication line 11-1. It is to be noted that also characteristic information of the node A is transmitted through the characteristic information communication line 11-1 in response to a request from the terminal 1-2 or 1-3.

The characteristic information includes ID (Identification) information of the node, information of the position and the direction of the node in a predetermined space (actual space or virtual space), a connection establishment index representative of the degree by which the node issues a request for communication with another node, directional filter index information (hereinafter referred to also as directional filter information) representative of a connection establishment index to the directions from the center at the node, and so forth.

The connection priority degree analysis section 21 sets a reference space formed from a predetermined space (actual space or virtual space) with reference to position information of the node to which the connection priority degree analysis section 21 belongs (such a node is hereinafter referred to as self node), disposes the positions of the opposite parties of communication based on the characteristic information of the self node and the opposite parties of communication in the set reference space and determines relative positions or relationships between the self node and the opposite parties of communication to calculate connection priority degrees of the nodes in the communication with the terminals 1-2 and 1-3. Then, the connection priority degree analysis section 21 registers the calculated connection priority degrees into a storage section 22. It is to be noted that, where radio communication is applied, a received signal strength indicator (RSSI) value acquired from the opposite party of communication may be used as the connection priority degree.

Further, when the connection priority degree analysis section 21 detects a variation of the direction or the position of the node A inputted from the action inputting section 26 in response to an action or operation of the user "a" during the communication with the terminals 1-2 and 1-3, or when the connection priority degree analysis section 21 changes the connection establishment index or the directional filter information in response to an instruction from the information inputting section 27, or else when changed characteristic information is received from the terminal 1-2 or 1-3 of an opposite party of communication or in a like case, the connection priority degree analysis section 21 re-calculates the connection priority degrees of the nodes in response to a change of at least one kind of characteristic information. Then, the connection priority degree analysis section 21 updates the connection priority degrees registered in the storage section 22 with the calculated connection priority degrees.

It is to be noted that, when the connection priority degree analysis section 21 detects a variation of the direction or the position of the node A inputted from the action inputting section 26 during communication with the terminals 1-2 and 1-3 or when the connection priority degree analysis section 21 changes a connection establishment index or directional filter information in response to an instruction from the information inputting section 27, the connection priority degree analysis section 21 transmits the characteristic information of the node A to the terminals 1-2 and 1-3 through the characteristic information communication line 11-1.

The storage section 22 has a connection priority degree list (FIG. 4) registered therein in which the connection priority degrees of the opposite parties of communication (terminals 1-2 and 1-3) calculated by the connection priority degree analysis section 21 are coordinated with the ID information. The connection priority degree list registered in the storage section 22 is updated with the connection priority degrees calculated newly by the connection priority degree analysis section 21 when a change of any one of the various pieces of characteristic information of the self node A and the opposite parties of communication is detected.

It is to be noted that the connection priority degree list registered in the terminal 1-1 is transmitted to the terminal 1-2 or 1-3 through the characteristic information communication line 11-1 by the connection priority degree analysis section 21 as occasion demands. On the other hand, if a connection priority degree list registered in the terminal 1-2 or 1-3 is transmitted to the terminal 1-1, then it is registered as a connection priority degree list of the terminal 1 into the storage section 22 based on ID information of the node. In this manner, the connection priority degree lists of the terminals 1 may be shared in the communication system.

If a connection priority degree registered in the storage section 22 is registered (changed), then the internal communication processing section 23 produces notification information for presenting the connection priority degree of the self node to the user "a" or the user "b" of an opposite party of communication based on the connection priority degree and outputs the produced notification information to the outputting section 28. If data from the terminals 1-2 and 1-3 with which communication is established are received through the external communication line 11-2, then the internal communication processing section 23 refers to the connection priority degrees registered in the storage section 22 and controls the communication balance with the terminals 1-2 and 1-3 in the inside of the terminal 1-1 in response to the connection priority degrees referred to.

For example, where data during the communication are sound data, the internal communication processing section 23 may control the communication balance so that sound data from a terminal having a comparatively high connection priority degree from among the terminals 1 of the opposite parties of communication may be outputted with a comparatively great volume. Where data during the communication are image data, the internal communication processing section 23 may control the communication balance so that image data from a terminal 1 having a comparatively low connection priority degree may be outputted after discretely reduced suitably. Where data during the communication are control data, the internal communication processing section 23 may control the rate of corresponding control in accordance with the connection priority degree.

The output control section 24 produces screen data for notifying the user of the connection priority degree list of the storage section 22 in accordance with an instruction of the user inputted from the information inputting section 27 or when it is detected while the output control section 24 supervises the connection priority degree list of the storage section 22 that a connection priority degree list is registered or the connection priority degree list is updated in response to a variation of the direction or position of the self node A or an opposite party of communication. Then, the output control section 24 outputs the produced screen data and so forth to a monitor which forms the outputting section 28 through the input/output interface 25.

The action inputting section 26 is formed from a gyro sensor, an acceleration sensor, an electronic compass, a tilt sensor, and so forth and is loaded by the user "a" or installed in the terminal 1-1. Further, the action inputting section 26 inputs the position information or direction information of the node A in response to an operation of the user "a" by whom the action inputting section 26 is loaded or in response to an operation of the user "a" of moving the terminal 1-1 in which the action inputting section 26 is provided. The action inputting section 26 may otherwise be formed from a controller or the like which includes direction keys for inputting position information or direction information of the node A in response to an operation of the user.

The information inputting section 27 is formed from a keyboard, a mouse, and so forth and inputs an operation signal representative of an operation of the user to the connection priority degree analysis section 21, internal communication processing section 23, and output control section 24 through the input/output interface 25.

The outputting section 28 includes an indicator formed from a monitor which displays an image or an LED (Light Emitting Diode), which is turned on to emit light, and a speaker, which generates beep sound, or the like, in response to data inputted thereto from the output control section 24 or the internal communication processing section 23 through the input/output interface 25.

It is to be noted that, since the terminals 1-2 and 1-3 have a configuration similar to that of the terminal 1-1, overlapping description of the configuration is omitted herein to avoid redundancy. Any of the terminals 1 may be formed naturally from a personal computer or otherwise from, for example, a controlling terminal such as a remote controller, a CE (Consumer Electronics) apparatus such as an AV (Audio Visual) apparatus or a home appliance, which are controlled terminals controlled by a controlling terminal, a portable telephone set, or some other PDA (Personal Digital Assistant) apparatus or the like.

Further, while the connection priority degree analysis section 21 in the communication system of FIG. 1 uses a GPS function based on the GPS satellites 3 to acquire position information on the earth, for example, where a radio IC tag or the like is embedded in the terminals 1 in an actual space smaller than that of the GPS such as, for example, an internal space of a room, the connection priority degree analysis section 21 may acquire position information otherwise based on a local positioning system from the base station 5. Where communication is performed between terminals which share a virtual space, the connection priority degree analysis section 21 may acquire position information in the virtual space or the like from the virtual space management server 4. Where a virtual space is applied, also characteristic information of the other nodes is acquired from the virtual space management server 4.

Further, though not shown, position information may be acquired otherwise making use of position detection from a radio IC tag embedded in the ground, a distance measuring function that a radio wave or a radar is used, a distance measuring function by stereoscopic observation making use of a plurality of cameras provided on the terminal 1, or information acquired from a plurality of cameras installed in a space of a room. In other words, the present communication system is applied in various great and small actual spaces such as a space over a wide range on the earth, a space of a predetermined district, or a space of a room and various virtual spaces.

Figure 2:
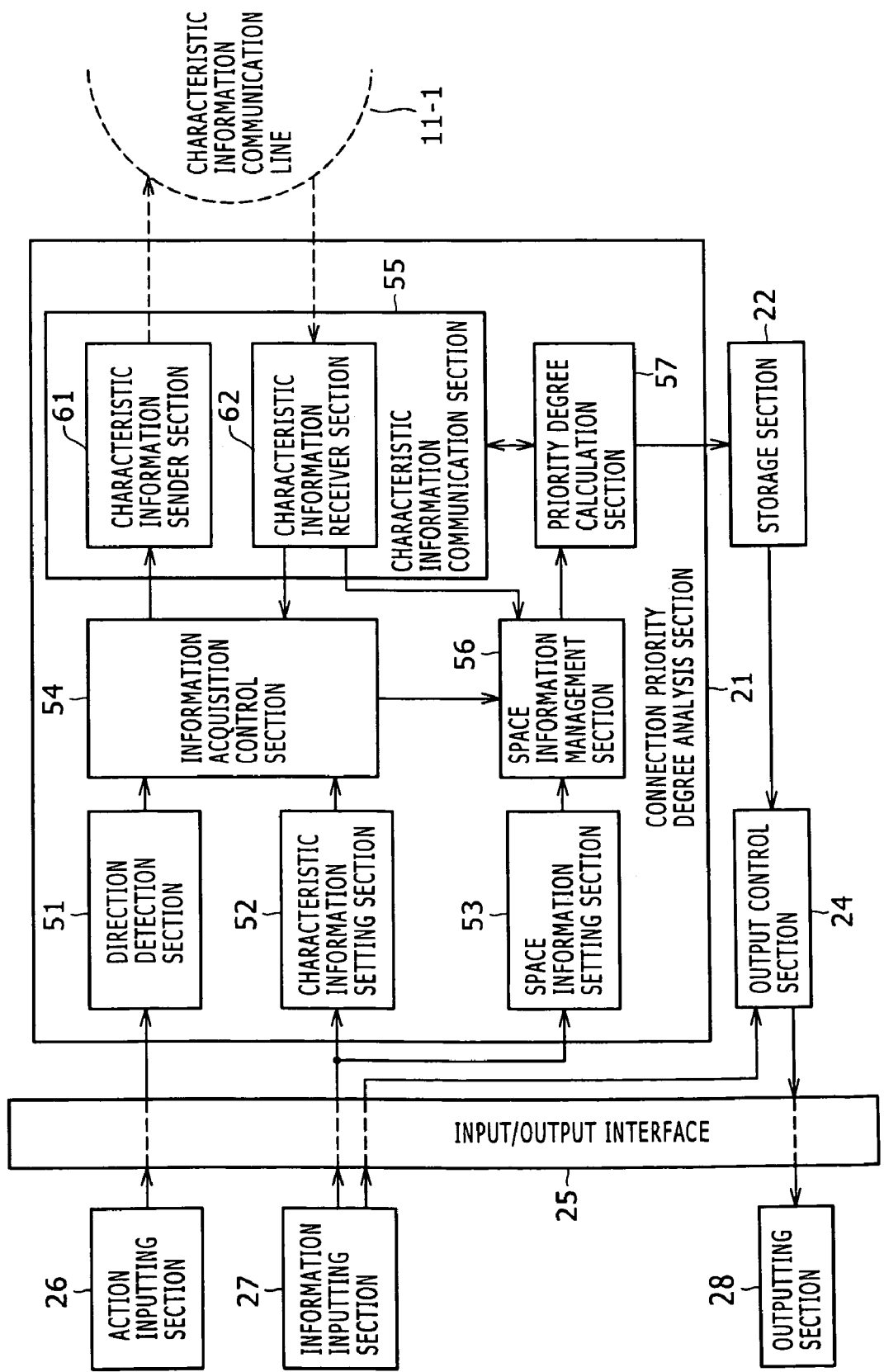
FIG. 2 is a block diagram showing an example of a detailed configuration of a connection priority degree analysis section of a terminal shown in FIG. 1.

FIG. 2 shows an example of a detailed configuration of the connection priority degree analysis section 21 of each terminal 1.

Referring to FIG. 2, the connection priority degree analysis section 21 includes a direction detection section 51, a characteristic information setting section 52, a space information setting section 53, an information acquisition control section 54, a characteristic information communication section 55, a space information management section 56, and a priority degree calculation section 57.

The direction detection section 51 sets direction information of the user (the node of the user) inputted from the action inputting section 26 as the direction at present of the self node under the control of the information acquisition control section 54 and supplies the set direction to the information acquisition control section 54. Further, if the direction detection section 51 detects a variation of the direction or the position of the self node inputted from the action inputting section 26, then it supplies the direction information or position information from which a variation is detected to the information acquisition control section 54.

In particular, in order to detect a variation of the direction upon direction setting of the self node, the direction detection section 51 sets the direction at present as a calibration process in advance. It is to be noted that the position at present may be set similarly. More particularly, upon starting or resetting of the terminal 1, the direction detection section 51 adapts the action inputting section 26 to a prescribed reference position or sets the direction or position at present of the self node based on information from the electronic compass or the tilt sensor which form the action inputting section 26 and then detects a variation of the direction or position of the self node from information from the gyro sensor, the acceleration sensor, or the controller which form the action inputting section 26 with reference to the set direction or position at present of the self node.

The characteristic information setting section 52 supplies various pieces of setting information to the information acquisition control section 54 in accordance with an instruction of the user inputted from the information inputting section 27 and issues a notification of starting or ending of communication in response to an instruction of the user. In particular, the characteristic information setting section 52 sets connection establishment indices representative of the degrees with which the self node requests the other nodes for communication and directional filter indices representative of connection establishment indices to various directions from the center at the self node from among various pieces of characteristic information in a memory (not shown) built therein in accordance with an instruction of the user inputted from the information inputting section 27. Then, the characteristic information setting section 52 supplies the set connection establishment indices and directional filter indices to the information acquisition control section 54. Further, when the characteristic information setting section 52 changes a connection establishment index and a directional filter index of the self node in response to an instruction of the user inputted from the information inputting section 27, it supplies the changed connection establishment index and directional filter coefficient of the self node to the information acquisition control section 54.

The space information setting section 53 sets, from among a space of a predetermined district, a space in a room, a virtual period, and so forth, a space to be used as a reference space (that is, which space should be shared with a terminal with which the node should communicate) in accordance with an instruction of the user inputted from the information inputting section 27. Then, the space information setting section 53 supplies information of the space to be used as a reference space to the space information management section 56.

The information acquisition control section 54 controls, if the connection establishment indices, the directional filter indices, and so forth of the self node are inputted from the characteristic information setting section 52, the direction detection section 51 and the characteristic information communication section 55 to acquire the direction information and position information of the self node and the characteristic information of the opposite parties of communication. Further, the information acquisition control section 54 supplies the characteristic information of the self node and the opposite parties of communication received from the direction detection section 51, the characteristic information setting section 52, and the characteristic information communication section 55 to the space information management section 56. Furthermore, the information acquisition control section 54 controls the characteristic information communication section 55 to transmit the characteristic information of the self node to the opposite parties of communication in accordance with a request from the opposite parties of communication received through the characteristic information communication section 55.

Further, if, during communication through the external communication line 11-2 with another terminal 1, changed characteristic information of the self node or the opposite party of communication is inputted from the direction detection section 51, characteristic information setting section 52, or characteristic information communication section 55, then the information acquisition control section 54 supplies the changed characteristic information of the self node or the opposite party of communication to the space information management section 56. It is to be noted that, at this time, if changed characteristic information of the self node is inputted from the direction detection section 51 or the characteristic information setting section 52 to the information acquisition control section 54, then it is transmitted to the terminal 1 of the opposite party of communication through the characteristic information communication section 55.

The characteristic information communication section 55 includes a characteristic information sender section 61 and a characteristic information receiver section 62 and transmits and receives characteristic information of the nodes or transmits and receives a priority degree information list calculated and registered by the priority degree calculation section 57 through the characteristic information communication line 11-1 using an address of an opposite party of communication stored in advance in the terminal 1 under the control of the information acquisition control section 54. The address of the opposite party of communication may be, for example, an IP (Internet Protocol) address, a MAC (Media Access Control) address or a telephone number of a portable telephone set.

The characteristic information sender section 61 acquires the characteristic information of the self node from the information acquisition control section 54 when an instruction to transmit the characteristic information of the self node is received from the information acquisition control section 54 or when a request for the characteristic information of the self node is received from the terminal 1 of the opposite party of communication. Then, the characteristic information sender section 61 transmits the acquired characteristic information of the self node to the terminal 1 of the opposite party of communication through the characteristic information communication line 11-1. Further, the characteristic information sender section 61 issues a request for the characteristic information to the terminals 1 of the opposite parties of communication through the characteristic information communication line 11-1 under the control of the information acquisition control section 54.

The characteristic information receiver section 62 acquires characteristic information transmitted from the terminals 1 of the opposite parties of communication through the characteristic information communication line 11-1 in accordance with a request from the characteristic information sender section 61. Further, the characteristic information receiver section 62 has a GPS function not shown built therein and receives and analyzes signals (radio waves) signaled from the GPS satellites 3 toward the earth to calculate the receiver position (latitude and longitude or the like). Then, the characteristic information receiver section 62 supplies the calculated position information to the information acquisition control section 54.

It is to be noted that the position information may otherwise be acquired from the local positioning system of the base station 5 by the characteristic information receiver section 62 making use of a radio IC tag embedded in the terminal 1. Further, where communication is to be performed between nodes by which a virtual space provided by the virtual space management server 4 is shared, the characteristic information sender section 61 and the characteristic information receiver section 62 access the virtual space management server 4 to receive mutual position information and direction information and detect a change of the information. In this instance, the virtual space management server 4 may manage necessary ones (including all) of the various types of characteristic information of the nodes.

Further, the characteristic information sender section 61 transmits a priority degree information list calculated and registered by the priority degree calculation section 57 to the terminals 1 of the opposite parties of communication through the characteristic information communication line 11-1. On the other hand, if the characteristic information receiver section 62 receives a connection priority degree list calculated by any of the terminals 1 of the opposite parties of communication through the characteristic information communication line 11-1, then it registers the received connection priority degree list as a connection priority degree list of the terminals 1 based on the ID information of the terminals 1. Consequently, a connection priority degree list calculated by any terminal 1 is shared in the communication system.

The space information management section 56 defines a reference space of the self node, whose reference is the self node, with reference to a position represented by position information of the user inputted from the information acquisition control section 54 based on reference space information received from the space information setting section 53. When the characteristic information of the self node and the opposite parties of communication is inputted from the information acquisition control section 54, the space information management section 56 disposes the nodes of the opposite parties of communication in the reference space of the self node based on the characteristic information of the self node and the opposite parties of communication or reflects the information to set a reference space of the self node and manages and supplies the set reference space of the self node to the priority degree calculation section 57. Where a referenced space of the self node is managed already, if characteristic information of the self node or an opposite party of communication is inputted from the information acquisition control section 54, then the space information management section 56 updates the stored reference space of the self node based on the inputted characteristic information and supplies the reference space of the self node to the priority degree calculation section 57.

The priority degree calculation section 57 uses the reference space of the self node supplied thereto from the space information management section 56 to determine relative positions or relationships between the self node and the opposite parties of communication to calculate connection priority degrees from the self node to the nodes of the opposite parties of communication. Then, the priority degree calculation section 57 registers the connection priority degrees to the nodes in a coordinated relationship with the ID information as a connection priority degree list into the storage section 22. Further, the priority degree calculation section controls the characteristic information sender section 61 to transmit the connection priority degree list to the other terminals 1 through the characteristic information communication line 11-1.

It is to be noted that, while, in the connection priority degree analysis section 21 shown in FIG. 2, a change of position information is detected by the direction detection section 51, such detection of a change of position information by the direction detection section 51 is used where the applied space is not very great such as, for example, a space in a room.

Accordingly, where the applied space is such a great space in which a change of position information is acquired using a GPS function, the connection priority degree analysis section 21 is configured such that a change of position information is detected using the GPS function not shown which is built in the characteristic information receiver section 62.

Figures 3, 4:
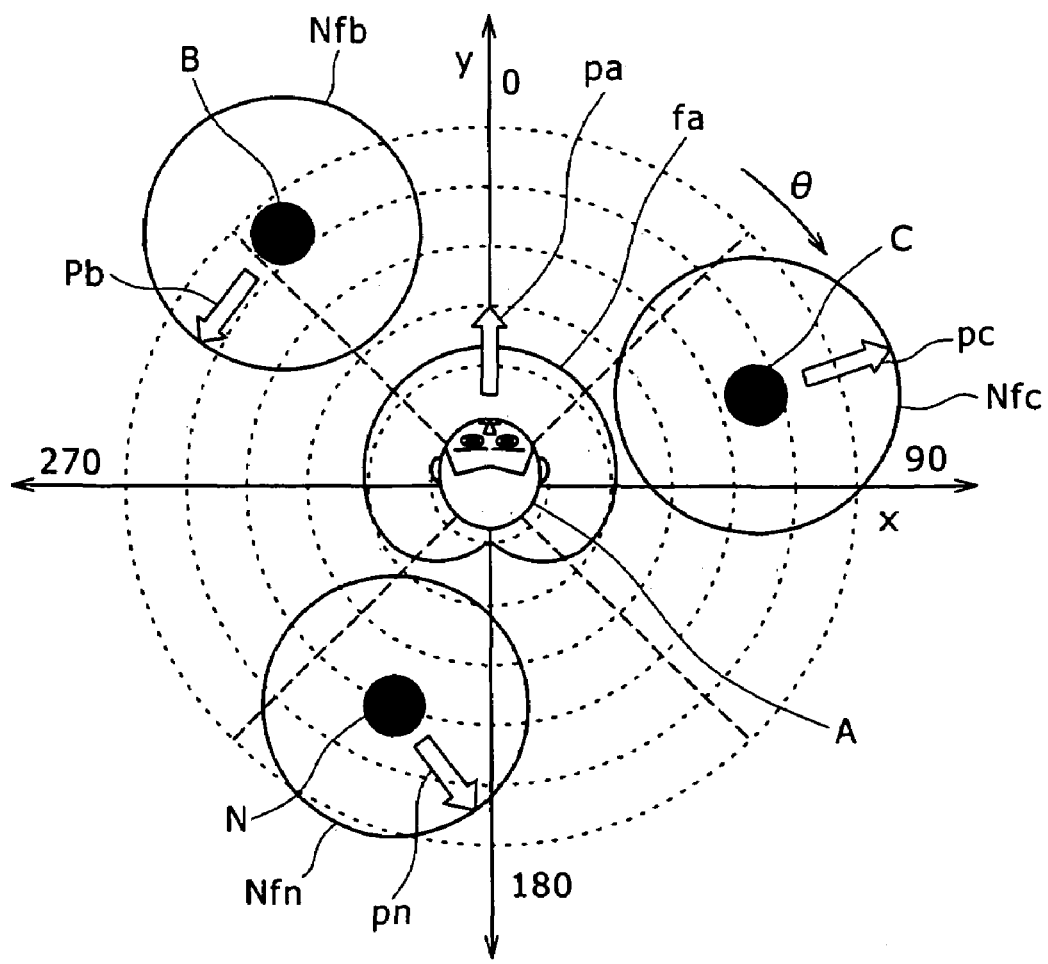
FIG. 3 is a view illustrating an example of a connection priority degree list stored in a storage section of the terminal shown in FIG. 1.
FIG. 4 is a diagrammatic view illustrating a reference space of a node.

FIG. 3 shows an example of a configuration of the connection priority degree list registered in the storage section 22. The connection priority degree list is registered in the form of a list in a coordinated relationship with ID information in the storage section 22.

In the configuration shown in FIG. 3, the connection priority degree list includes the items of a "node name", a "connection priority degree" calculated by the priority degree calculation section 57, an "order number" representative of a priority order number of connection, and a "position" representative of position information of the node.

For example, in the connection priority degree list of FIG. 3, it is registered that, with regard to the node B, the connection priority degree is "100" and the order number is "1", and that, with regard to the node N, the connection priority degree is "65" and the order number is "2".

Now, a reference space of the node A set by the space information management section 56 is described with reference to FIG. 4. In the example shown in FIG. 4, a reference space coordinate system for the node A whose center (origin) is set to the position of the node A is represented by two-dimensional values of x and y. It is to be noted that the reference space is actually represented as a three-dimensional space of x, y, and z.

In the reference space coordinate system of the node A, the upward direction of the y axis is set as 0 degree with reference to the position of the node A, and azimuths (θ) of 360 degrees are set in the clockwise direction from 0 degree. In particular, in the example of FIG. 4, the front face direction pa of the node A is directed to the azimuth of 0 degree. Further, in the reference space coordinate system of the node A, the node B directed in a front face direction pb, a node C directed in a front face direction pc and the node N directed in a front face direction pn are disposed based on the characteristic information of the nodes. Further, in the reference space coordinate system of the node A, the radii of six circles centered at the origin (node A) individually represent the distances from the node A. It is assumed for the convenience of description that, for example, the radius of the circle on the innermost circumference is 10 m; the radius of a next circle is 20 m; ...; and the radius of the outermost circumference is 60 m.

In particular, in the reference space coordinate system of the node A, the node B is disposed at a position spaced by a radius of about 55 m in the azimuth of approximately 315 degrees around the origin such that the azimuth of approximately 225 degrees is the front face direction pb thereof. The node C is disposed at another position spaced by a radius of approximately 35 m in the azimuth of approximately 70 degrees around the origin such that the azimuth of approximately 70 degrees is the front face direction pc. The node N is disposed at a further position spaced by a radius of approximately 45 m in the azimuth of approximately 225 degrees with respect to around the origin such that the azimuth of approximately 135 degrees is the front face direction pn thereof.

Further, in the example of FIG. 4, a directional filter fa surrounding the node A is represented by a circle of a shape. The rear face direction with respect to the front face direction pa of the node A is recessed, and this represents that the node A has directional filter information of the forwardly directed type. A non-directional filter Nfb surrounding the node B, another non-directional filter Nfc surrounding the node C and a further non-directional filter Nfn surrounding the node N are indicated by a right circle, and this represents that the nodes mentioned have directional filter information of the non-directional type.

Here, the directional filter information is described with reference to FIG. 5. The directional filter information represents a directional filter index $f(\theta,\phi)$ which is a magnitude of a demand for communication in an azimuth in the three-directional space of x, y and z (that is, an angle θ (deg) on the xy plane and an angle φ (deg) on the yz plane). The directional filter information can be changed in response to an operation of the information inputting section 27 by the user.

Figure 5:
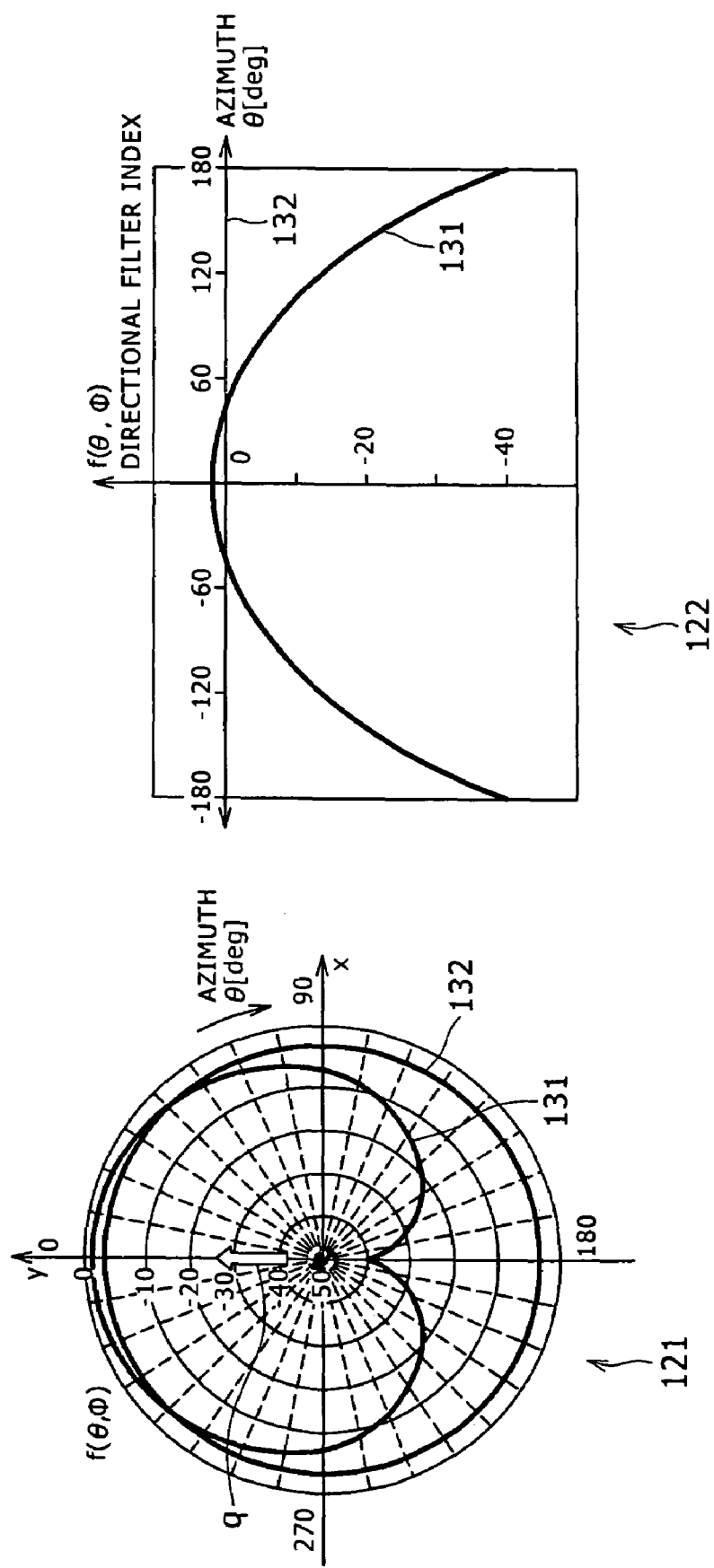
FIGS. 5 to 7 are diagrammatic views illustrating different examples of a directional filter index.

For the convenience of illustration and description, FIG. 5 shows a graph 121 representing the directional filter index $f(\theta,\phi)$ in all azimuths on the two-dimensional plane (xy plane) from within the three-dimensional space from which the z dimension is omitted. FIG. 5 further shows another graph 122 on a coordinate system whose axis of ordinate indicates the directional filter index $f(\theta,\phi)$ and whose axis of abscissa indicates the azimuth θ (indicating the same azimuths of the graph 121). The graphs 121 and 122 represent directional filter indices of a directional filter 131 of the front face directed type and a directional filter 132 of the non-directional type, respectively.

On the graph 121, the origin indicates the node position which is the center of the directional filter, and circles on the xy plane represent directional filters spaced by −10 from each other from −50 (origin). Further, on the graph 121, the uppermost point in the upward direction on the y axis represents 0 degree, and the azimuths over 360 degrees are set in the clockwise direction from 0 degree. Further, the direction of 0 degree is set as the front face direction q of the directional filters.

The directional filter 131 of the front face directed type has a directional filter index which is as high as approximately 3 in the azimuth of the front face direction q and gradually decreases as the azimuth successively changes toward the rear face direction around the origin from the azimuth of the front face direction q and then exhibits sudden degrease to a level as low as approximately −40 in the azimuth of the rear face direction (180 degrees). Accordingly, the directional filter index of the directional filter 131 of the front face directed type is represented in a recessed shape on the graph 121 but is represented in an upwardly projected quadratic curve.

The directional filter 132 of the non-directional type has a directional filter index which is fixed and has an equal magnitude (approximately 0) in all azimuths (that is, the directional filter 132 is a non-directional filter). Accordingly, the directional filter index of the directional filter 132 of the non-directional type is represented in a right circular shape on the graph 121 but is represented by a straight line parallel to the x-axis on the graph 122.

In short, where a terminal 1 uses the directional filter 132 of the non-directional type, it has a connection demand (directional filter index) of a magnitude uniform in all directions. However, where the directional filter 131 of the front face directed type is used, the connection demand is highest in the front face direction q but is low in the back face direction.

Accordingly, referring back to FIG. 4, it can be seen that, since the node A has the directional filter fa, in the reference space coordinate system of the node A, the directional filter index to the node B positioned within ±60 degrees from the front face direction pa of the node A is the highest. Meanwhile, the directional filter index to the node C positioned within ±120 degrees from the front face direction pa of the node A is lower than that to the node B, and the directional filter index to the node N positioned within ±60 degrees from the rear face direction of the node A is the lowest.

Then, the node A (terminal 1-1) refers to the reference space of the node A in which the nodes are disposed as seen in FIG. 4 and characteristic information such as directional filter information is reflected (set) to calculate a connection priority degree $Y_{AX}$ to each of the nodes X from the node A. The connection priority degree $Y_{AX}$ is represented by the following expression (1):

$$Y_{AX}=P_A \times f_A(\theta_{AX},\phi_{AX})+L_{AX} \times f_X(\theta_{XA},\phi_{XA}) \times P_X \quad (1)$$

where $P_A$ represents the connection establishment index of the node A, $P_X$ the connection establishment index of the node X, $L_{AX}$ the connection priority degree attenuation index which increases in response to the distance of the node X from the node A, $f_A(\theta_{AX},\phi_{AX})$ the directional filter index of the directional filter of the node A in the direction of the node A as viewed from the node A, and $f_X(\theta_{XA},\phi_{XA})$ the directional filter index of the directional filter of the node X in the direction of the node A as viewed from the node X.

It is to be noted that, if some of the various kinds of characteristic information of the nodes necessary for calculation of the connection priority degrees (that is, position information, direction information, ID information, directional filter index information, and connection establishment index information) cannot be acquired, then a prescribed value may be inputted suitably to calculate the connection priority degrees.

As described above, in the reference space coordinate system of the node A of FIG. 4, although the directional filter information of the nodes B, C, and N, which have the non-directional filter Nfb, non-directional filter Nfc, and non-directional filter Nfn, does not change in response to the front face direction of the nodes, the directional filter information of the node A, which has the directional filter fa, changes in response to the front face direction pa of the node A. Therefore, it can be recognized that also the connection priority degree calculated using the directional filter information changes in response to the front face direction pa of the node A which has the directional filter fa.

Further, by making the front face direction of the directional filter fa having such a characteristic (index) as described above and the direction of the user "a" be interlocked with each other, the connection priority degree of each node can be changed simply by such a very natural action of the user "a" who turns to the direction of a node to which the user "a" wants to establish a connection.

Further, different examples of the directional filter are described with reference to FIGS. 6 and 7.

Figure 6:
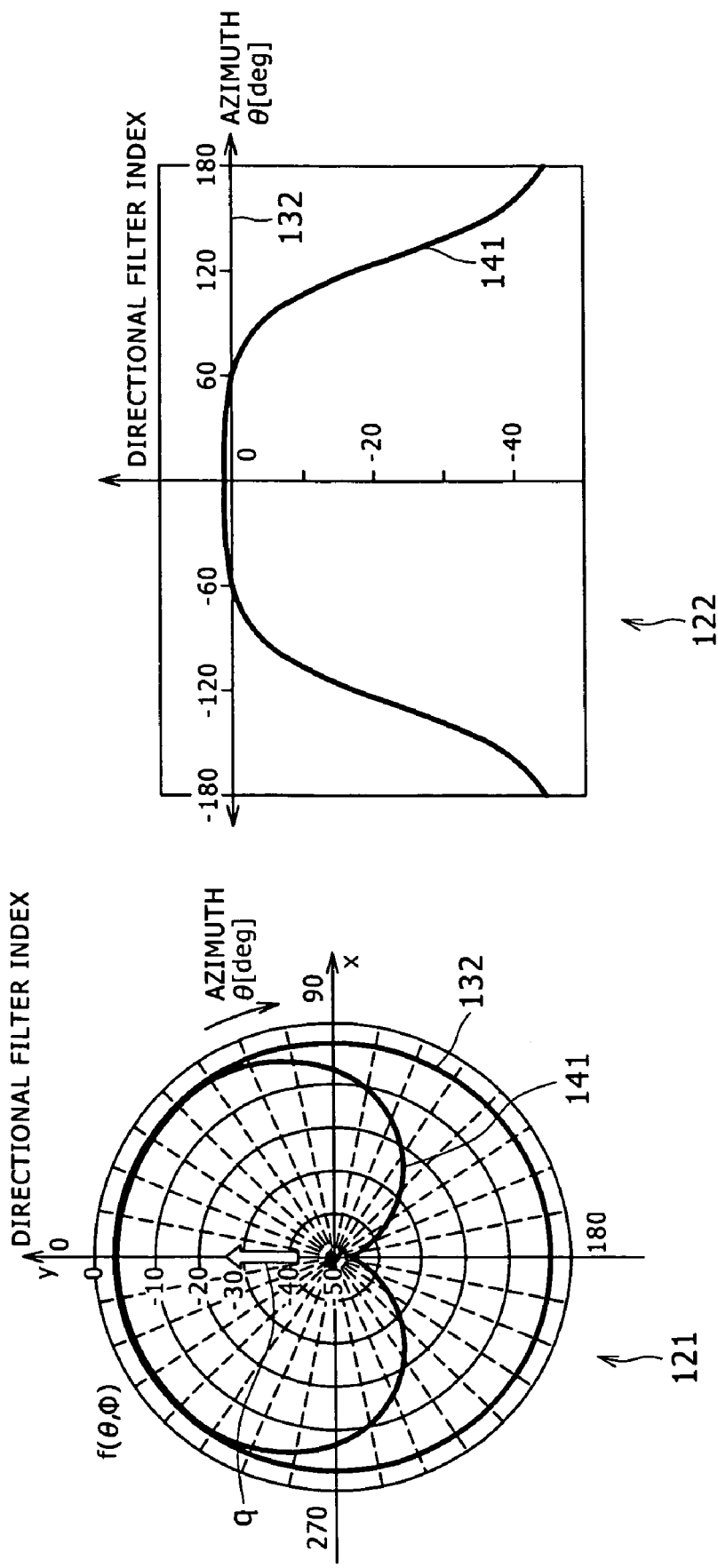

FIG. 6 shows a graph 121 and another graph 122, which indicate directional filter indices of a directional filter 141 of the front direction priority type, and another directional filter 132 of the non-directional type.

The directional filter 141 of the front direction priority type has a directional filter index that is as high as approximately 3 in the azimuth of the front face direction q, gradually decreases as the azimuth successively changes toward the rear face direction from the azimuth of the front face direction q around the origin, and then exhibits sudden degrease to a level as low as approximately −45 in the azimuth of the rear face direction (180 degrees). In this instance, the decrease of the direction filter index is more sudden than that of the directional filter 131 of the front face directed type of FIG. 5. Accordingly, the directional filter index of the directional filter 141 of the front direction priority type is represented, on the graph 121, in a shape which is more recessed in the rear face direction than the directional filter index of the directional filter 131 of the front face directed type, but is represented, on the graph 122, in an upwardly projected cubic curve exhibiting sudden decrease in the rear face direction.

In short, where a terminal 1 uses the directional filter 132 of the non-directional type, it has a connection demand (directional filter index) of a magnitude uniform in all directions. However, where the directional filter 141 of the front direction priority type is used, the connection demand is highest in the front face direction q but is lower in the rear face direction than the directional filter index of the directional filter 131 of the front face directed type of FIG. 5.

Accordingly, also in the case of the directional filter 141 of the front direction priority type, by making the front face direction of the directional filter 141 of the front direction priority type and the direction of the user "a" be interlocked with each other, the connection priority degree of each node can be changed simply by such a very natural action of the user "a" who turns to the direction of a node to which the user "a" wants to establish a connection.

Figure 7:
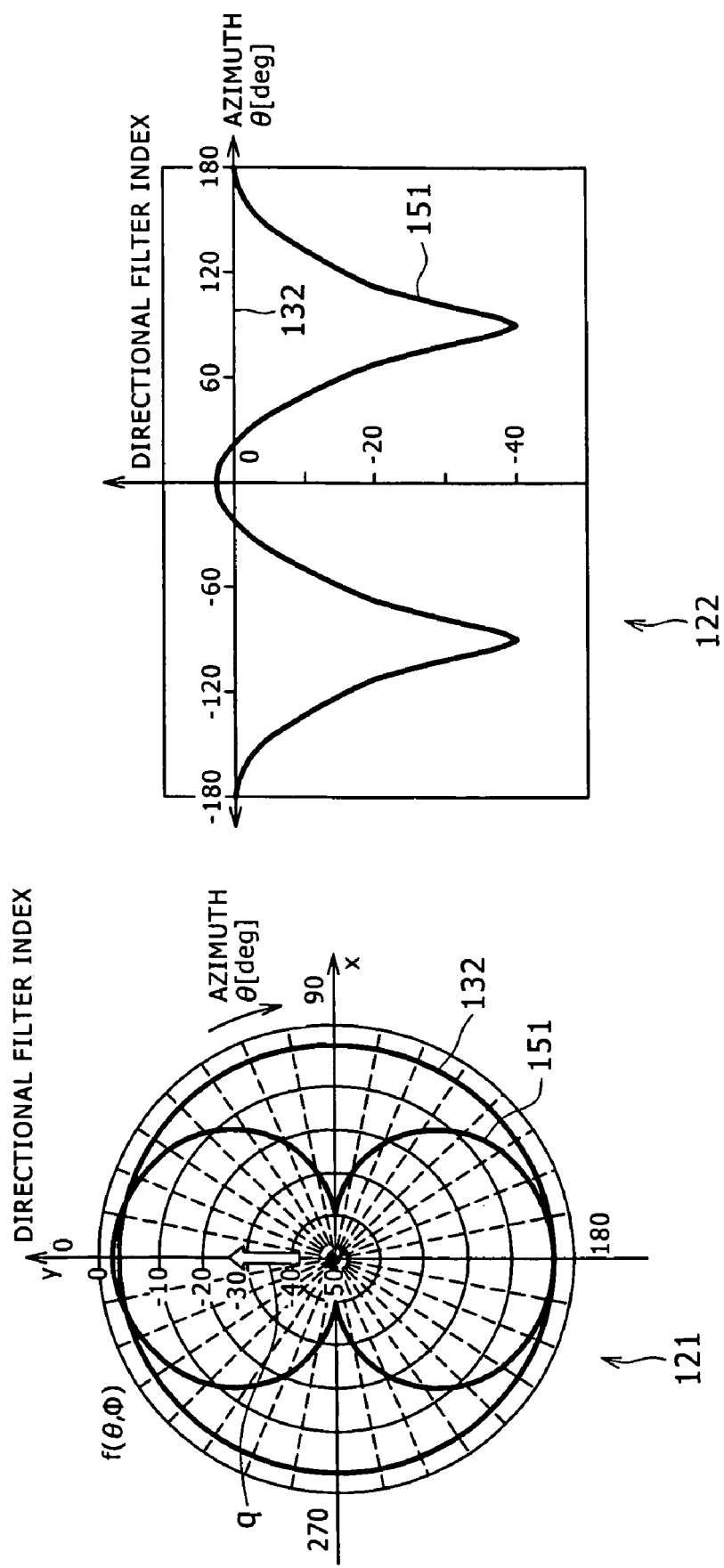

The graph 121 and the graph 122 of FIG. 7 represent directional filter indices of a directional filter 151 of the front and rear direction priority type and the directional filter 132 of the non-directional type, respectively.

The directional filter 151 of the front and rear direction priority type has a directional filter index which is as high as approximately 3 in the azimuth of the front face direction q and gradually decreases as the azimuth successively changes toward the left and right azimuths from the azimuth of the front face direction q around the origin until it becomes approximately −40 in the azimuths of the left and right (that is, in the azimuths of 90 degrees and 270 degrees), whereafter the directional filter index gradually increases as the azimuth successively changes from the left and right azimuths to the azimuth of the rear face direction (180 degrees) around the origin until it increases approximately to zero in the azimuth of the rear face direction. Accordingly, the directional filter index of the directional filter 151 of the front and rear direction priority type is represented, on the graph 121, in a shape in which two circles are connected to each other in the front face direction q and the rear face direction across the azimuth of the leftward and rightward direction, but is represented, on the graph 122, in a curve which exhibits a top in the azimuths of 0 degree and 180 degrees and exhibits a bottom in the azimuths of 90 degrees and −90 degrees (270 degrees).

In short, where a terminal 1 uses the directional filter 132 of the non-directional type, it has a connection demand (directional filter index) of a magnitude uniform in all directions. However, where the directional filter 151 of the front and rear direction priority type is used, the connection demand is high in the front face direction q and the rear face direction but is low in the left and right azimuths.

Accordingly, in the case of the directional filter 151 of the front and rear direction priority type, by making the front face direction of the directional filter 151 of the front and rear direction priority type and the direction of the user "a" be interlocked with each other, the connection priority degree of each node can be changed simply by such a simple action of the user "a" who sets the direction of a node to which the user "a" wants to establish a connection to the front face side or the rear face side.

Now, transitions of the direction of a node and the connection priority degree are described with reference to FIGS. 8 to 10.

In the example of FIG. 8, the reference space coordinate system of the node A and a relative position table between the node A and the nodes disposed on the reference space coordinate system of the node A are shown. It is to be noted that the reference space coordinate system of the node A shown in FIG. 8 is configured similarly to the reference space coordinate system of FIG. 4, and the upward direction of the y axis (upward direction in FIG. 8) is set to 0 degree while the azimuths (θ) over 360 degrees are set in the clockwise direction from 0 degree. In other words, also in the example of FIG. 8, the front face direction pa of the node A is directed to the direction of 0 degree. Further, in the reference space of the node A, the radii of six circles (broken lines) centered at the origin (node A) represent the distances from the node A, and it is assumed that the radius of the circle of the innermost circumference is 10 m; the radium of the next circle is 20 m; . . . ; and the radius of the circle of the outermost circumference is 60 m.

In the example of FIG. 8, the coordinates of the node A are [0, 0] (which represent [x coordinate, y coordinate]). In the reference space coordinate system of the node A, the node B, node C, and node D are disposed based on the characteristic information of the nodes.

First, the node B is disposed at the position of coordinates [xb, yb] spaced by a relative distance Dab of 40 m from the node A in a relative azimuth θab of 315 degrees (−45 degrees) to the node A. The node C is disposed at the position of coordinates [xc, yc] spaced by a relative distance Dac of 30 m from the node A in a relative azimuth θac of 90 degrees to the node A. The node D is disposed at the position of coordinates [xd, yd] spaced by a relative distance Dad of 25 m from the node A in a relative direction θad of 157.5 degrees to the node A.

It is to be noted that the reference space coordinate system of the node A is set based on the characteristic information of the nodes acquired by the individual nodes by a GPS function, a local positioning system, or the like and then communicated between the nodes.

Figure 9:
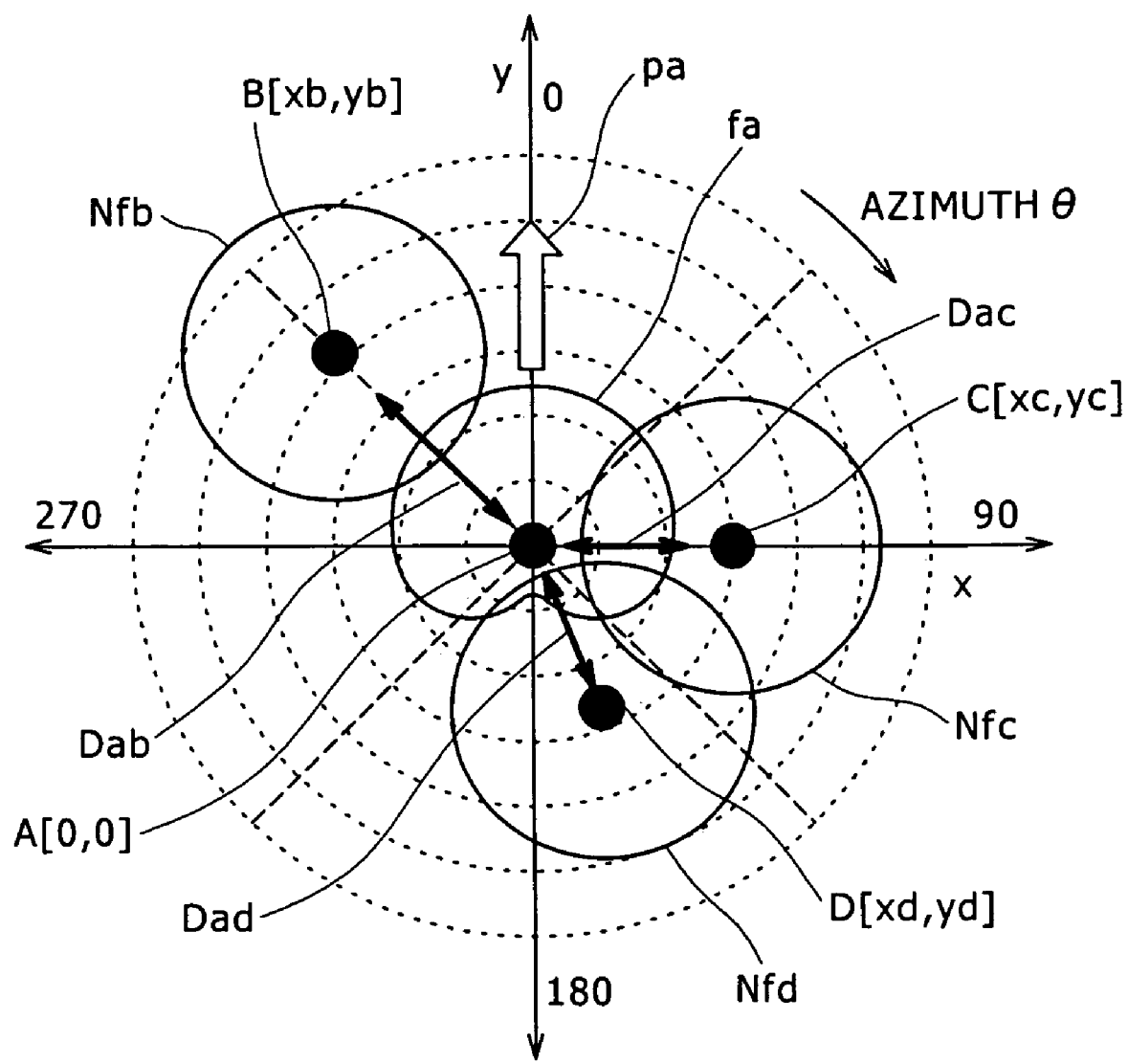
FIG. 9 is a diagrammatic view illustrating the reference space coordinate system of the node of the FIG. 8 on which a directional filter index is reflected.

It is assumed that a directional filter of the front face directed type is used only for the node A as seen in FIG. 9 in such a reference space coordinate system of the node A of FIG. 8 as described above.

In the example of FIG. 9, the user "a" has a directional filter fa of the front face directed type described hereinabove with reference to FIG. 5, and the front face direction pa of the node A is directed in an upward direction of the y-axis. Meanwhile, the nodes B, C, and D disposed in the reference space coordinate system of the node A have the non-directional filter Nfb, non-directional filter Nfc, and directional filter Nfd of the non-directional type.

Accordingly, in the reference space coordinate system of the node A shown in FIG. 9, although the directional filter information does not change in response to the front face direction of the nodes B, C, and D, which have the non-directional filter Nfb, non-directional filter Nfc, and non-directional filter Nfd, respectively, the directional filter information of the node A changes in response to the front face direction of the node A, which has the directional filter fa.

In the reference space coordinate system of the node A configured in such a manner as described above. A directional filter of the front face directed type is used only for the node A, the connection priority degree between the node A and each node is calculated for each azimuth of the node A. As a result, the connection priority degree between the node A and each node varies in response to the azimuth (θ) in which the front face direction pa of the node A is directed as seen in FIG. 10.

It is to be noted that, for the calculation of the connection priority degree in this instance, a radio wave loss calculation method of an electromagnetic wave of the 2.4 GHz band in a free space is used as an example of a calculation method of a connection priority degree attenuation index which increases in response to the distance between nodes. Further, in the expression (1), 0 [dB] is used as the connection establishment index of each node, and [dB] is used also as a unit of the directional filter index f(θ,φ) described hereinabove with reference to FIG. 5.

The radio wave loss L [dB] of an electromagnetic wave of the 2.4 GHz band in a free space is represented by the following expression (2):

$$L\ [dB] = 10\ \log(4\pi d/\lambda)^2 = 10\ \log(4\pi f d/c)^2 \qquad (2)$$

where λ represents the wavelength [m]; d the radio wave distance [m]; f the frequency [Hz]; and c the velocity of light $(3.0 \times 10^8)$ [M/s].

Figure 10:
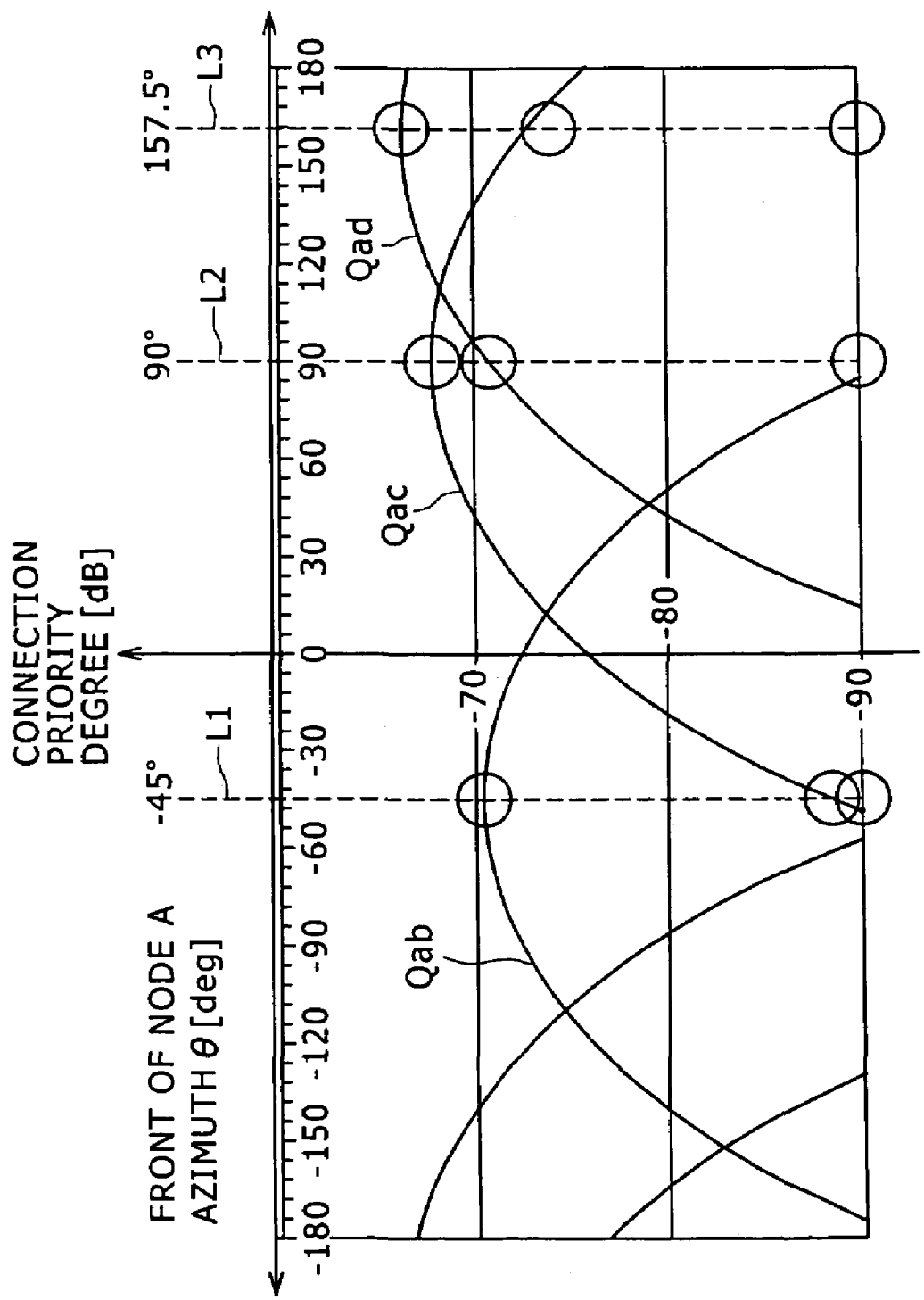
FIG. 10 is a diagrammatic view illustrating a transition of a connection priority degree in the example of FIG. 9.

FIG. 10 is a graph illustrating transitions of the connection priority degrees between the node A and the nodes in the front face direction pa of the node A in the reference space coordinate system of the node A of FIG. 8 in which the directional filter information of FIG. 9 is used.

In FIG. 10, the axis of ordinate represents the connection priority degree [dB], and the axis of abscissa represents the direction (θ) of the front face direction pa of the node A in the reference space coordinate system of the node A (that is, the direction in which the front face of the node A is directed in the reference space coordinate system of the node A). It is to be noted that, in the example of FIG. 10, the angles from 180 degrees to 360 degrees of the azimuth (θ) in FIG. 9 are converted into angles from −180 degrees to 0 degree.

The node B is disposed at a position spaced by the relative distance Dab of 40 m from the node A in the relative azimuth θab of −45 (315) degrees with respect to the node A. Accordingly, the connection priority degree Qab between the node A and the node B shown in FIG. 10 exhibits the highest value of approximately −71 [dB] when the front face direction pa of the node A is directed to the azimuth of −45 degrees, and gradually decreases as the direction of the front face direction pa of the node A gradually changes around the node A from the azimuth of −45 degrees. Then, when the front face direction pa of the node A is directed to the azimuth of 90 degrees or 180 degrees, the connection priority degree Qab becomes substantially −91 [dB], and though not shown, when the front face direction pa of the node A is directed to the azimuth of 135 degrees, the connection priority degree Qab exhibits the lowest value.

Similarly, the node C is disposed at a position spaced by the relative distance Dac of 30 m from the node A in the relative azimuth θac of 90 degrees with respect to the node A. Accordingly, the connection priority degree Qac between the node A and the node C shown in FIG. 10 exhibits the highest value of approximately −67 [dB] when the front face direction pa of the node A is directed to the azimuth of 90 degrees, and gradually decreases as the front face direction pa of the node A gradually changes around the node A from the azimuth of 90 degrees. Then, when the front face direction pa of the node A is directed to the azimuth of −45 (315) degrees or 225 degrees, the connection priority degree Qac becomes substantially −89 [dB], and though not shown, when the front face direction pa of the node A is directed to the azimuth of 270 degrees, the connection priority degree Qac exhibits the lowest value.

The node D is disposed at a position spaced by the relative distance Dad of 25 m from the node A in the relative direction θad of 157.5 degrees with respect to the node A. Accordingly, the connection priority degree Qad between the node A and the node D shown in FIG. 10 exhibits the highest value of approximately −66 [dB] when the front face direction pa of the node A is directed to the azimuth of 157.5 degrees, and gradually decreases as the front face direction pa of the node A gradually changes around the node A from the azimuth of 157.5 degrees. Then, when the front face direction pa of the node A is directed to the direction of 22.5 degrees or −67.5 (292.5) degrees, the connection priority degree Qad becomes substantially −87 [dB], and though not shown, when the front face direction pa of the node A is directed to the azimuth of −22.5 (337.5) degrees, the connection priority degree Qad exhibits the lowest value.

Accordingly, where the connection priority degrees between the node A and the nodes in the reference space coordinate system of FIG. 9 that the node A has the directional filter fa of the front face directed type are compared with each other, when the front face direction pa of the node A is directed to the azimuth of −45 degrees (that is, the direction toward the node B), a relationship of the connection priority degree Qab (approximately −71 [dB])>>connection priority degree Qac (approximately −89 [dB])>>connection priority degree Qad (−90 [dB] or less) as indicated by round marks on a broken line L1 is satisfied.

Further, when the front face direction pa of the node A is directed to the azimuth of 90 degrees (that is, the direction toward the node C), a relationship of the connection priority degree Qac (approximately −67 [dB])>>connection priority degree Qad (approximately −72 [dB])>>connection priority degree Qab (−91 [dB]) as indicated by round marks on another broken line L2 is satisfied.

Furthermore, when the front face direction pa of the node A is directed to the azimuth of 157.5 degrees (that is, the direction toward the node D), a relationship of the connection priority degree Qad (approximately −66 [dB])>>connection priority degree Qac (approximately −73 [dB])>>connection priority degree Qab (−90 [dB] or less) as indicated by round marks on a further broken line L3 is satisfied.

It is to be noted that, where the connection priority degrees between the node A and the nodes in the reference space coordinate system that the node A does not include a directional filter of the front face directed type, that is, in the reference space coordinate system that all nodes have a non-directional filter are compared with each other, the direction of the front face direction of the node A does not have an influence on the connection priority degrees of the nodes, but the connection priority degrees of the nodes are determined in response the relative distances and have a relationship of the connection priority degree Qad (approximately −66 [dB]) >connection priority degree Qac (approximately −67 [dB]) >connection priority degree Qab (−71 [dB]).

As described above, it can be recognized that, in the example of FIG. 9 that only the node A has a directional filter of the front face directed type, the connection priority degrees to the nodes vary in response to the front face direction of the node A, and the connection priority degree of a node positioned in the front face direction of the node A is higher than the connection priority degrees of the other nodes.

It is to be noted that, although, though not shown, the terminal 1-1 has a non-directional filter and at least one of the terminals 1-2 to 1-4 has a directional filter of the front face directed type, the connection priority degree of the node having the directional filter of the front face directed type varies in response to the azimuth of the front face direction of the node.

Further, in another case that also the terminal 1-1 has a directional filter of the front face directed type and at least one of the terminals 1-2 to 1-4 has a directional filter of the front face directed type, the connection priority degrees of the nodes vary in response to the azimuth of the front face direction of the node A while the connection priority degrees of the other nodes having a directional filter of the front face directed type vary in response to the azimuths of the node A and the nodes.

Furthermore, while the foregoing description given with reference to FIGS. 8 to 10 relates to a case that directional filter information of the front face directed type of FIG. 5 is used, also where directional filter information of the front direction priority type of FIG. 6 or directional filter information of the front and rear direction priority type of FIG. 7 is used, the connection priority degree varies in response to the azimuths of the nodes which have the individual directional filter information.

As described above, by determining the relative positions or relationships between the self node and the opposite parties of communication using characteristic information owned by the nodes (that is, position information, direction information, ID information, directional filter index information and connection establishment index information) and then calculating the connection priority degrees between the node A and the nodes at a certain point of time, priority order numbers can be applied among the nodes with which the node A communicates.

Further, the connection priority degree of each node can be adjusted by varying the direction information of the node from the action inputting section 26 (that is, by causing the action inputting section 26 to operate). In particular, by using such a directional filter of the front face directed type as described above with reference to FIG. 6 in an interlinked relationship with the direction information of the nodes, the connection priority degree of each node can be adjusted simply, for example, by such a simple operation as, for example, of directing the node A toward the direction of a node to which connection should be established.

It is to be noted that, while, in the foregoing description, the connection priority degree is described using a reference space coordinate system represented as a two-dimensional coordinate system of x and y, actually the reference space is formed as a three-dimensional space. Accordingly, for example, if it is not desired very much to connect the node A to another node in a three-dimensional space coordinate system, the connection priority degree of each node can be adjusted simply by such a vary natural operation as to direct the angle φ of the xy plane, that is, by a tilting movement of the node.

FIG. 11 illustrates an example of a configuration of the connection priority degree list stored in the storage section 22. In other words, the connection priority degree list of FIG. 11 is another example of a configuration of the connection priority degree list of FIG. 4.

In the example of FIG. 11, the connection priority degree list includes the items of a "node name" which is a name of a node, a "connection priority degree" calculated by the priority degree calculation section 57, an "order number" representative of the priority order number of connection among nodes to be connected, a "position" representative of position information of the node, a "direction" representative of direction information of the node, an "address" for connection to the node, a "directional filter index" had by the node and a "connection establishment index" of the node, which are listed in accordance with the ID information of the node.

As regards the "node B", the connection priority degree is "100"; the order number is "2"; the position is [xb, yb, zb] ([x coordinate, y coordinate, z coordinate]); the direction is (θ$_B$, φ$_B$) ((angle of xy plane, angle of yz plane)); the address is "xx-xx-xx-"; the directional filter index is f$_B$(θ,φ); and the connection establishment index is "45".

As regards the "node C", the connection priority degree is "65"; the order number is "3"; the position is [xc, yc, zc] ([x coordinate, y coordinate, z coordinate]); the direction is ($\theta_C$, $\phi_C$) ((angle of xy plane, angle of yz plane)); the address is "090-xxxx"; the directional filter index is $f_C(\theta,\phi)$; and the connection establishment index is "21".

As regards the "node N", the connection priority degree is "123"; the order number is "1"; the position is [xn, yn, zn] ([x coordinate, y coordinate, z coordinate]); the direction is ($\theta_N$, $\phi_N$) ((angle of xy plane, angle of yz plane)); the address is "xx-xx-xx-"; the directional filter index is $f_N(\theta,\phi)$; and the connection establishment index is "70".

In particular, in order to produce the connection priority degree list, the "position", "direction", "directional filter index", and "connection establishment index" which are characteristic information of each node are acquired, and the "connection priority degree" of each node is calculated using the expressions (1) and (2) given hereinabove. Further, the "order number" representative of the connection priority order number of each node among the nodes to be connected is set based on the calculated connection priority degrees of the nodes. Then, the information of the items mentioned is registered in the storage section 22 in accordance with the node IDs.

Figure 15:
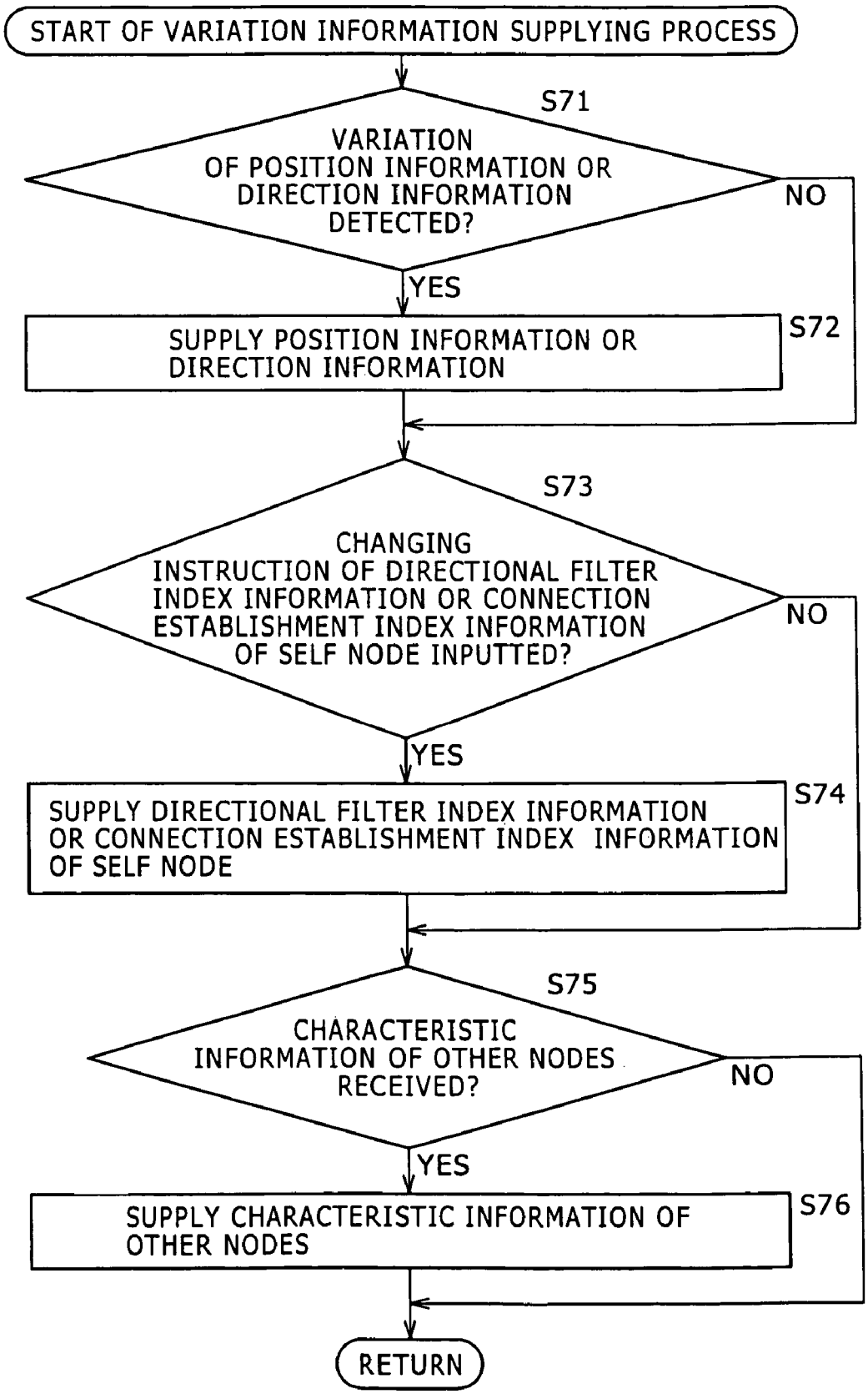
FIG. 15 is a flow chart illustrating a variation information supplying process in the connection priority degree updating process of FIG. 14.

The connection priority degree list is transmitted to the other terminals 1 through the characteristic information communication line 11-1 by the characteristic information sender section 61 or is supplied to the internal communication processing section 23. The connection priority degree list is supplied also to the output control section 24 so that it is transmitted through the input/output interface 25 to and displayed on a monitor which forms the outputting section 28. At this time, the output control section 24 causes the monitor to display information which forms the connection priority degree list in the form of a list of a configuration same as that of the connection priority degree list of FIG. 15 or in the form of a list which includes only part of the information of the connection priority degree list. Further, the output control section 24 can cause the information which forms the connection priority degree list to be displayed using an image of the reference space coordinate system of the node A synthesized as a 3D (three-dimensional) space using a CG (Computer Graphics) technique as seen in FIG. 12.

Figure 12:
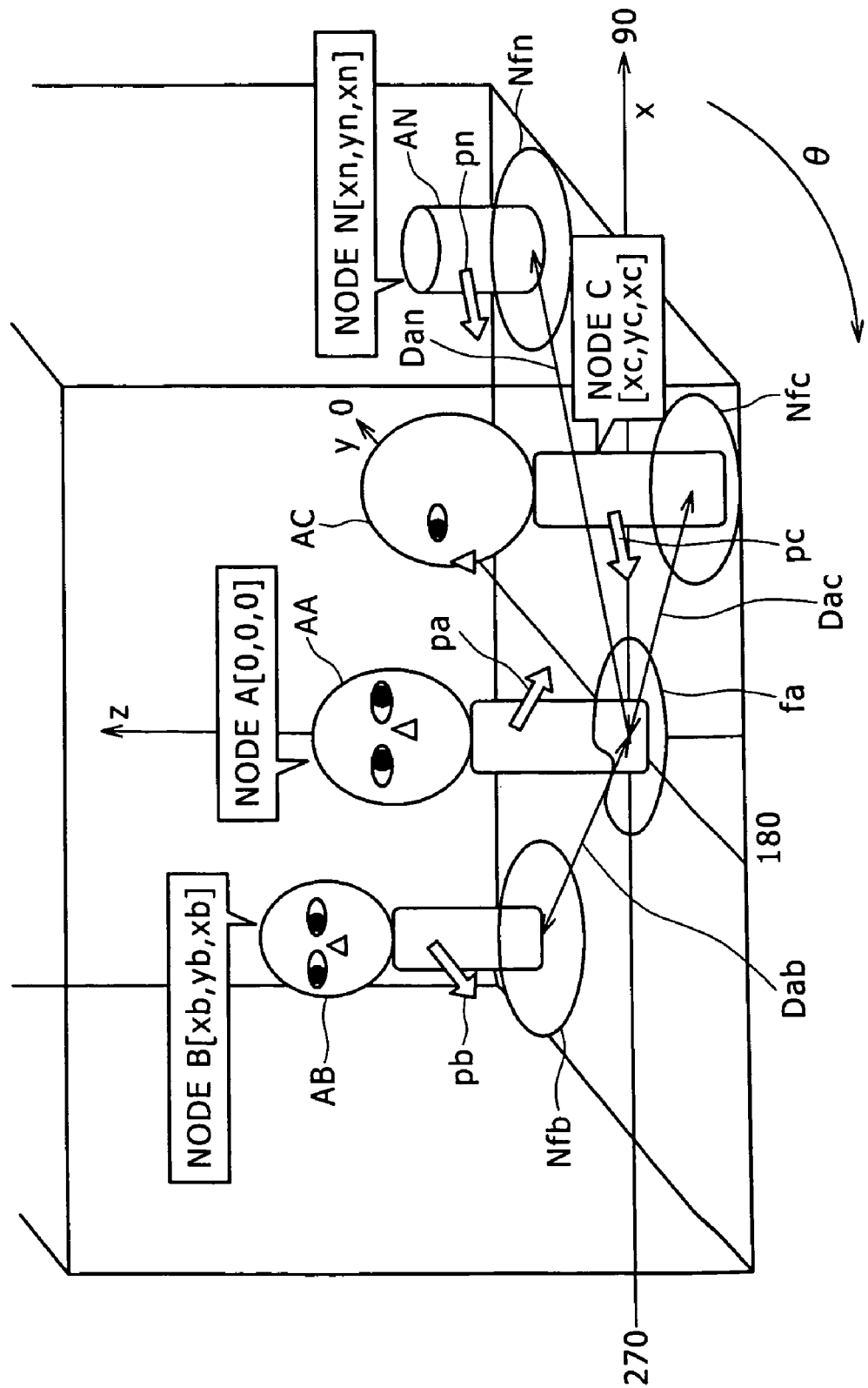
FIG. 12 is a schematic view showing an example of a display of a connection priority degree list outputted to a monitor which forms an outputting section of the terminal shown in FIG. 1.

FIG. 12 shows an example of a display of a connection priority degree list outputted to the outputting section 28.

In the example of FIG. 12, information of the node name, position, direction and directional filter index of the connection priority degree list of FIG. 11 is displayed together with avatars symbolizing the nodes disposed at the positions based on the characteristic information of the nodes in a three dimensional reference space coordinate system of the node A including three dimensions of x, y, and z. It is to be noted that, for the convenience of illustration and description, the positive direction of the y axis on the xy plane is determined as 0 degree, and directions over 360 degrees in the clockwise direction from 0 degree are indicated.

On the outputting section 28, the node A, node B, and node C are displayed as avatars of a mascot shape of the users a, b, and c who individually operate the terminals 1, and the node N is displayed as an avatar of a database shape of a terminal 1 since only a terminal 1 is connected thereto (is not operated by any user) Further, the direction of each node is represented by the azimuth of the front face direction of each avatar, and a directional filter representative of directional filter index information that each node has is displayed at a lower portion of each avatar.

In particular, at the origin of the reference space coordinate system of the node A, an avatar AA of the node A is displayed such that the front face direction pa thereof is directed toward the node C (in the direction of approximately 135 degrees), and at a lower portion of the avatar AA, a directional filter fa of the front face directed type is displayed in the form of a circle of a depressed shape as directional filter index information that the node A has. Further, the node name "node A" and the position information "coordinate values [0, 0, 0]" are displayed in a balloon display above the avatar AA.

The avatar AB of the node B is displayed at the position of the relative distance Dab from the node A in the direction of the back face direction (approximately 315 degrees) of the node A such that the front face direction pb thereof is displayed in the direction of approximately 180 degrees, and at a lower portion of the avatar AB, a non-directional filter Nfb of a right circle is displayed as directional filter index information that the node B has. Further, at an upper portion of the avatar AB, the node name "node B" and the position information "coordinate values [xb, yb, zb]" are displayed in a balloon.

The avatar AC of the node C is displayed at the position of the relative distance Dac from the node A in the direction of the front face direction (approximately 135 degrees) of the node A such that the front face direction pc thereof is displayed in the direction of approximately 270 degrees, and at a lower portion of the avatar AC, a non-directional filter Nfc of a right circle is displayed as directional filter index information that the node C has. Further, at an upper portion of the avatar AC, the node name "node C" and the position information "coordinate values [xc, yc, zc]" are displayed in a balloon.

The avatar AN of the node N is displayed at the position of the relative distance Dan from the node A in the direction approximately 45 degrees of the node A such that the front face direction pn thereof is displayed in the direction toward the node A (in the direction of approximately 225 degrees), and at a lower portion of the avatar AN, a non-directional filter Nfb of a right circle is displayed as directional filter index information which the node N has. Further, at an upper portion of the avatar AN, the node name "node N" and the position information "coordinate values [xn, yn, zn]" are displayed in a balloon.

It is to be noted that, in the example of FIG. 12, the relative distances between the node A and the other nodes have a relationship of Dac>Dab>Dan.

As described above, since the connection priority degree list registered in the storage section 22, that is, the calculated connection priority degrees, are displayed together with characteristic information on the monitor, the user "a" of the node A can immediately discriminate an effect by a change of direction information of the node from the action inputting section 26 by causing the action inputting section 26 to operate based on the displayed connection priority degree list. Consequently, the user "a" can adjust the connection priority degrees of the nodes readily.

Further, even if the user does not know the positions of the nodes or other information of the nodes in advance, the user can simply grasp the positions or information of the nodes based on the displayed connection priority degree list.

Now, the connection priority degree setting process of the terminals 1 is described with reference to a flow chart of FIG. 13.

The user "a" who operates the terminal 1-1 operates the information inputting section 27 formed from a mouse and so forth to input an instruction to start communication to the terminal 1-1 using an application or the like for performing a chat among a plurality of nodes in order to mutually communicate sound data with the terminal 1-2 of the node B and the terminal 1-3 of the node N through the external communication line 11-2. At this time, as occasion demands, the user "a" inputs, for example, spatial information of objects with which communication should be performed, connection establishment indices representative of degrees with which a node issues a request for communication with any other node, and directional filter indices representative of connection establishment indices to various directions from the node.

The information inputting section 27 inputs an operation signal representative of an operation thereof by the user to the characteristic information setting section 52 and the space information setting section 53. The characteristic information setting section 52 supplies the ID information, connection establishment index information, directional filter index information and so forth of the node A to the information acquisition control section 54 and notifies the information acquisition control section 54 of starting of communication in accordance with the instruction of the user "a" inputted thereto from the information inputting section 27. The space information setting section 53 supplies information of a space to be used as a reference space to the space information management section 56 in accordance with the instruction of the user "a" inputted thereto from the information inputting section 27.

The information acquisition control section 54 stands by until a notification of starting of communication is inputted thereto from the characteristic information setting section 52. When the connection establishment index information and directional filter index information of the node A are inputted and a notification of starting of communication is inputted to the information acquisition control section 54, the information acquisition control section 54 decides that an instruction to start communication is received and starts the connection priority degree setting process of FIG. 13.

At step S21, the information acquisition control section 54 controls the characteristic information receiver section 62 to receive signals (radio waves) signaled from the GPS satellites 3 toward the earth to acquire position information of the self node and supply the position information to the space information setting section 53. Then, the processing advances to step S22. It is to be noted that, at this time, the characteristic information receiver section 62 may otherwise acquire position information from a local positioning system of the base station 5 through the characteristic information communication line 11-1.

At step S22, the space information management section 56 determines the position information of the user "a" inputted from the information acquisition control section 54 as a reference position based on the reference space information from the space information setting section 53 and defines a reference space of the node A with reference to the reference position. Then, the processing advances to step S23.

At step S23, the information acquisition control section 54 controls the direction detection section 51 to set the direction at present of the node A based on the direction information of the user "a" (node A) inputted from the action inputting section 26 and supply the set direction at present of the node A to the space information management section 56 so that the direction at present of the node A may be reflected on the reference space of the node A. Thereafter, the processing advances to step S24.

At step S24, the space information management section 56 acquires the ID information, connection establishment index information, and directional filter index information of the terminal 1-1 (node A) supplied thereto from the information acquisition control section 54. Thereafter, the processing advances to step S25.

At step S25, the information acquisition control section 54 controls the characteristic information sender section 61 to issue a request for the characteristic information (position information, direction information, ID information, connection establishment index information, directional filter index information and so forth) to each of the nodes of the opposite parties of communication through the characteristic information communication line 11-1. Further, the information acquisition control section 54 controls the characteristic information receiver section 62 to acquire the characteristic information transmitted thereto from the nodes of the opposite parties of communication through the characteristic information communication line 11-1 and supply the received characteristic information to the space information management section 56. Then, the processing advances to step S26.

In particular, each of the terminals 1-2 and 1-3 of the nodes of the opposite parties of communication acquires position information of the self node (opposite party of communication), for example, in a similar manner as in the process at step S21 in advance and acquires the ID information, connection establishment index information, and directional filter index information of the self node in a similar manner as in the process at step S24. Thus, such characteristic information is transmitted from the terminals 1-2 and 1-3 to the terminal 1-1 through the characteristic information communication line 11-1 in response to the request from the characteristic information sender section 61. It is to be noted that the terminals 1-2 and 1-3 of the nodes of the opposite parties of communication may otherwise acquire characteristic information when the request from the characteristic information sender section 61 is received.

It is to be noted that, for example, if a request for characteristic information of the terminal 1-1 (node A) is issued by the process at step S25 executed by the terminals 1-2 and 1-3, then the information acquisition control section 54 controls the characteristic information sender section 61 to transmit the position information received from the characteristic information receiver section 62, the ID information, connection establishment index information, and directional filter index information of the node A received from the characteristic information setting section 52, and the direction information of the node A received from the direction detection section 51 to the terminals 1-2 and 1-3 through the characteristic information communication line 11-1.

When the characteristic information of the nodes of the opposite parties of communication from the information acquisition control section 54 is received, the space information management section 56 disposes, at step S26, the acquired information in the reference space of the node A and supplies the reference space of the node A in which the nodes of the opposite parties of communication are disposed to the priority degree calculation section 57. Thereafter, the processing advances to step S27.

In particular, the space information management section 56 disposes the nodes in the reference space of the node A, on which the directions at present are reflected at step S23, based on the ID information, connection establishment index information and directional filter index information of the terminals 1 (nodes) acquired at step S24 and the characteristic information of the nodes of the opposite parties of communication acquired at step S25 so that the connection establishment information and the directional filter index information are reflected on the reference space of the node A. Then, the space information management section 56 stores and manages the reference space of the node A in which the nodes of the opposite parties of communication are disposed and on which the information is reflected, and supplies the reference space of the node A to the priority degree calculation section 57.

At step S27, the priority degree calculation section 57 determines relative positional relationships between the self node and the opposite parties of communication based on the reference space of the node A supplied thereto from the space information management section 56 (that is, using the expressions (1) and (2)). Thus, the connection priority degrees from the self node (node A) to the other nodes (node B, node N, and so forth) are calculated. Thereafter, the processing advances to step S28, at which the characteristic information regarding the nodes and an analysis result of the connection priority degrees are registered in a coordinated relationship with the ID information as a connection priority degree list into the storage section 22. Then, the connection priority degree setting process is ended.

Since the connection priority degree list is registered into the storage section 22 in such a manner as described above, the output control section 24 decides that a connection priority degree list is registered, and produces screen data and so forth for notifying the user of the information of the connection priority degree list of the nodes. Then, the output control section 24 controls the input/output interface 25 to output a screen corresponding to the image data to the monitor which forms the outputting section 28. Consequently, information of such a connection priority degree list (hereinafter referred to also as notification screen of connection priority degrees) as described hereinabove with reference to FIG. 12 is displayed on the monitor.

Accordingly, the user "a" in which the action inputting section 26 is incorporated can refer to the notification screen of the connection priority degrees displayed on the monitor to perform such a very natural action of the node A which turns to the direction toward a node to which a connection should be established. The user "a" can set a desired connection priority degree by changing the connection establishment index and the directional filter index of the node A or the like through the information inputting section 27.

Also the priority degree information acquisition section 82 of the internal communication processing section 23 issues, if a connection priority degree list is registered into the storage section 22, a notification that a connection priority degree list has been registered to the communication control section 81. Consequently, the internal -communication processing section 23 controls the communication balance between the terminals 1-2 and 1-3 in the inside of the terminal 1-1 as hereinafter described in response to the connection priority list registered in the storage section 22.

Figure 13:
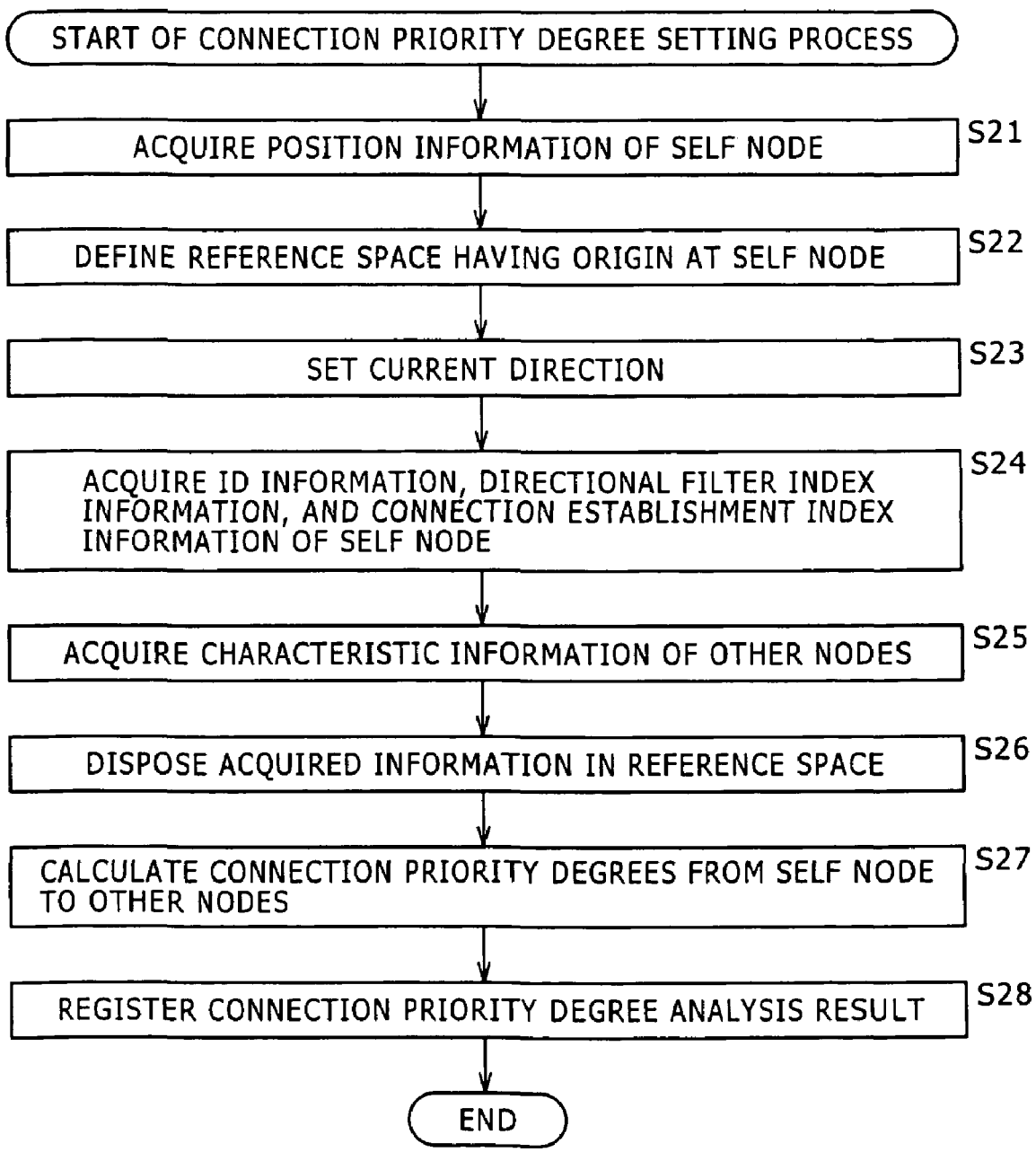
FIG. 13 is a flow chart illustrating a connection priority degree setting process of the connection priority degree analysis section of FIG. 2.
Figure 14:
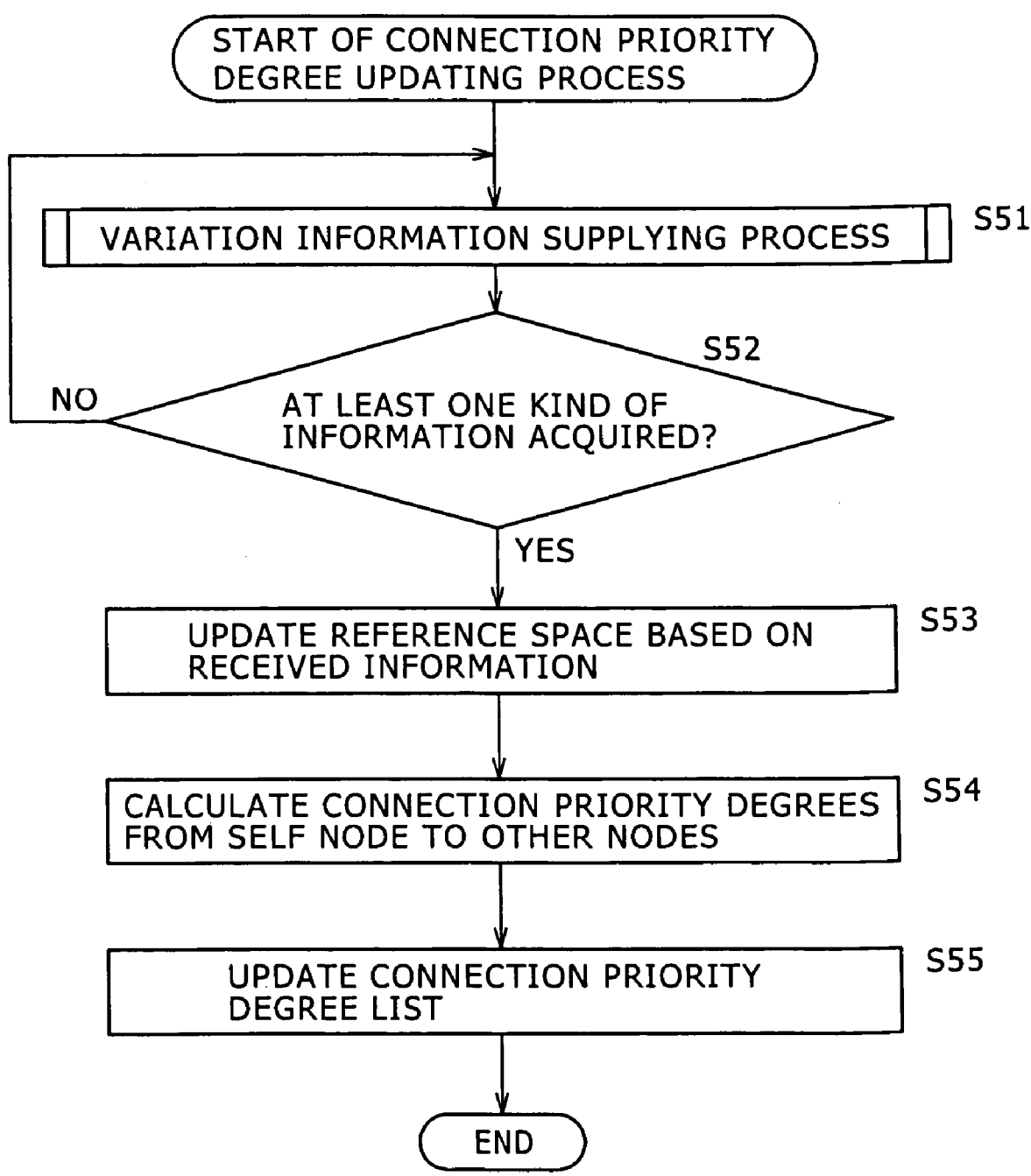
FIG. 14 is a flow chart illustrating a connection priority degree updating process of the connection priority degree analysis section of FIG. 2.

Now, a connection priority degree updating process of the connection priority degree list registered by the connection priority degree setting process of FIG. 13 is described with reference a flow chart of FIG. 14. It is to be noted that the connection priority degree updating process of FIG. 14 is carried out repetitively until the space information setting section 53 notifies the information acquisition control section 54 of ending of communication based on an operation signal indicating ending of communication of the user "a" inputted from the information inputting section 27 and the information acquisition control section 54 decides that the communication is ended.

At step S28 of FIG. 13, the connection priority degree list is registered, and, for example, the notification screen of the connection priority degrees for notifying the user of information of the connection priority degree list of the nodes is displayed on the monitor.

The user "a" performs, for example, communication of sound data with the other nodes through the external communication line 11-2 and refers to the notification screen of the connection priority degree displayed on the monitor to perform such a very natural action as, for example, turning to the direction of a node to which a connection should be established. It is to be noted that the action inputting section 26 formed from a gyro sensor, an acceleration sensor, or the like is, for example, incorporated in the user "a" and inputs the position information or direction information of the node A in response to the action of the user "a".

For example, the user "a" refers to the notification screen of the connection priority degree displayed on the monitor and issues an instruction to change the connection establishment index, directional filter index, or the like of the node A through the information inputting section 27.

For example, the user "b" of an opposite party of communication in which the action inputting section 26 of the terminal 1-2 is incorporated refers to the notification screen of the connection priority degree displayed on the monitor of the terminal 1-2 similarly as in the case of the terminal 1-1 and performs a very natural action of, for example, turning to a node to which a connection should be established or issues an instruction to change the connection establishment index, directional filter index, or the like of the node B through the information inputting section 27 of the terminal 1-2. In this instance, the terminal 1-2 transmits the changed characteristic information of the node B to the terminal 1-1 through the characteristic information communication line 11-1 similarly as in the process at step S72, S74, or S76 of FIG. 15 hereinafter described.

In response to the characteristic information, the connection priority degree analysis section 21 executes a change information supplying process at step S51 of FIG. 14. The change information supplying process is described below with reference to a flow chart of FIG. 15.

At step S71, the direction detection section 51 decides from the position information or direction information of the node A inputted from the action inputting section 26 with reference to the direction or position at present of the node A set at step S23 of FIG. 13 whether or not a change of the direction or position of the node A is detected. If it is decided that a change of the direction or position of the node A is detected, then the processing advances to step S72, at which the direction detection section 51 supplies the position information or direction information of the node A inputted from the action inputting section 26 to the space information management section 56 through the information acquisition control section 54. Then, the processing advances to step S73.

It is to be noted that, at this time, the information acquisition control section 54 controls the characteristic information sender section 61 to transmit the position information or direction information of the node A with regard to which a change is detected also to the terminal 1-2 or the terminal 1-3 through the characteristic information communication line 11-1.

If it is decided at step S71 from the inputted position information or direction information of the node A that a change of the direction or position of the node A is not detected, then the process at step S72 is skipped and the processing advances to step S73.

At step S73, the characteristic information setting section 52 decides based on the operation signal of the user "a" inputted through the information inputting section 27 whether or not an instruction to change the correction establish index information or directional filter index information of the node A is inputted. If it is decided that an instruction to change the correction establish index information or directional filter index information of the node A is inputted through the information inputting section 27, then the characteristic information setting section 52 changes the correction establish index information or directional filter index information of the node A, whereafter the processing advances to step S74. At step S74, the characteristic information setting section 52 supplies the changed correction establish index information or directional filter index information of the node A to the space information management section 56 through the information acquisition control section 54, whereafter the processing advances to step S75.

It is to be noted that, at this time, the information acquisition control section 54 controls the characteristic information sender section 61 to transmit the changed correction establish index information or directional filter index information of the node A also to the terminal 1-2 or 1-3 through the characteristic information communication line 11-1.

If it is decided at step S73 that an instruction to change the connection establish index information or directional filter index information of the node A is not inputted, then the process at step S74 is skipped, and the processing advances directly to step S75.

For example, if the characteristic information of the node B is changed as described hereinabove, then the terminal 1-2 transmits the changed characteristic information of the node B to the terminal 1-1 through the characteristic information communication line 11-1.

Thus, the characteristic information receiver section 62 decides at step S75 whether or not characteristic information is received from any other node. If it is decided that characteristic information is received from some other node, then the processing advances to step S76. At step S76, the characteristic information receiver section 62 supplies the characteristic information received from any other node to the space information management section 56. Thereafter, the processing returns to step S51 of FIG. 14 and then advances to step S52.

If it is decided at step S75 that characteristic information is not received from any other node, then the process at step S76 is skipped and the processing returns to step S51 of FIG. At step S52 of FIG. 14, the space information management section 56 decides whether or not at least one of the position information, direction information, correction establish index information, and directional filter index information of the node A as well as characteristic information of the other nodes is received.

If the space information management section 56 decides at step S52 that any one of the position information, direction information, correction establish index information, and directional filter index information of the node A as well as characteristic information of the other nodes is not received, then the processing returns to step S51 so that the processes at steps beginning with step S51 are repeated. In other words, the process at step S51 is repeated until after it is decided at step S52 that at least one of the position information, direction information, correction establish index information, and directional filter index information of the node A as well as characteristic information of the other nodes is received.

On the other hand, if it is decided at step S52 that at least one of the position information, direction information, correction establish index information, and directional filter index information of the node A as well as characteristic information of the other nodes is received, then the processing advances to step S53. At step S53, the space information management section 56 changes the disposed positions and so forth of the nodes disposed in the reference space of the node A based on the information supplied thereto to update the stored reference space of the node A and supplies the reference space to the priority degree calculation section 57. Thereafter, the processing advances to step S54.

At step S54, the priority degree calculation section 57 uses the reference space of the node A supplied thereto from the space information management section 56 (that is, the expressions (1) and (2) given hereinabove) to determine relative positional relationships between the self node and the opposite parties of communication to calculate connection priority degrees from the self node (node A) to the other nodes (node B, node N, and so forth). Then, the processing advances to step S55, at which the priority degree calculation section 57 updates the connection priority degree list resisted in the storage section 22 and representing the connection priority degree analysis results registered in the storage section 22 in a coordinated relationship with the ID information. Thereafter, the processing advances to step S56.

Consequently, the output control section 24 newly produces screen data and so forth for notifying the user of the connection priority degrees of the nodes and updates and outputs the screen corresponding to the screen data through the input/output interface 25.

Since characteristic information of the self node and characteristic information of the nodes of the opposite parties of communication are acquired and used to determine relative positional relationships between the self node and the opposite parties of communication as described above, the connection priority degrees can be used to perform such control as weighting in communication with a plurality of opposite parties of communication. Consequently, even if the number of nodes of the opposite parties of communication increases, an optimum communication quality can be obtained.

Further, since the connection priority degrees are changed at any time in response to a change of the position information or direction information of any node or to a connection establishment index and a directional filter index, even if the state of any node changes, communication control suitable for the situation can be performed using the connection priority degrees.

Furthermore, the user can change a connection priority degree, that is, change a process to be controlled in response to a connection priority degree only by a natural and simple action such as turning back or by issuing an instruction of a direction using a direction indicating button provided on a remote controller or the like.

Now, a process of the internal communication processing section 23, which is executed in response to the connection priority degree described above, is described.

Figure 16:
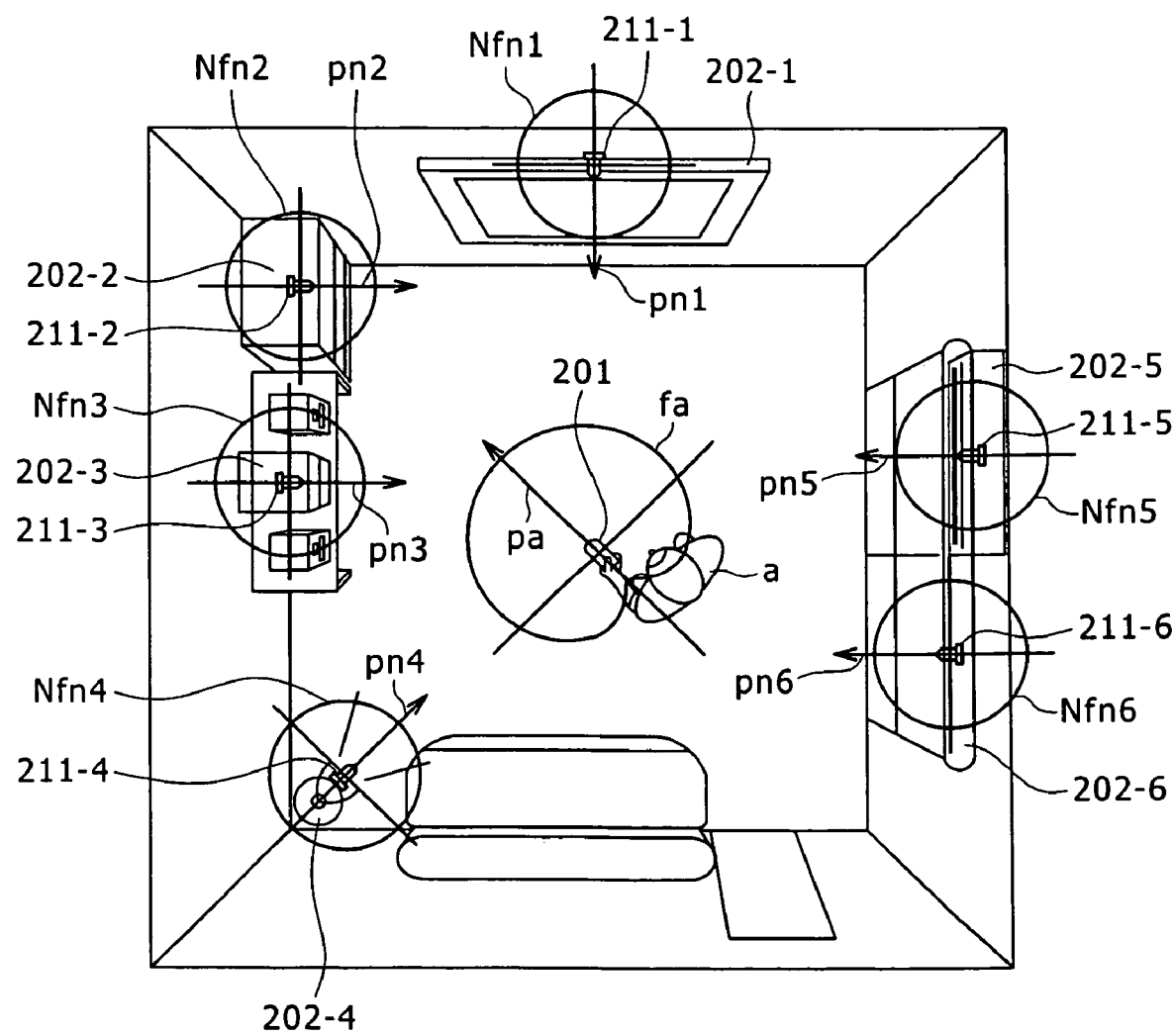
FIG. 16 is a view showing another example of a configuration of a communication system according to an embodiment of the present invention.

FIG. 16 shows another example of the configuration of the communication system to which the present invention is applied. It is to be noted that the controlling terminal 201 and the controlled terminals 202-1 to 202-6 have a basically similar configuration to that of the terminal 1 of FIG. 1, and detailed description of the similar configuration is suitably omitted herein to avoid redundancy.

Though not shown in FIG. 16, the controlling terminal 201 and the controlled terminals 202-1 to 202-6 are connected to a network 2 (in the example of FIG. 16, a radio communication network) configured similarly to that of FIG. 1. Also a base station 5 and so forth are connected to the network 2. The base station 5 detects the position of the controlling terminal 201 and the controlled terminals 202-1 to 202-6, in each of which a radio IC tag (not shown) is embedded, and provides position information according to a local positioning system or the like.

According to the communication system, the controlling terminal 201 acquires characteristic information of the controlling terminal 201 itself (a terminal itself is hereinafter referred to as self terminal) and the opposite parties of communication through a characteristic information communication line 11-1 in an internal space of a room and transmits connection priority degrees of a plurality of terminals 1 calculated based on the characteristic information to the controlled terminals 202-1 to 202-6. Consequently, the controlled terminals 202-1 to 202-6 present information according to the connection priority degrees of the controlled terminals 202-1 to 202-6 themselves and perform control corresponding to control information data transmitted thereto from the controlling terminal 201 through an external communication line 11-2 in accordance with a balance (rates) according to the connection priority degrees of the controlled terminals 202-1 to 202-6 themselves.

It is to be noted that, where there is no necessity to individually identify the controlled terminals 202-1 to 202-6 from one another, each of them is generally referred to simply as controlled terminal 202. Further, each of a combination of the controlling terminal 201 and the user "a" and the controlled terminals 202 is suitably referred to as node similarly as in the case of FIG. 1.

In the example of FIG. 16, the user "a" carries the controlling terminal 201 and would operate the information inputting section 27 of the controlling terminal 201 with the front face direction pa of the controlling terminal 201 directed toward a controlled terminal 202 disposed in the room internal space to communicate with the controlled terminal 202 by radio to control a function of the controlled terminal 202.

It is to be noted that the communication system of FIG. 16 is configured such that the controlled terminals 202 have, as control modes thereof, a highest priority apparatus selection mode and a priority balance adjustment mode. In the highest priority apparatus selection mode, only that of the controlled terminals 202 which has the highest connection priority degree performs a process based on an output of presentation information or control from the controlling terminal 201. In the priority balance adjustment mode, each of the controlled terminals 202 performs a process based on an output of presentation information weighted in response to the connection priority degree thereof or control from the controlling terminal 201. Thus, the user "a" can operate the controlling terminal 201 to set one of the control modes.

The controlling terminal 201 is formed from, for example, a remote controller or the like and has directional filter information having a directionality to the front face direction pa (that is, of the front face directed type) as indicated by a directional filter fa.

The controlling terminal 201 includes a connection priority degree analysis section 21, a storage section 22, an internal communication processing section 23, an output control section 24, an input/output interface 25, an action inputting section 26, an information inputting section 27, and an outputting section 28 similarly to the terminal 1. The controlling terminal 201 has a radio IC tag not shown embedded therein.

The connection priority degree analysis section 21 of the controlling terminal 201 acquires position information from the base station 5 through the characteristic information communication line 11-1 and acquires characteristic information of the opposite parties of communication from the controlled terminals 202. Then, the connection priority degree analysis section 21 of the controlling terminal 201 disposes (reflects) the characteristic information of the opposite parties of communication in a reference space defined with reference to the position information of the controlling terminal 201 itself. Further, the connection priority degree analysis section 21 of the controlling terminal 201 determines relative positions or relationships between the controlling terminal 201 itself and the opposite parties of communication, calculates the connection priority degrees in communication between the controlled terminal itself and the controlled terminals 202, and registers the calculated connection priority degrees and characteristic information as a connection priority degree list into the storage section 22. Further, the connection priority degree analysis section 21 of the controlling terminal 201 transmits the connection priority degree list to the controlled terminals 202 through the characteristic information communication line 11-1. Consequently, the connection priority degree list calculated by the controlling terminal 201 is shared by the controlling terminal 201 and the controlled terminals 202.

Further, if the information of at least one of the characteristics varies, then the connection priority degree analysis section 21 of the controlling terminal 201 re-calculates the connection priority degrees and updates the connection priority degree list registered in the storage section 22 with the calculated connection priority degrees and besides transmits the connection priority degree list to the controlled terminals 202 through the characteristic information communication line 11-1. In particular, the connection priority degree analysis section 21 of the controlling terminal 201 operates in this manner when it detects a variation of the direction or the position of the self terminal inputted from the action inputting section 26 based on an action or an operation of the user "a" during communication with any of the controlled terminals 202, or when connection establishment index information or directional filter information is changed in accordance with an instruction from the information inputting section 27, or else when changed characteristic information is received from the controlled terminal 202 of an opposite party of communication.

The internal communication processing section 23 of the controlling terminal 201 weights a rate of control inputted from the information inputting section 27 by the user in response to a control mode with the connection priority degrees of the controlled terminals 202 stored in the storage section 22 and transmits control information data corresponding to the weighted control to the controlled terminals 202 through the external communication line 11-2. Further, if presentation information is received from any controlled terminal 202 through the external communication line 11-2, then the internal communication processing section 23 of the controlling terminal 201 outputs corresponding presentation information from the outputting section 28 through the output control section 24.

Each of the controlled terminals 202-1 to 202-6 is formed from, for example, a television receiver, an audio apparatus, an air conditioner apparatus, an automatic shutter apparatus, an illumination apparatus, or a video recording apparatus which are controlled with control information data from the controlling terminal 201 and is disposed at a predetermined position in the room internal space.

The controlled terminals 202-1 to 202-6 have non-directional directional filter information as indicated by non-directional filters Nfn1 to Nfn6, respectively, and each of indicators 211-1 to 211-6 each formed from a light emitting element is disposed at a central portion of an upper portion of each controlled terminal 202. It is to be noted that, where there is no necessity to individually identify the non-directional filters Nfn1 to Nfn6 and the indicators 211-1 to 211-6 from each other, each of them is generally referred to simply as non-directional filter Nfn and indicator 211, respectively.

In particular, the controlled terminal 202-1 is formed from a television receiver and disposed at an upper portion of a wall of the room internal space with a front face direction pn1 thereof directed downwardly in FIG. 16. The controlled terminal 202-2 is formed from a video recording apparatus and disposed at a left upper corner in FIG. 16 in the room internal space with a front face direction pn2 thereof directed rightwardly in FIG. 16. The controlled terminal 202-3 is formed from an audio apparatus and disposed leftwardly alongside the controlled terminal 202-2 in FIG. 16 in the room internal space with a front face direction pn3 thereof directed rightwardly upwards in FIG. 16.

The controlled terminal 202-4 is formed from an illumination apparatus and disposed at a left lower corner in FIG. 16 of the room internal space with a front face direction pn4 thereof directed rightwardly upwards in FIG. 16. The controlled terminal 202-5 is formed from an air conditioner apparatus and disposed on a wall on the right side in FIG. 16 of the room internal spaced with a front face direction pn5 thereof directed leftwardly in FIG. 16. The controlled terminal 202-6 is formed from an automatic shutter apparatus and disposed on the right side wall in FIG. 16 of the room internal space the neighborhood of (downwardly in FIG. 16 of) the controlled terminal 202-5 with a front face direction pn6 thereof directed leftwardly in FIG. 16.

Also each of the controlled terminals 202 includes, similarly to the terminals 1, a connection priority degree analysis section 21, a storage section 22, an internal communication processing section 23, an output control section 24, an input/output interface 25, an action inputting section 26, an information inputting section 27, and an outputting section 28. A radio IC tag not shown is embedded in the inside of each of the controlled terminals 202.

The connection priority degree analysis section 21 of the controlled terminal 202 acquires the position information of the self terminal from the base station 5 through the characteristic information communication line 11-1 and transmits the characteristic information of the self terminal to the controlling terminal 201. Further, the connection priority degree analysis section 21 receives a connection priority degree list transmitted from the controlling terminal 201 and including the connection priority degrees, characteristic information, and so forth of the controlling terminal 201 and the controlled terminals 202 and registers the received connection priority degree list into the storage section 22.

The internal communication processing section 23 of the controlled terminal 202 refers to the connection priority degree list registered in the storage section 22 based on a currently set control mode to display presentation information for presenting the connection priority degree of the self terminal or execute an internal function process based on control according to received control information data. It is to be noted that the user "a" would observe presentation information outputted from the indicator 211 on the controlled terminal 202 to confirm whether or not the controlled terminal 202 is enabled for operation. In other words, the presentation information is information representing that the controlled terminal 202 can be controlled by the controlling terminal 201.

If the control mode is the highest priority apparatus selection mode, then the internal communication processing section 23 of the controlled terminal 202 produces presentation information when the connection priority degree of the self terminal is highest among the connection priority degrees of the control object terminals included in the connection priority degree list and causes the indicator 211 to output the produced presentation information. Further, the internal communication processing section 23 of the controlled terminal 202 receives control information data from the controlling terminal 201 through the external communication line 11-2 and executes an internal function process based on control according to the received control information data.

On the other hand, where the control mode is the priority balance adjustment mode, the internal communication processing section 23 of the controlled terminal 202 produces presentation information according to the connection priority degree of the self terminal and causes the indicator 211 to output the produced presentation information. Further, the internal communication processing section 23 of the controlled terminal 202 receives a control signal from the controlling terminal 201 through the external communication line 11-2 and weights a rate of control according to the received control information data with the connection priority degree registered in the storage section 22. Then, the internal communication processing section 23 of the controlled terminal 202 executes an internal function process based on the weighted rate.

It is to be noted that the weighting for the rate of control may be performed only by the controlling terminal 201 side or only by the controlled terminal 202 side. In other words, since the controlling terminal 201 and the controlled terminal 202 share the connection priority degree list, the same result is obtained by whichever one of the controlling terminal 201 and the controlled terminal 202 the weighting is performed.

As described above, in the communication system of FIG. 16, since each controlled terminal 202 has a non-directional filter Nfn and is not moved in the room internal space unless it is moved by the user, the connection priority degree of each of the controlling terminal 201 and the controlled terminals 202 changes in response to the position information and the direction information of the controlling terminal 201 which has a directional filter fa of the front face directed type. Accordingly, the user "a" can set a connection priority degree by changing the direction or the position of the controlling terminal 201. In other words, one of the controlled terminals 202 which is to make an object of control can be selected by changing the direction or the position of the controlling terminal 201.

It is to be noted that, since, in the example of FIG. 16, only one controlling terminal 201 is shown, the communication system need not include only one controlling terminal 201 but may include a plurality of controlling terminals 201.

Figure 17:
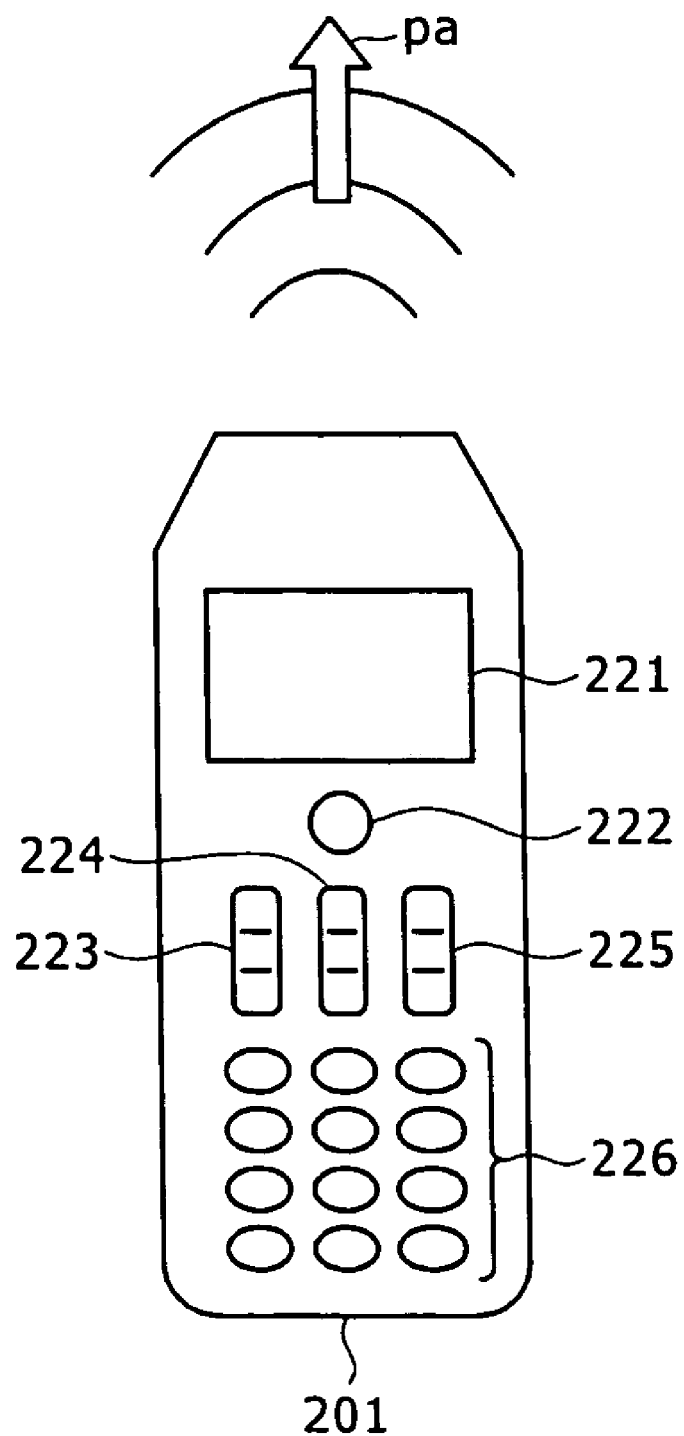
FIG. 17 is a view showing an example of a configuration of an appearance of a controlling terminal of FIG. 16.

FIG. 17 shows an example of a configuration of a controlled terminal of FIG. 16.

The controlling terminal 201 is formed from a remote controller having directional filter information (directional filter fa) of the front face directed type having a directionality in the front face direction pa. In other words, the directional index of the controlling terminal 201 is highest in the azimuth of the front face direction pa.

The controlling terminal 201 includes an LCD (Liquid Crystal Display) section 221, which forms the outputting section 28, a power supply button 222, a volume adjustment dial 223, a channel selection dial 224, a balance adjustment dial 225, and a channel selection key section 226, which form the information inputting section 27.

The LCD section 221 displays a screen of the connection priority degree list of FIG. 12, control information, and so forth. The power supply button 222 is used by the user to issue an instruction to turn on or off the power supply to the controlling terminal 201. The volume adjustment dial 223 is used by the user to issue an instruction to adjust a volume for the sound, brightness, or temperature of a controlled terminal 202.

More particularly, the volume adjustment dial 223 may be used to adjust the sound volume or the brightness of a television receiver, the sound volume of an audio apparatus, the reproduction speed of a video recording apparatus, the brightness of an illumination apparatus, the wind force or the temperature of an air conditioner apparatus, or the opening or closing degree of an automatic shutter apparatus.

The channel selection dial 224 is used by the user to issue an instruction to select a channel of a controlled terminal 202 or the like. The balance adjustment dial 225 is used by the user to issue an instruction of a balance regarding by which degree a controlling instruction to the controlled terminal 202 should be executed. In other words, the balance adjustment dial 225 is used to set a connection establishment index indicative of a rate at which the node issues a request for communication with other nodes or to set directional filter coefficient information indicative of a connection establishment index to various azimuths from the node. The channel selection key section 226 includes a plurality of keys for issuing an instruction to select a channel of the controlled terminal 202 or the like.

In other words, the user "a" can adjust volume elements of the controlled terminals 202 by operating the volume adjustment dial 223. Further, the user "a" can adjust the connection priority degrees (communication balance) of the controlled terminals 202 by changing the direction or the position of the controlling terminal 201 or by operating the balance adjustment dial 225.

Figure 18:
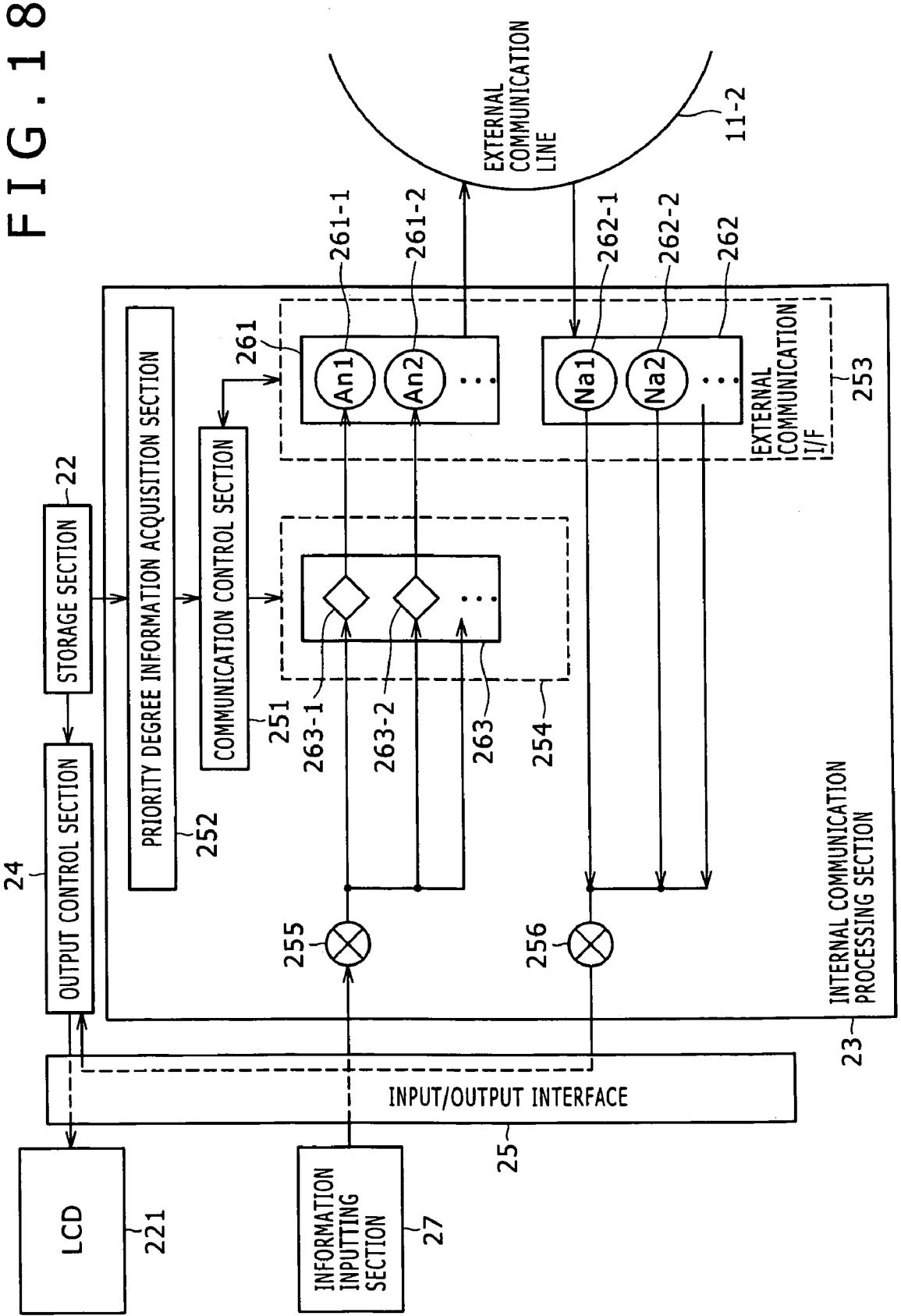
FIG. 18 is a block diagram showing an example of a detailed configuration of an internal communication processing section of the controlling terminal of FIG. 16.

FIG. 18 shows an example of a detailed configuration of the internal communication processing section 23 of the controlling terminal 201. Referring to FIG. 18, the internal communication processing section 23 of the controlling terminal 201 shown includes a communication control section 251, a priority degree information acquisition section 252, an external communication interface (I/F) 253, a balance adjustment section 254, a distributor 255, and a mixer 256. The internal communication processing section 23 adjusts the rate of control corresponding to an instruction of the user from the information inputting section 27 in accordance with the connection priority degrees and transmits the adjusted connection priority degrees to the controlled terminals 202.

The communication control section 251 controls the external communication interface 253 in accordance with an instruction of the user in response to supply of a control signal inputted from the information inputting section 27 or information of the connection priority degree list from the priority degree information acquisition section 252 to communicate with the controlled terminals 202 of the opposite parties of communication through the external communication line 11-2. Further, the communication control section 251 controls the balance adjustment section 254 in response to the set control mode and the information of the connection priority degree list from the priority degree information acquisition section 252 to adjust the balance of control corresponding to a control signal inputted from the information inputting section 27 in response to the connection priority degree of each controlled terminals 202 from the priority degree information acquisition section 252.

The priority degree information acquisition section 252 supervises the connection priority degree list of the storage section 22 and acquires, if it decides that the connection priority degree list is changed (updated), the information of the connection priority degree list. Then, the priority degree information acquisition section 252 supplies the acquired connection priority degree list to the communication control section 251.

The external communication interface 253 includes a data sender section 261 and a data receiver section 262 and establishes a connection to the controlled terminal 202 of each opposite party of communication through the external communication line 11-2 to transmit and receive various data under the control of the communication control section 251. The data sender section 261 transmits control information data from the balance adjustment section 254 to a corresponding controlling terminal 201 through the external communication line 11-2. The data receiver section 262 receives presentation information data from any controlled terminal 202 through the external communication line 11-2 and supplies the received presentation information data to the output control section 24 through the mixer 256 and the input/output interface 25.

The output control section 24 receives the presentation information data through the input/output interface 25 and outputs presentation information corresponding to the presentation information data to the LCD section 221. It is to be noted that, in this instance, the output control section 24 may output the presentation information in a superposed relationship, for example, with the notification screen of the connection priority degrees shown in FIG. 12.

The balance adjustment section 254 includes a control information adjustment section 263. Where the control mode is the priority balance adjustment mode, the control information adjustment section 263 adjusts the rate of control inputted from the information inputting section 27 through the distributor 255 so that the inputted rate of control may exhibit a balance in accordance with the connection priority degree under the control of the communication control section 251. Then, the balance adjustment section 254 supplies the thus adjusted control as control information data to the data sender section 261.

It is to be noted that, where the control mode is the highest priority apparatus selection mode, the balance adjustment section 254 adjusts the rate of control as occasion demands only with regard to the highest connection priority degree and supplies resulting control information data to the data sender section 261 under the control of the communication control section 251. However, the balance adjustment section 254 does not perform such adjustment for the other connection priority degrees and supplies no control information data to the data sender section 261.

It is to be noted that, in the internal communication processing section 23 of FIG. 18, the data sender section 261 is configured separately as a data sender section 261-1, which transmits control information data An1, for example, to the controlled terminal 202-1, another data sender section 361-2, which transmits control information data An2 to the controlled terminal 202-2, . . . corresponding to the opposite parties of communication. The data receiver section 262 is configured separately as a data receiver section 262-1, which receives presentation information data Na1, for example, from the controlled terminal 202-1, another data receiver section 262-2, which receives presentation information data Na2 from the controlled terminal 202-2, . . . corresponding to the opposite parties of communication.

The control information adjustment section 263 is configured separately as a control information adjustment section 263-1, which adjusts the rate of control of control information data An1, for example, to the controlled terminal 202-1, a control information adjustment section 263-2, which adjusts the rate of control of control information data An2 to the controlled terminal 202-2, ... corresponding to the opposite parties of communication.

In particular, the control information adjustment section 263-1 adjusts the rate of control of a control signal from the distributor 255 in accordance with the connection priority degree of the controlled terminal 202-1 and supplies the adjusted rate to the data sender section 261-1. The data sender section 261-1 transmits the control information data An1 to be supplied to the controlled terminal 202-1 to the controlled terminal 202-1 through the external communication line 11-2. The control information adjustment section 263-2 adjusts the rate of control of a control signal from the distributor 255 in accordance with the connection priority degree of the controlled terminal 202-2 and supplies the adjusted rate to the data sender section 261-2. The data sender section 261-2 transmits the control information data An2 to be supplied to the controlled terminal 202-2 to the controlled terminal 202-2 through the external communication line 11-2.

The data receiver section 262-1 receives presentation information data Na1 from the controlled terminal 202-1 through the external communication line 11-2 and supplies the received presentation information data Na1 to the mixer 256. The data receiver section 262-2 receives presentation information data Na2 from the controlled terminal 202-2 through the external communication line 11-2 and supplies the received presentation information data Na2 to the mixer 256.

The distributor 255 receives a control signal corresponding to an instruction inputted by the user from the information inputting section 27 through the input/output interface 25 and distributes corresponding control information to the control information adjustment sections 263-1, 263-2, .... The mixer 256 mixes presentation information data from the data receiver sections 262-1, 262-2, ... and supplies the mixed presentation information data to the output control section 24 through the input/output interface 25. Further, the mixer 256 outputs the mixed presentation information data to the LCD section 221 through the input/output interface 25.

FIG. 19 shows an example of a detailed configuration of the internal communication processing section 23 of a controlled terminal 202. In the internal communication processing section 23 shown in FIG. 19, the outputting section 28 connected to the input/output interface 25 includes an indicator 211 formed from a light emitting element and a speaker 295 which outputs beep sound or the like.

In the configuration of FIG. 19, the internal communication processing section 23 of the controlled terminal 202 includes a communication control section 281, a priority degree information acquisition section 282, an external communication interface 283, a balance adjustment section 284, a mixer 285, another mixer 286, and a function control section 287. The internal communication processing section 23 produces presentation information for presenting connection priority degrees to the controlling terminals 201 based on a set control mode and outputs the produced presentation information from the indicator 211. Further, the internal communication processing section 23 receives control signal data from any controlling terminal 201 and executes control corresponding to the control signal at a rate according to the set control mode and the connection priority degree to the controlling terminal 201.

The communication control section 281 controls the external communication interface 283 to communicate with the controlling terminal 201 through the external communication line 11-2 or supply ID information of the controlling terminal 201 received by the external communication interface 283 to the priority degree information acquisition section 282 so that the priority degree information acquisition section 282 may acquire information of the connection priority degree list calculated by the controlling terminal 201 corresponding to the ID information from the storage section 22.

Further, the communication control section 281 controls production of presentation information according to the connection priority degrees by the balance adjustment section 284 based on a set control mode (highest priority apparatus selection mode or priority balance adjustment mode) and information of the connection priority degree list from the priority degree information acquisition section 282 (connection priority degrees, direction information, and so forth). Further, the communication control section 281 controls the balance adjustment section 284 to adjust the rate (balance) of control in accordance with the connection priority degree between the controlling terminal 201 and the self terminal from the priority degree information acquisition section 282.

The priority degree information acquisition section 282 supervises the connection priority degree list of the storage section 22 and supplies, if a connection priority degree list is registered or updated, information of the connection priority degree list to the communication control section 281. Further, the priority degree information acquisition section 282 acquires information of the connection priority degree list of the controlling terminal 201 corresponding to the ID information supplied from the communication control section 281 (connection priority degree list calculated by the controlling terminal 201) and supplies the acquired information of the connection priority degree list to the communication control section 281.

The external communication interface 283 includes a data sender section 291 and a data receiver section 292. The external communication interface 283 establishes a connection to the controlled terminal 202 of any opposite party of communication through the external communication line 11-2 and transmits and receives various data to and from the controlled terminal 202 under the control of the communication control section 281.

The data sender section 291 transmits presentation information data produced by a presentation information production section 293 to the corresponding controlling terminal 201 through the external communication line 11-2 under the control of the communication control section 281. The data receiver section 292 receives control information data through the external communication line 11-2 and supplies the received control information data to a control information adjustment section 294. Further, the data receiver section 292 extracts ID information of a terminal added to the received control information data and supplies the extracted ID information to the communication control section 281.

The balance adjustment section 284 includes a presentation information production section 293 and a control information adjustment section 294 and performs control according to information of the connection priority degree list under the control of the communication control section 281. It is to be noted that, where the control mode is the highest priority apparatus selection mode and the connection priority degree is not highest, then the balance adjustment section 284 does not execute any process.

The presentation information production section 293 produces presentation information according to the control mode and the connection priority degree and supplies the produced presentation information data to the mixer 285 under the control of the communication control section 281. It is to be noted that, in such a case that the distance between the controlling terminal 201 and the controlled terminal 202 is great, the balance adjustment section 284 supplies the produced presentation information data to the data sender section 291 as occasion demands.

The control information adjustment section 294 adjusts the rate of control corresponding to control information data from the data receiver section 296 in response to the connection priority degree of the controlled terminal 202-1 and supplies the adjusted rate to the mixer 286.

In the example of FIG. 19, the controlling terminals 201 of the communication system include the controlling terminals 201-1 and 201-2, and the data sender section 291 is configured separately, for example, as a data sender section 291-1, which transmits presentation information data Na1 to the controlling terminal 201-1, and another data sender section 291-2, which transmits presentation information data Nb1 to the controlling terminal 201-2, accordingly. Similarly, the data receiver section 292 is configured separately, for example, as an data receiver section 292-1, which receives control information data An1 from the controlling terminal 201-1, and another data receiver section 292-2, which receives control information data Bn1 from the controlling terminal 201-2, corresponding to the opposite parties of communication.

Further, the presentation information production section 293 is configured separately, for example, as a presentation information production section 293-1, which produces presentation information data Na1 according to the connection priority degree between the controlling terminal 201-1 and the controlled terminal 202, and another presentation information production section 293-2, which produces presentation information data Nb1 according to the connection priority degree between the controlling terminal 201-2 and the controlled terminal 202, corresponding to the opposite parties of communication. The control information adjustment section 294 is configured separately, for example, as an control information adjustment section 294-1, which adjusts the rate of control of control information data An1 from the controlling terminal 201-1, and another control information adjustment section 294-2, which adjusts the rate of control of control information data Bn1 from the controlling terminal 201-2, corresponding to the opposite parties of communication.

In particular, the data receiver section 292-1 receives control information data An1 from the controlling terminal 201-1 and supplies the received control information data An1 to the control information adjustment section 294-1. The control information adjustment section 294-1 adjusts the rate of control of the control information data An1 from the data receiver section 292-1. The data receiver section 292-2 receives control information data Bn1 from the controlling terminal 201-2 and supplies the received control information data Bn1 to the control information adjustment section 294-2. The control information adjustment section 294-2 adjusts the rate of control of the control information data Bn1 from the data receiver section 292-2.

The presentation information production section 293-1 produces presentation information data Na1 according to the connection priority degree, for example, between the controlling terminal 201-1 and the controlled terminal 202 and supplies the produced presentation information data Na1 to the mixer 285 or the data sender section 291-1. The data sender section 291-1 transmits the presentation information data Na1 from the presentation information production section 293-1 to the corresponding controlling terminal 201-1 through the external communication line 11-2 under the control of the communication control section 281.

The presentation information production section 293-2 produces presentation information data Nb1 according to the connection priority degree, for example, between the controlling terminal 201-2 and the controlled terminal 202 and supplies the produced presentation information data Nb1 to the mixer 285 or the data sender section 291-2. The data sender section 291-2 transmits the presentation information data Nb1 from the presentation information production section 293-2 to the corresponding controlling terminal 201-2 through the external communication line 11-2 under the control of the communication control section 281.

The mixer 285 mixes the presentation information data Na1 from the presentation information production section 293-1 and presentation information data Nb1 from the presentation information production section 293-2 and outputs the mixed presentation information data to the indicator 211 or the speaker 295 through the input/output interface 25. The mixer 286 mixes the control information data An1 from the control information adjustment section 294-1 and control information data Bn1 from the control information adjustment section 294-2 and supplies the mixed control information data to the function control section 287.

The function control section 287 controls a predetermined function of the controlled terminal 202 with a rate (balance) according to the mixed control information data from the mixer 286.

Figure 20:
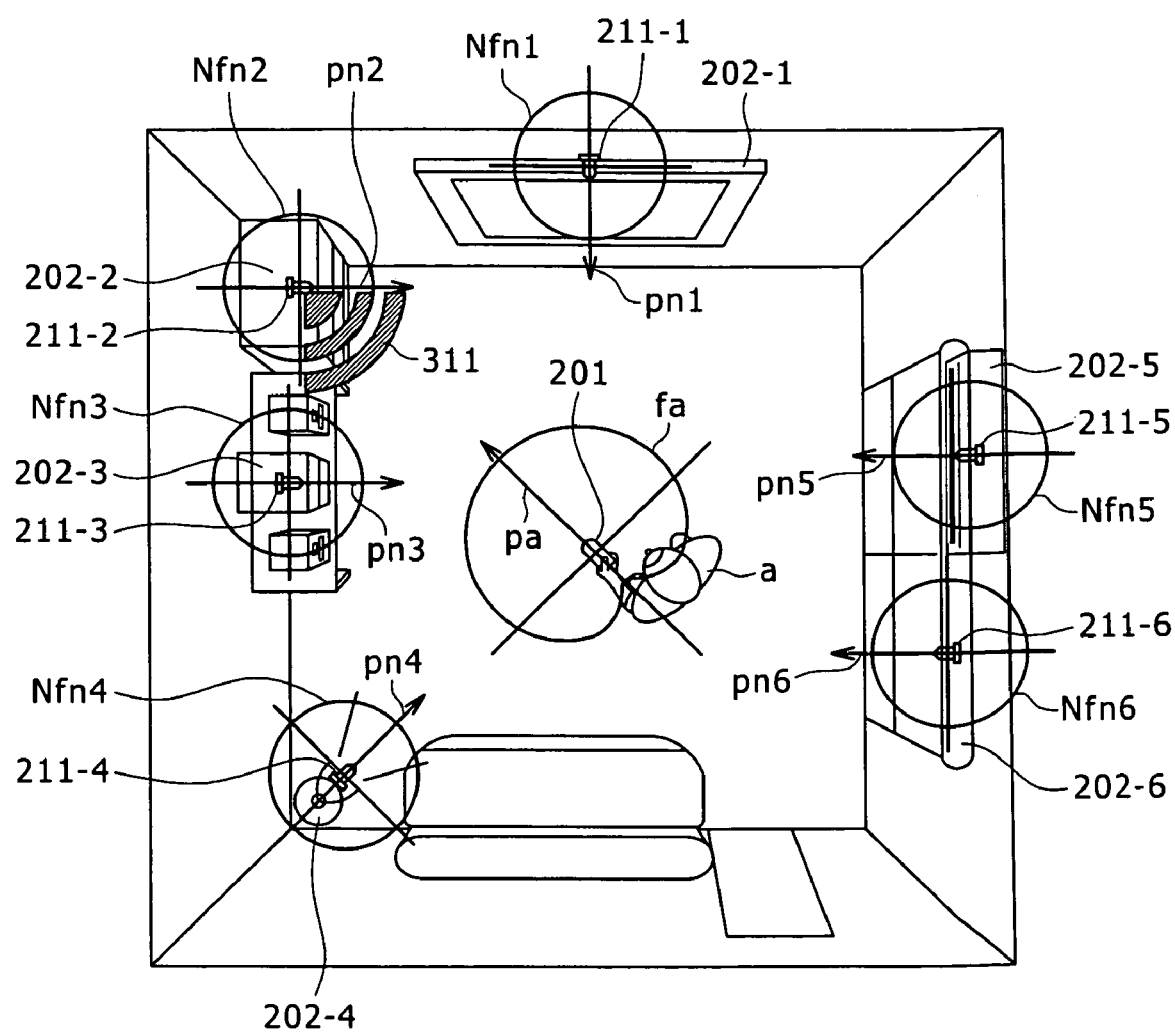
FIG. 20 is a view of the communication system of FIG. 16 in a highest priority apparatus selection mode.

Now, the communication system of FIG. 16 when the highest priority apparatus selection mode is selected is described with reference to FIG. 20. It is to be noted that, since several elements in FIG. 20 are common to those in FIG. 16, overlapping description of them is omitted herein to avoid redundancy.

The user "a" would use, substantially at the center of the room internal space, a controlling terminal 201 having a directional filter fa of the front face directed type (that is, having a maximum gain in the front face direction pa) described with reference to FIG. 5 and direct the front face direction pa of the controlling terminal 201 to the left upper corner in FIG. 20 of the room internal space.

Consequently, the controlling terminal 201 acquires characteristic information of the self terminal and the controlled terminals 202 through the characteristic information communication line 11-1 and calculates the connection priority degrees between the controlling terminal 201 and the controlled terminals 202. A connection priority degree list formed from the connection priority degrees and characteristic information calculated by the controlling terminal 201 is registered into the controlling terminal 201 and transmitted to the controlled terminals 202-1 to 202-6 through the characteristic information communication line 11-1.

At this time, the calculated connection priority degrees between the controlling terminal 201 and the controlled terminals 202 are such that, from among the controlled terminals 202-1 to 202-6, the controlled terminal 202-2 disposed in the front face direction pa (at the left upper corner in FIG. 20 in the room internal space) exhibits the highest connection priority degree.

The controlled terminals 202-1 to 202-6 receive the connection priority degree list between the controlling terminal 201 and the controlled terminals 202 calculated by the controlling terminal 201 through the characteristic information communication line 11-1 and register the received connection priority degree list as the connection priority degree list of the controlling terminal 201. Thus, each of the controlled terminals 202-1 to 202-6 performs production and outputting of presentation information according to the connection priority degree of the self terminal based on the highest priority apparatus selection mode currently set.

In particular, each of the controlled terminal 202-1 and the controlled terminals 202-3 to 202-6 decides whether or not the connection priority degree of the self terminal is the highest one, and does not perform production and outputting of presentation information because the decision indicates that the connection priority degree of the self terminal is not the highest one. On the other hand, when the controlled terminal 202-2 decides whether or not the connection priority degree of the self terminal is the highest one, it decides that the connection priority degree between the controlling terminal 201 and the controlled terminal 202-2 itself is the highest one, it produces presentation information 311 for presenting the connection priority degree of the self terminal and outputs the produced presentation information 311 from the indicator 211-2 so that the indicator 211-2 may emit light toward the controlling terminal 201.

Consequently, since the presentation information 311 is outputted from the indicator 211-2 in the direction toward the controlling terminal 201 (rightwardly downward direction in FIG. 20), the user "a" can recognize that the controlled terminal 202-2 can be controlled using the controlling terminal 201.

Then, if the controlled terminals 202-1 to 202-6 receive control information data from the controlling terminal 201 in accordance with an instruction of the user "a"then each of them adjusts the rate of control in response to the connection priority degree of the self terminal and executes the control based on the set highest priority apparatus selection mode. In particular, since the controlled terminal 202-1 and the controlled terminals 202-3 to 202-6 do not have the highest connection priority degree, they do not perform adjustment and execution of the control information. Meanwhile, since the connection priority degree between the controlling terminal 201 and the controlled terminal 202-2 is the highest, the controlled terminal 202-2 adjusts the rate of control according to the control information data in accordance with the connection priority degree (when necessary) and executes control according to the control information data.

It is to be noted that, also when the user "a" intends to operate one of the other controlled terminals 202-1 and 202-3 to 202-6, the controlled terminal 202 of an object of control can be re-selected by changing the direction of the front face direction pa of the controlling terminal 201.

For example, when the azimuth of the front face direction pa of the controlling terminal 201 is changed, the connection priority degree list in the controlling terminal 201 is updated, and the updated connection priority degree list is transmitted to the controlled terminals 202. Consequently, presentation information is outputted only from the indicator 211 of that one of the controlled terminals 202 whose connection priority degree is the highest one in the updated list. As a result, the user "a" can recognize that the controlled terminal 202 of the object of control is changed and the controlled terminal 202 from which presentation information is outputted can be controlled.

Now, the communication system of FIG. 16 in the priority balance adjustment mode is described with reference to FIG. 21. It is to be noted that, since several elements in FIG. 21 are common to those in FIG. 16, overlapping description of them is omitted herein to avoid redundancy.

Figure 21:
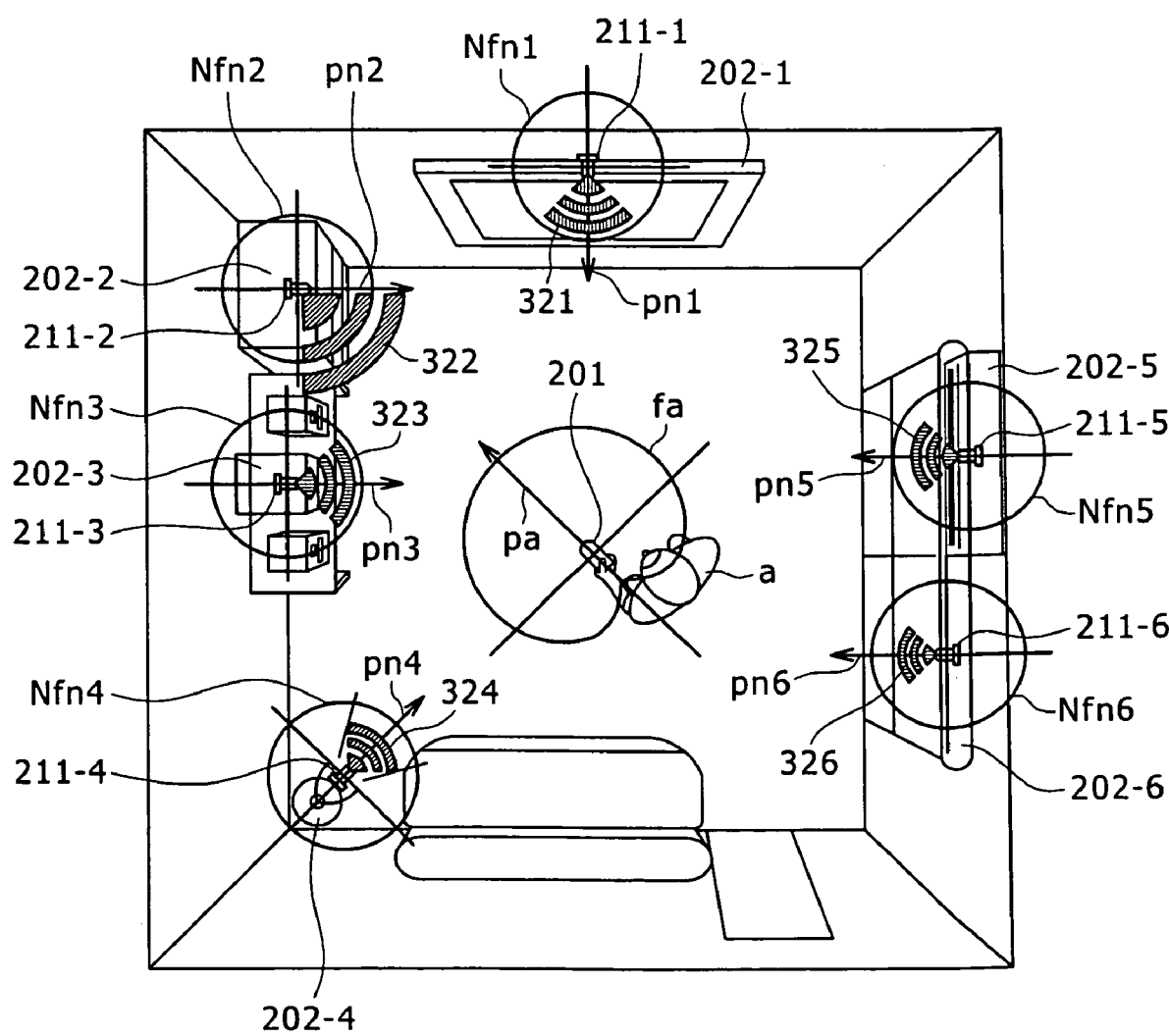
FIG. 21 is a similar view but showing the communication system of FIG. 16 in a priority balance adjustment mode.

Similarly as in the case of the example of FIG. 20, the user "a" would use, substantially at the center of the room internal space, a controlling terminal 201 having a directional filter fa of the front face directed type (that is, having a maximum gain in the front face direction pa) and direct the front face direction pa of the controlling terminal 201 to the left upper corner in FIG. 21 of the room internal space.

Consequently, the controlling terminal 201 acquires characteristic information of the self terminal and the controlled terminals 202 through the characteristic information communication line 11-1 and calculates the connection priority degrees between the controlling terminal 201 and the controlled terminals 202. A connection priority degree list formed from the connection priority degrees and characteristic information calculated by the controlling terminal 201 is registered into the controlling terminal 201 and transmitted to the controlled terminals 202-1 to 202-6 through the characteristic information communication line 11-1.

At this time, the calculated connection priority degrees between the controlling terminal 201 and the controlled terminals 202 are such that, from among the controlled terminals 202-1 to 202-6, the controlled terminal 202-2 disposed in the front face direction pa (at the left upper corner in FIG. 21 in the room internal space) exhibits the highest connection priority degree.

Further, the connection priority degrees of the controlled terminals 202-1 and 202-3 disposed within a comparatively small relative angular range (that is, within ±90 degrees) from the front face direction pa (for example, the azimuth of 0 degree) of the controlling terminal 201 are the second highest one but lower than that of the controlled terminal 202-2. Further, the connection priority degrees of the controlled terminals 202-4 and 202-5 disposed within a rather great relative angular range within ±135 degrees from the front face direction pa of the controlling terminal 201 are the third highest one but lower than that of the controlled terminals 202-2 and 202-3. Then, the connection priority degree of the controlled terminal 202-6 positioned in a substantially back side direction with respect to the front face direction pa of the controlling terminal 201 is the lowest one.

The controlled terminals 202-1 to 202-6 receive the connection priority degree list between the controlling terminal 201 and the controlled terminals 202 calculated by the controlling terminal 201 through the characteristic information communication line 11-1 and register the received list as a connection priority degree list of the controlling terminal 201 into the storage section 22. Thereafter, each of the controlled terminals 202-1 to 202-6 performs production and outputting of presentation information according to the connection priority degree of the self terminal based on the priority balance adjustment mode currently set.

In particular, since the connection priority degree between the controlling terminal 201 and the controlled terminal 202-2 is the highest one, the controlled terminal 202-2 produces presentation information 322 for causing a maximum number of light emitting elements to emit light or causing a light emitting element to emit light with a maximum intensity in a direction toward the controlling terminal 201 and outputs the produced presentation information 322 from the indicator 211-2.

The controlled terminal 202-1 produces presentation information 321 weighted with the connection priority degree between the controlling terminal 201 and the self terminal (controlled terminal 202-1) (indicating an intensity a little lower than the presentation information 322 which indicates the maximum intensity) and outputs the produced presentation information 321 from the indicator 211-1. The controlled terminal 202-3 produces presentation information 323 weighted with the connection priority degree between the controlling terminal 201 and the self terminal (controlled terminal 202-3) (indicating an intensity a little lower than the presentation information 322 which indicates the maximum intensity) and outputs the produced presentation information 323 from the indicator 211-3.

The controlled terminal 202-4 produces presentation information 324 weighted with the connection priority degree between the controlling terminal 201 and the self terminal (controlled terminal 202-4) (indicating an intensity a little lower than the presentation information 321 and the presentation information 323) and outputs the produced presentation information 324 from the indicator 211-4. The controlled terminal 202-5 produces presentation information 325 weighted with the connection priority degree between the controlling terminal 201 and the self terminal (controlled terminal 202-5) (indicating an intensity a little lower than the presentation information 321 and the presentation information 323) and outputs the produced presentation information 325 from the indicator 211-5.

The controlled terminal 202-6 produces presentation information 326 weighted with the connection priority degree between the controlling terminal 201 and the self terminal (controlled terminal 202-6) (indicating an intensity lowest when compared with those of the other presentation information) and outputs the produced presentation information 326 from the indicator 211-6.

Consequently, the indicator 211 of each of the controlled terminals 202 in the room internal space outputs presentation information (connection priority degree information) of an intensity according to the value of the connection priority degree between the controlling terminal 201 and the controlled terminal 202.

Then, if any of the controlled terminals 202-1 to 202-6 receives control information data from the controlling terminal 201 in accordance with an instruction of the user "a", then it adjusts the rate of control in response to the connection priority degree of the self terminal based on the currently set priority balance adjustment mode and executes the control.

For example, if, in the example of FIG. 21, the user "a" uses the volume adjustment dial 223 of the controlling terminal 201 to perform an operation of raising the volume by "ten", then the controlled terminal (audio apparatus) 202-2 whose connection priority degree is 100% raises its sound volume by ten while any other terminal executes control for the sound volume, the brightness of a television set, the wind force or the preset temperature value of an air conditioner, the opening/closing degree of a shutter, and so forth in response to the connection priority degree of the terminal. It is to be noted that, in this instance, the connection priority degree is converted into a value from 0 to 100% based on the range in numerical value of the calculated connection priority degrees (FIG. 11).

As described above, the user "a" can confirm in what balance a controlled terminal 202 can be controlled by observing presentation information outputted in the room internal space. For example, the user "a" can set a connection priority degree (desired balance) by changing the direction or the position of the controlling terminal 201 or by operating the balance adjustment dial 225 of FIG. 17 or the like. Thus, the user "a" can operate each controlled terminal 202 in response to a desired balance.

Now, the communication system of FIG. 16 where it includes two controlling terminals 201 is described with reference to FIG. 22. It is to be noted that, in FIG. 22, the controlled terminals 202-2 to 202-6 in FIG. 16 are merely omitted but are actually disposed, and the highest priority apparatus selection mode is set to the controlled terminals 202-1 to 202-6 similarly as in the case of. FIG. 20.

Figure 22:
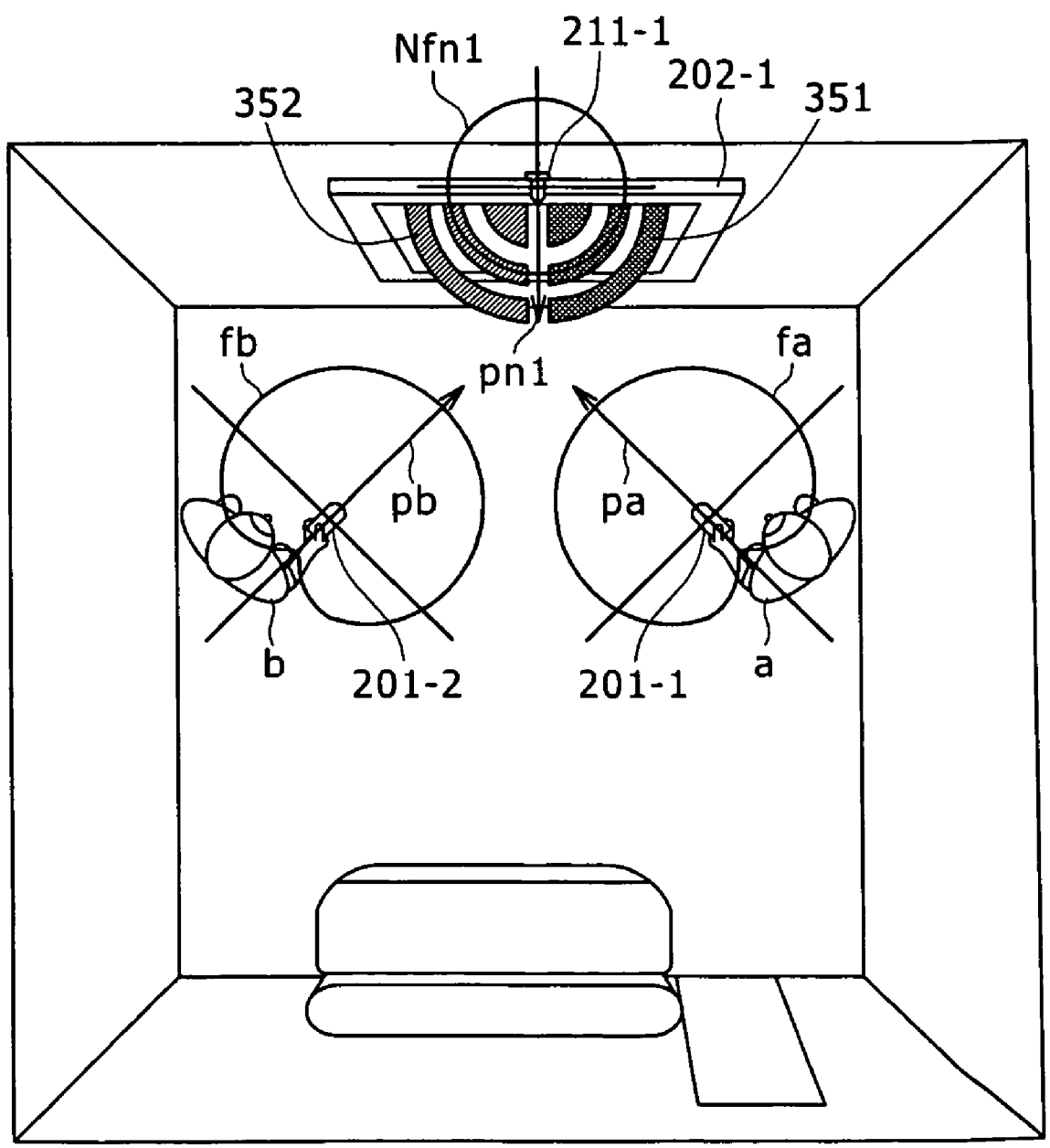
FIG. 22 is a view of the communication system where it includes a plurality of controlling terminals.

In the example of FIG. 22, the user "a" would use the controlling terminal 201-1 having a directional filter fa of the front face directed type on the right side in FIG. 22 in the room internal space and direct the front face direction pa of the controlling terminal 201-1 toward the controlled terminal 202-1 (in a leftwardly upward direction in FIG. 22 as viewed from the controlling terminal 201-1) disposed on a wall on the upper side in the figure of the room internal space.

Consequently, the controlling terminal 201-1 acquires characteristic information of the self terminal and the controlled terminals 202 through the characteristic information communication line 11-1 and calculates the connection priority degrees between the controlling terminal 201-1 and the controlled terminals 202. A connection priority degree list formed from the connection priority degrees and characteristic information calculated by the controlling terminal 201-1 is registered into the controlling terminal 201-1 and transmitted to the controlled terminals 202-1 to 202-6 through the characteristic information communication line 11-1.

At this time, the calculated connection priority degrees between the controlling terminal 201-1 and the controlled terminals 202 are such that, from among the controlled terminals 202-1 to 202-6, the controlled terminal 202-1 disposed in the front face direction pa of the controlling terminal 201-1 (on the upper side wall in FIG. 22 in the room internal space) exhibits the highest connection priority degree.

On the other hand, the user "b" would use the controlling terminal 201-2 having a directional filter fb of the front face directed type, which is configured in a similar manner to that of the directional filter fa, on the left side in FIG. 22 in the room internal space and direct the front face direction pb of the controlling terminal 201-2 toward the controlled terminal 202-1 (in a rightwardly upward direction in FIG. 22 as viewed from the controlling terminal 201-2) disposed on the wall on the upper side in the figure of the room internal space.

Consequently, the controlling terminal 201-2 acquires characteristic information of the self terminal and the controlled terminals 202 through the characteristic information communication line 11-1 and calculates the connection priority degrees between the controlling terminal 201-2 and the controlled terminals 202. A connection priority degree list formed from the connection priority degrees and characteristic information calculated by the controlling terminal 201-2 is registered into the controlling terminal 201-2 and transmitted to the controlled terminals 202-1 to 202-6 through the characteristic information communication line 11-1.

At this time, the calculated connection priority degrees between the controlling terminal 201-2 and the controlled terminals 202 are such that, from among the controlled terminals 202-1 to 202-6, the controlled terminal 202-1 disposed in the front face direction pb (on the upper side wall in FIG. 22 in the room internal space) exhibits the highest connection priority degree.

The controlled terminal 202-1 receives the connection priority degree list between the controlling terminal 201-1 and the controlled terminals 202 calculated by the controlling terminal 201-1 through the characteristic information communication line 11-1 and registers the connection priority degree list as a connection priority degree list of the controlling terminal 201-1 into the storage section 22. Further, the controlled terminal 202-1 receives a connection priority degree list between the controlling terminal 201-2 and the controlled terminals 202 calculated by the controlling terminal 201-2 through the characteristic information communication line 11-1 and registers the received connection priority degree list as a connection priority degree list of the controlling terminal 201-2 into the storage section 22.

Then, the controlled terminal 202-1 performs production and outputting of presentation information according to the information of the connection priority degree between the controlling terminal 201-1 and the controlled terminal 202-1 according to the connection priority degree list and the information of the connection priority degree of the controlling terminal 201-2 and the controlled terminal 202-1 according to the connection priority degree list based on the currently set highest priority apparatus selection mode.

In particular, since the connection priority degree between the controlling terminal 201-1 and the controlled terminal 202-2 is the highest one and the connection priority degree between the controlling terminal 201-2 and the controlled terminal 202-2 is the highest one, the controlled terminal 202-1 produces presentation information 351 for causing a light emitting element, which emits light in a direction toward the controlling terminal 201-1, to emit yellow light (indicated by intersecting slanting lines) and presentation information 352 for causing another light emitting element, which emits light in a direction toward the controlling terminal 201-2, to emit red light (indicated by fine intersecting slanting lines). The presentation information 351 and the presentation information 352 produced by the controlled terminal 202-1 are mixed by the mixer 285 and outputted from the indicator 211.

Consequently, the presentation information 351 is outputted from the light emitting element of the indicator 211-1 on the controlling terminal 201-1 side (right lower portion in FIG. 22) in a direction toward the controlling terminal 201-1 (rightwardly downward direction in FIG. 22). Meanwhile, the presentation information 352 is outputted from the light emitting element of the indicator 211-1 on the controlling terminal 201-2 side (left lower portion in FIG. 22) in a direction toward the controlling terminal 201-2 (leftwardly downward direction in FIG. 22). Accordingly, not only the user "a" but also the user "b" can recognize that they can individually use the controlling terminals 201 to control the controlled terminal 202-1, and hence can control the controlled terminal 202-1.

Then, if control information data are received from the controlling terminal 201-1 and the controlling terminal 201-2 in response to instructions of the user "a" by the controlled terminal 202-1, then the controlled terminal 202-1 adjusts the rates of control in response to the connection priority degrees of the self terminal and executes the control based on the set highest priority apparatus selection mode. In particular, since both of the connection priority degrees between the controlling terminal 201-1 and the controlled terminal 202-2 and between the controlling terminal 201-2 and the controlled terminal 202-2 are the highest ones, the rates of control according to the control information data are adjusted in response to the connection priority degrees (if necessary), and the control of the adjusted rates is mixed by the outputting section 28. Thus, the controlled terminal 202-1 executes the mixed control.

As described above, where the communication system includes a plurality of controlling terminals 201, it is possible to output presentation information from any controlled terminal 202 in a respective direction or in respective color information.

It is to be noted that, while, in FIG. 22, the communication system includes two controlling terminals 201, the number of such controlling terminals 201 may not be two but be a plural number equal to or greater than three. Further, while control in the highest priority apparatus selection mode is described above, also in the priority balance adjustment mode, it is possible to output presentation information from any controlled terminal 202 in a respective direction or in respective color information toward a plurality of controlling terminals 201.

Furthermore, while, in FIG. 22, the controlled terminal 202 performs presentation or control in response to data from a plurality of controlling terminals 201, it may otherwise compare information of the connection priority degree list between the controlling terminal 201-1 and the self terminal and information of the connection priority degree list between the controlling terminal 201-2 and the self terminal with each other and select only the information which exhibits the higher connection priority degree.

Now, a communication control process of each controlling terminal 201 is described with reference to a flow chart of FIG. 23. The user "a" would press the power supply button 222 of the controlling terminal 201. In response to this, power is supplied from a power supplying section not shown to the controlling terminal 201 to activate the controlling terminal 201.

The user "a" who operates the controlling terminal 201 would operate the information inputting section 27 formed from buttons, keys, dials, and so forth to issue an instruction to start communication to the controlling terminal 201 in order to control at least one of the controlled terminals 202-1 to 202-6 disposed in the room internal space through the external communication line 11-2. At this time, the user "a" would operate, as occasion demands, the information inputting section 27 to input, for example, information of the room internal space of an object of communication, a connection establishment index representative of a rate at which the controlling terminal 201 issues a request for communication to each of the controlled terminals 202, and a directional filter index representative of a connection establishment index to every direction centered at the controlling terminal 201.

The information inputting section 27 inputs a control signal corresponding to the operation of the user "a" to the characteristic information setting section 52 and the space information setting section 53 of the connection priority degree analysis section 21. The characteristic information setting section 52 executes, at step S101, a connection priority degree setting process in accordance with an instruction of the user "a" inputted from the information inputting section 27.

The connection priority degree setting process involves substantially similar processes to those of the connection priority degree setting process described hereinabove with reference to FIG. 13, and therefore, overlapping detailed description of the same is omitted herein to avoid redundancy. In short, however, by the connection priority degree setting process at step S101, for example, position information of the controlling terminal 201 according to a local positioning system is acquired from the base station 5 through the characteristic information communication line 11-1. Further, the characteristic information of the controlled terminals 202 is acquired. Thus, the characteristic information of the self terminal and the opposite party of communication is disposed in the set reference space of the controlling terminal 201.

Then, the priority degree calculation section 57 refers to the reference space of the controlling terminal 201 in which the characteristic information of the terminals is disposed to calculate the connection priority degrees between the controlling terminal 201 and the controlled terminals 202. Then, the priority degree calculation section 57 registers the calculated connection priority degrees, the characteristic information of the terminals, and so forth as a connection priority degree list in a coordinated relationship with the ID information of the controlled terminals 202 into the storage section 22. Thereafter, the processing advances to step S102.

At step S102, the priority degree calculation section 57 controls the characteristic information sender section 61 of the characteristic information communication section 55 to transmit the connection priority degree list, which includes the calculated connection priority degrees and the characteristic information and so forth of the terminals, to the controlled terminals 202 through the characteristic information communication line 11-1. Then, the processing advances to step S103.

Consequently, the connection priority degree list is registered (updated) in the controlled terminals 202. Thus, at step S175 of FIG. 26 hereinafter described, the amount of light of an intensity according to the connection priority degree of each of the controlled terminals 202 is outputted as instruction information according to the set control mode and the information of the connection priority degree list of the controlled terminals 202 from the indicator 211 of the controlled terminal 202.

The user "a" would refer to the presentation information of the indicator 211 to confirm whether or not a desired one of the controlled terminals 202 is enabled for operation. For example, if the indicator 211 of a desired one of the controlled terminals 202 does not output presentation information or if the intensity of the light outputted from the indicator 211 is low, then the user "a" would recognize that the desired controlled terminal 202 is not enabled for operation. Therefore, the user "a" may direct the controlling terminal 201 toward the object controlled terminal 202 or the user "a" itself may move or else operate the balance adjustment dial 225 to change the connection priority degrees between the controlling terminal 201 and the controlled terminals 202.

At step S103, the communication control section 251 of the internal communication processing section 23 decides whether or not an instruction to the controlled terminal 202 (for example, by an operation of the volume adjustment dial 223 or the channel selection dial 224) is inputted from the information inputting section 27 in response to an operation of the information inputting section 27 by the user. If it is decided that an instruction to the controlled terminal 202 is not inputted from the information inputting section 27, then the processing advances to step S104.

At step S104, the connection priority degree analysis section 21 executes a variation information supplying process. Since the variation information supplying process involves basically similar processes to those of the variation information supplying process described hereinabove with reference to FIG. 15, overlapping description is omitted suitably to avoid redundancy.

If the variation information supplying process is executed at step S104 and it is decided that a variation of the direction or the position of the controlling terminal 201 is detected by the direction detection section 51 or it is decided that a changing instruction of the connection establishment index information or the directional filter index information of the controlling terminal 201 is inputted by the characteristic information setting section 52 in response to an operation of the balance adjustment dial 225 by the user or else it is decided that characteristic information is received from the controlled terminal 202, then the changed characteristic or the like of the controlling terminal 201 or the controlled terminal 202 is supplied to the space information adjustment section 56.

At step S105, the space information adjustment section 56 decides whether or not at least one of the position information, direction information, connection establishment index information, and directional filter index information of the controlling terminal 201 and characteristic information of the controlled terminal 202 is received. If it is decided that at least one of the position information, direction information, connection establishment index information, and directional filter index information of the controlling terminal 201 and characteristic information of the other node is received, then the processing advances to step S106. At step S106, the space information adjustment section 56 executes a connection priority degree calculation updating process.

Figure 24:
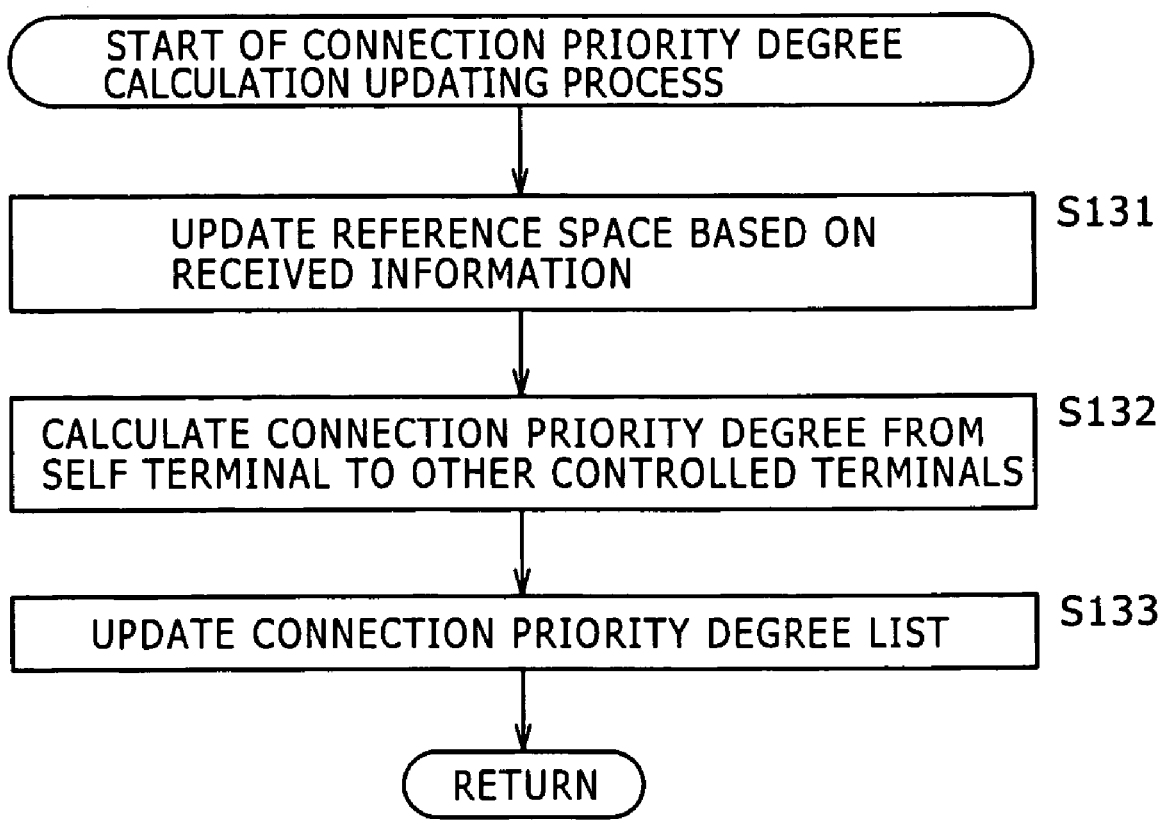
FIG. 24 is a flow chart illustrating a connection priority degree calculation updating process in the communication control process of FIG. 23.

The connection priority degree calculation updating process is described with reference to a flow chart of FIG. 24. It is to be noted that steps S131 to S133 of FIG. 24 involve substantially same processes as those at steps S53 to S55 of FIG. 14, respectively, and therefore, overlapping detailed description of the processes is omitted herein to avoid redundancy.

At step S131, the space information adjustment section 56 changes the locations of the controlled terminals 202 disposed in the reference space of the controlling terminal 201 based on information supplied thereto to update the reference space of the controlling terminal 201 stored therein. Further, the space information adjustment section 56 supplies resulting information of the change to the priority degree calculation section 57, whereafter the processing advances to step S132.

At step S132, the priority degree calculation section 57 uses the reference space of the controlling terminal 201 supplied thereto from the space information adjustment section 56 (that is, uses the expressions (1) and (2) given hereinabove) to determine relative positional relationships between the self terminal and the opposite parties of communication to calculate the connection priority degrees of the controlled terminals 202-1 to 202-6 from the self terminal (controlling terminal 201). Thereafter, the processing advances to step S133, at which the connection priority degree list, which is the connection priority degree analysis result registered in the storage section 22, is updated in a coordinated relationship with the ID information.

At step S133, the priority degree calculation section 57 updates the connection priority degree list in a coordinated relationship with the ID information, thereby ending the connection priority degree calculation updating process. Thus, the processing returns to step S106 of FIG. 23 and advances to step S107: At step S107, the characteristic information sender section 61 of the characteristic information communication section 55 is controlled to transmit the connection priority degree list, which includes the updated connection priority degrees and characteristic information of the terminals and so forth, to the controlled terminals 202 through the characteristic information communication line 11-1. Thereafter, the processing returns to step S103 to repeat the processes beginning with step S103.

In particular, since the connection priority degree list is transmitted to the controlled terminals 202, the connection priority degree list is updated in each of the controlled terminals 202. Thus, at step S175 of FIG. 26 hereinafter described, the amount of light of an intensity according to the connection priority degree of each of the controlled terminals 202 is outputted as presentation information according to the updated connection priority degree of the controlled terminal 202 from the indicator 211 of the controlled terminal 202.

The user "a" would refer to the presentation information of the indicator 211 to confirm whether or not the desired controlled terminal 202 is enabled for operation. For example, if the indicator 211 of the desired controlled terminal 202 outputs presentation information or an amount of light (presentation information) of an intensity desirable to the user "a" is outputted from the indicator 211, then the user "a" would recognize that the desired controlled terminal 202 is enabled for operation and operate the information inputting section 27 of the controlling terminal 201 (for example, the volume adjustment dial 223, channel selection dial 224, or the like) to issue a desired instruction to the controlling terminal 201. Thus, the presentation information outputted from the indicator 211 is considered to be control acceptance state information representative of to which degree the controlled terminal 202 can accept control from the controlling terminal 201.

For example, it is assumed that the user "a" operates the volume adjustment dial 223 to perform an operation of raising the volume by "ten".

The information inputting section 27 inputs control information corresponding to the instruction of the user to the communication control section 251 and the distributor 255 of the internal communication processing section 23 through the input/output interface 25. The control information inputted to the distributor 255 is distributed to the controlled terminal 202 and supplied to the control information adjustment sections 263-1, 263-2, . . . .

After the control information is inputted from the information inputting section 27, the communication control section 251 decides at step S103 that an instruction to the controlled terminal 202 is inputted from the information inputting section 27, whereafter the processing advances to step S108. At step S108, the communication control section 251 controls the priority degree information acquisition section 252 to acquire the connection priority degrees of the controlled terminals 202 registered in the connection priority degree list of the storage section 22, whereafter the processing advances to step S109.

At step S109, the communication control section 251 controls the control information adjustment section 263 to adjust the rate of control of the control information supplied thereto from the distributor 255 in response to the control mode (highest priority apparatus selection mode or priority balance adjustment mode) set between the controlling terminal 201 and the controlled terminals 202 and the connection priority degrees of the controlled terminals 202 and supply the control information whose rate of control is adjusted as control information data to the data sender section 261. Thereafter, the processing advances to step S110.

Figure 27:
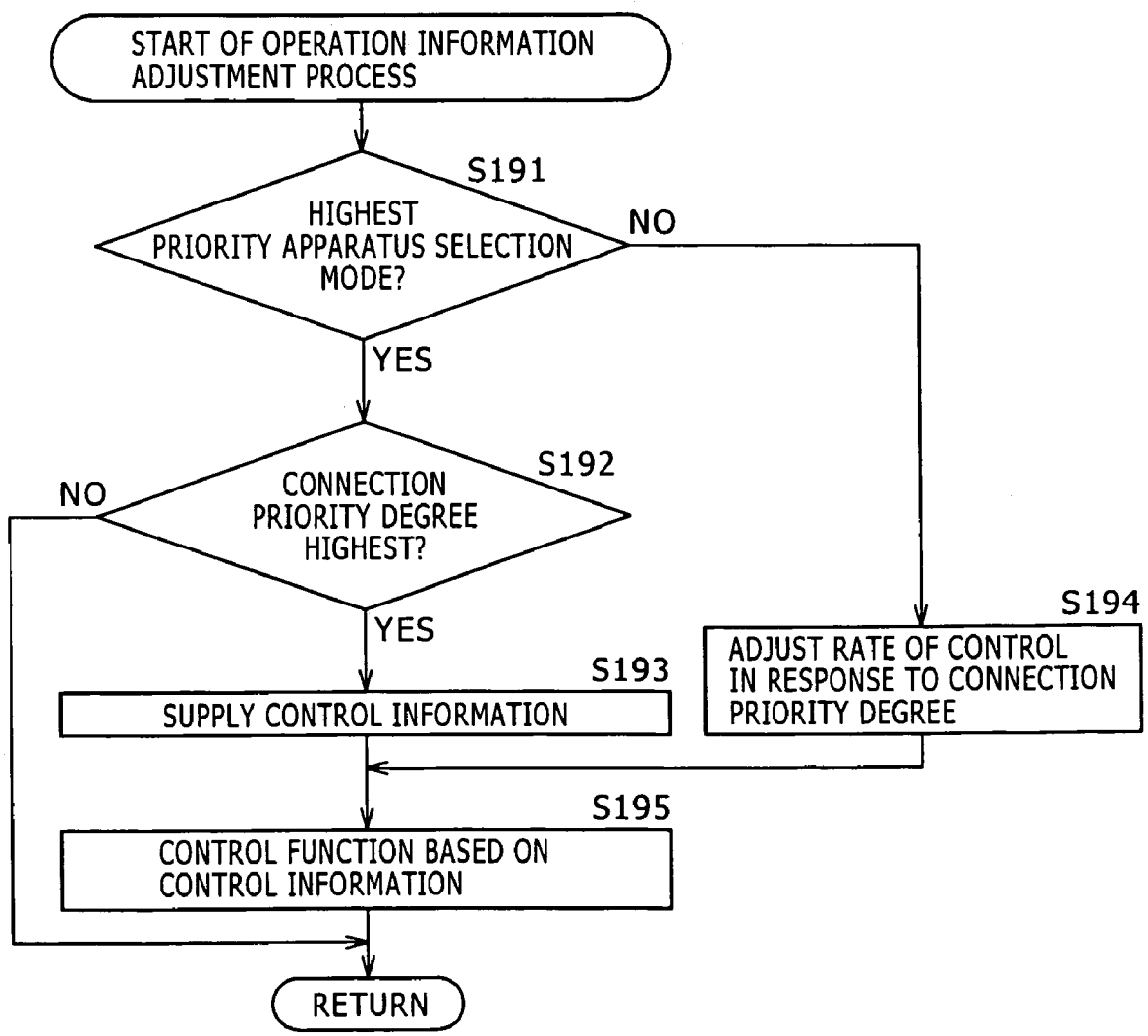
FIG. 27 is a flow chart illustrating a control information adjustment process in the communication control process of FIG. 25.

It is to be noted that, particularly at step S109, similar processes to those at steps S191 to S194 of the control information adjustment process hereinafter described with reference to FIG. 27 are executed. Accordingly, where the highest priority apparatus selection mode is selected, control information data are not transmitted to those controlled terminals 202 whose connection priority degree is not the highest one.

At step S110, the communication control section 251 controls the data sender section 261 to transmit the control information data supplied from the control information adjustment section 263 to the corresponding controlled terminal 202 through the external communication line 11-2. Thereafter, the processing returns to step S103 so that the processes at the steps beginning with step S103 are repeated.

On the other hand, if the space information adjustment section 56 decides at step S105 that any one of the position information, direction information, connection establishment index information, and directional filter index information of the controlling terminal 201 and characteristic information of the controlled terminal 202 is not received, then the processing advances to step Sill. At step Sill, the space information adjustment section 56 decides whether or not the power supply button 222 of the information inputting section 27 is operated by the user "a" to issue an instruction to turn off the power supply. If it is decided that an instruction to turn off the power supply is issued, then the communication control process is ended.

If it is decided at step S111 that an instruction to turn off the power supply is not issued, then the process returns to step S103 so that the processes at the steps beginning with step S103 are repeated. In other words, the processes at the steps beginning with step S103 are repeated until after it is decided at step S111 that an instruction to turn off the power supply is issued. It is to be noted that, if a predetermined period of time elapses while the user "a" does not perform any operation for the controlling terminal 201 (inputting of an instruction, movement of the terminal, or the like), then the power supply state of the controlling terminal 201 may be set to a sleep mode.

It is to be noted that, where the rate of control is controlled by the controlled terminal 202 as in the case of a communication control process of FIG. 25 hereinafter described, the processes at steps S108 and S109 of FIG. 23 may be skipped and the same control information data may be transmitted to the controlled terminals 202 at step S110. In other words, since, in the communication system of FIG. 16, the connection priority degree information list is shared and used commonly, the control process of the rate of control information may be performed by any of the controlling side and the controlled side.

Figure 23:
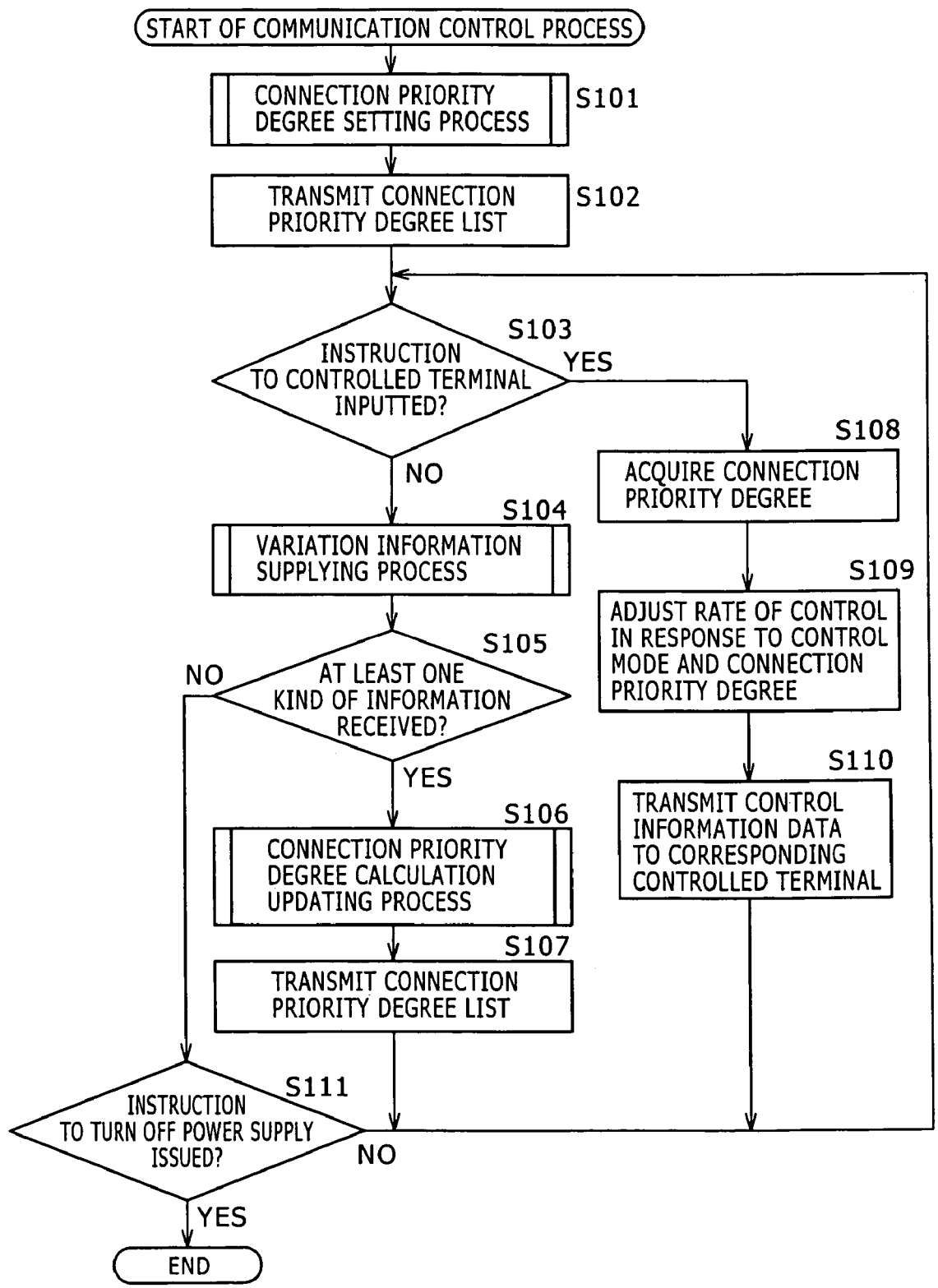
FIG. 23 is a flow chart illustrating a communication control process of the controlling terminal of FIG. 16.

Now, the communication control process of each controlled terminal 202 corresponding to the communication control process of the controlling terminal 201 of FIG. 23 is described with reference to a flow chart of FIG. 25.

At step S102 of FIG. 23, the controlling terminal 201 transmits a connection priority degree list calculated thereby to the controlled terminal 202 through the characteristic information communication line 11-1.

The characteristic information receiver section 62 of the controlled terminal 202 receives the connection priority degree list from the controlling terminal 201 through the characteristic information communication line 11-1 and supplies the received connection priority degree list from the controlling terminal 201 to the priority degree calculation section 57.

When the connection priority degree list is received from the characteristic information receiver section 62, the priority degree calculation section 57 registers the connection priority degree list from the controlling terminal 201 in a coordinated relationship with the ID information of the controlling terminal 201 into the storage section 22.

The priority degree information acquisition section 282 of the internal communication processing section 23 supervises the storage section 22, and decides at step S151 whether or not a connection priority degree list is registered (updated). If it is decided that a connection priority degree list is registered (updated), then the processing advances to step S152. At step S152, the priority degree information acquisition section 282 supplies the information of the registered (updated) connection priority degree list (connection priority degrees, direction information with respect to the controlling terminal 201, and so forth) to the communication control section 281. Thereafter, the processing advances to step S153.

At step S153, the communication control section 281 executes a presentation information output control process using the information of the connection priority degree list supplied thereto from the priority degree information acquisition section 282. The presentation information output control process at step S153 is described below with reference to a flow chart of FIG. 26.

At step S171, the communication control section 281 decides whether or not the currently set control mode is the highest priority apparatus selection mode. If it is decided that the currently set control mode is the highest priority apparatus selection mode, then the processing advances to step S172. At step S172, the communication control section 281 decides based on the information of the connection priority degree list supplied thereto from the priority degree information acquisition section 282 whether or not the connection priority degree between the controlling terminal 201 and the self terminal (controlled terminal 202) is highest among the connection priority degrees between the controlling terminal 201 and the opposite parties of communication.

If it is decided at step S172 that the connection priority degree between the controlling terminal 201 and the self terminal (controlled terminal 202) is highest among the connection priority degrees between the controlling terminal 201 and the opposite parties of communication, then the processing advances to step S173. At step S173, the communication control section 281 controls the presentation information production section 293 to produce presentation information representing that it is possible to accept control from the controlling terminal 201, whereafter the processing advances to step S175.

If it is decided at step S171 that the currently set control mode is not the highest priority apparatus selection mode (that is, the currently set control mode is the priority balance adjustment mode), then the processing advances to step S174. At step S174, the communication control section 281 controls the presentation information production section 293 to produce presentation information according to the connection priority degree between the controlling terminal 201 and the self terminal (controlled terminal 202). Thereafter, the processing advances to step S175.

At step S175, the presentation information production section 293 outputs the produced presentation information from the indicator 211 through the outputting section 28 and the input/output interface 25. Consequently, an amount of light (presentation information) of intensity according to the connection priority degree is outputted from the indicator 211. Thereafter, the processing returns to step S154 of FIG. 25 and further returns to step S151 so that the processes at the steps beginning with step S151 are repeated.

The processes at steps S174 and S175 when the control mode is the priority balance adjustment mode where the controlling terminal 201 includes, for example, the controlling terminals 201-1 and 201-2 are described particularly. In this instance, the presentation information production section 293-1 produces, for example, presentation information data Na1 according to the connection priority degree between the controlling terminal 201-1 and the controlled terminal 202 and outputs the presentation information data Na1 to the mixer 285. The presentation information production section 293-2 produces, for example, presentation information data Nb1 according to the connection priority degree between the controlling terminal 201-2 and the controlled terminal 202 and outputs the presentation information data Nb1 to the mixer 285.

The mixer 285 mixes the presentation information data Na1 from the presentation information production section 293-1 and the presentation information data Nb1 from the presentation information production section 293-2 and outputs the mixed presentation information data to the indicator 211 through the input/output interface 25. Consequently, presentation information 351 and presentation information 352 are outputted from the indicator 211-1 as seen in FIG. 22.

It is to be noted that, if a controlled terminal 202 is set at a place at which it cannot be observed by the user "a" who operates the controlling terminal 201, then presentation information data may be transmitted to the controlling terminal 201 so that it may be outputted from the controlling terminal 201.

In this instance, the presentation information production section 293-1 produces presentation information data Na1 according to the connection priority degree between the controlling terminal 201-1 and the controlled terminal 202 and outputs the presentation information data Na1 to the data sender section 261-1. The data sender section 291-1 transmits the presentation information data Na1 from the presentation information production section 293-1 to the controlling terminal 201-1 through the external communication line 11-2 under the control of the data sender section 261.

The presentation information production section 293-2 produces presentation information data Nb1 according to the connection priority degree, for example, between the controlling terminal 201-2 and the controlled terminal 202 and outputs the presentation information data Nb1 to the mixer 285. The data sender section 291-2 transmits the presentation information data Nb1 from the presentation information production section 293-1 to the controlling terminal 201-2 through the external communication line 11-2 under the control of the communication control section 281.

Consequently, in the controlling terminals 201-1 and 201-2, the presentation information data Na1 and Na2 are received by the data receiver section 262 and mixed by the mixer 256 and then supplied to the output control section 24 so that presentation information corresponding to the presentation information data Na1 and Na2 is outputted from the LCD section 221. It is to be noted that, at this time, the output control section 24 may synthesize and output the presentation information data to the notification screen of the connection priority degrees of FIG. 12. In other words, in this instance, presentation information with which, for example, part of the node N on the notification screen of the connection priority degrees blinks is outputted.

It is to be noted that the presentation information may be displayed not on the LCD section 221 but, for example, on a head mounted display unit adapted to be mounted on the face of the user "a" or the like.

Referring back to FIG. 26, if it is decided at step S172 that the connection priority degree between the controlling terminal 201 and the self terminal (controlled terminal 202) is not highest among the connection priority degrees between the controlling terminal 201 and the opposite parties of communication, then the processes at steps S173 and S175 are skipped and the processing returns to step S153 and further returns to step S151 so that the processes at the steps beginning with step S151 are repeated.

On the other hand, if it is decided at step S151 of FIG. 25 that the connection priority degree list is not registered (updated), then the processing advances to step S154, at which the communication control section 281 decides whether or not the data receiver section 292 receives control information data.

At step S110 of FIG. 23 described hereinabove, the controlling terminal 201 transmits the control information data to the controlled terminal 202 through the external communication line 11-2. Thus, the data receiver section 292 receives the control information data from the controlling terminal 201 through the external communication line 11-2 and supplies the received control information data to the control information adjustment section 294. Further, the data receiver section 292 supplies ID information acquired from the control information data to the communication control section 281.

Thus, the communication control section 281 decides at step S154 that the data receiver section 292 receives control information data, and then, the processing advances to step S155. At step S155, the communication control section 281 controls the priority degree information acquisition section 282 to acquire (supply) the information of the connection priority degree list between the controlling terminal 201 corresponding to the ID information and the self terminal from the storage section 22, whereafter the processing advances to step S156. At step S156, the communication control section 281 executes a presentation information output control process. The presentation information output control process involves processes similar to those of the presentation information output control process at step S153 described hereinabove with reference to FIG. 26, and therefore, overlapping detailed configuration of the same is omitted herein to avoid redundancy. Consequently, since operation control at a next step is executed together with this presentation information outputting, the user can grasp an object of the control clearly and definitely.

By the presentation information output process at step S156, an amount of light (presentation information) of an intensity according to the connection priority degree is outputted from the indicator 211. Thereafter, the processing advances to step S157, at which the communication control section 281 controls the control information adjustment section 294 to execute a control information adjustment process.

The control information adjustment process is described with reference to a flow chart of FIG. 27. It is to be noted that processes at steps S191 and S192 of FIG. 27 are similar to those at steps S171 and S172 of FIG. 26, respectively, and therefore, overlapping detailed description of the processes is omitted herein to avoid redundancy.

At step S191, the communication control section 281 decides whether or not the set control mode is the highest priority apparatus selection mode. If it is decided that the set control mode is the highest priority apparatus selection mode, then the processing advances to step S192. At step S192, the communication control section 281 decides based on the information of the connection priority degree list supplied thereto from the priority degree information acquisition section 282 whether or not the connection priority degree between the controlling terminal 201 and the self terminal (controlled terminal 202) is highest among the connection priority degrees between the controlling terminal 201 and the controlled terminals 202.

If it is decided at step S192 that the connection priority degree between the controlling terminal 201 and the self terminal is highest among the connection priority degrees between the controlling terminal 201 and the controlled terminals 202, then the processing advances to step S193. At step S193, the communication control section 281 controls the control information adjustment section 294 to supply the control information supplied thereto from the data receiver section 292 as it is to the function control section 287 through the mixer 286, whereafter the processing advances to step S195.

If it is decided at step S191 that the set control mode is not the highest priority apparatus selection mode (that is, the set control mode is the priority balance adjustment mode), then the processing advances to step S194. At step S194, the communication control section 281 controls the control information adjustment section 294 to adjust the rate of control of the control information supplied from the data receiver section 292 in response to the control mode and the connection priority degree between the controlling terminal 201 and the self terminal (controlled terminal 202) and supply the adjusted control information to the function control section 287 through the mixer 286. Thereafter, the processing advances to step S195.

The process at step S194 where the control mode is the priority balance adjustment mode, for example, where the controlling terminal 201 includes the controlling terminals 201-1 and 201-2, is described particularly. The data receiver section 292-1 receives control information data An1 from the controlling terminal 201-1 and supplies the received control information data An1 to the control information adjustment section 294-1. The control information adjustment section 294-1 adjusts the rate of control of the control information data An1 from the data receiver section 292-1. The data receiver section 292-2 receives control information data Bn1 from the controlling terminal 201-2 and supplies the received control information data Bn1 to the control information adjustment section 294-2. The control information adjustment section 294-2 adjusts the rate of control of the control information data Bn1 from the data receiver section 292-2.

The mixer 286 mixes the control information data An1 from the control information adjustment section 294-1 and the control information data Bn1 from the control information adjustment section 294-2 and supplies the mixed control information data to the function control section 287.

At step S195 after control information is inputted from the control information adjustment section 294, the function control section 287 controls a predetermined function with the control rate adjusted with the priority degree by the control information adjustment section 294. Thereafter, the processing returns to step S157 of FIG. 25 and advances to step S158.

At step S158, the communication control section 281 decides whether or not the information inputting section 27 is operated by the user "a" to issue an instruction to turn off the power supply. If it is decided that an instruction to turn off the power supply is issued, then the communication control process is ended.

If it is decided at step S158 that an instruction to turn off the power supply is not issued, then the processing returns to step S151 to repeat the processes at the steps beginning with step S151. In particular, the processes at the steps beginning with step S151 are repeated until after it is decided at step S158 that an instruction to turn off the power supply is issued.

As described above, where a plurality of controlled terminals are controlled, since presentation information according to the connection priority degrees determined from the controlled terminals is inputted and the rate of control is controlled in response to the connection priority degree, the user can confirm a controlled terminal of an object of control simply.

Further, since the connection priority degrees can be changed by a simple operation such as a variation of the direction of the controlling terminal or a movement of the user itself to move the controlling terminal, the controlled terminal of the object of control can be changed simply.

By the foregoing, a plurality of controlled terminals can be controlled by a single controlling terminal.

It is to be noted that, while, in the foregoing description, presentation information is outputted from the indicator 211, beep sound or the like may be outputted as presentation information from the speaker 295. Where a controlled terminal 202 is disposed at a place at which it cannot be observed by the user "a" who carries a controlling terminal 201, presentation information data may be transmitted from the controlled terminal 202 to a different information processing apparatus disposed in the proximity of the controlling terminal 201 or the user such that it is outputted from a display section of the different information processing apparatus.

Further, while, in the foregoing description, each controlled terminal acquires a connection priority degree list calculated by a controlling terminal and updates a connection priority degree list thereof with the acquired connection priority degree list, it is only necessary for the connection priority degree list in the communication system to be shared by component terminals of the communication system and the connection priority degree list may be calculated by any component of the communication system such as a controlling terminal, a controlled terminal, or a server. Accordingly, the connection priority degree analysis section of each controlling terminal may acquire characteristic information and refer to a reference space centered at the controlling terminal to calculate a connection priority degree list same as that calculated by the controlling terminal to update the connection priority degree list.

Furthermore, while, in the foregoing description, the rate (balance) of one-directional control information from a controlling terminal to a controlled terminal is controlled in response to a connection priority degree, it may otherwise be controlled based on any information of the connection priority degree list such as direction information. Further, the present invention can be applied to various types of control such as control of sound volume adjustment of sound data received from a plurality of opposite parties of communication to be outputted or sound data inputted to be outputted to a plurality of opposite parties of communication (that is, sound data to be transmitted to or received from a plurality of opposite parties of communication), control of the transparency of video data to be transmitted to or received from a plurality of opposite parties of communication, control of the size of a sub screen where video data are displayed on the sub screen, and control of the resolution of video data.

Since the communication with a plurality of nodes is controlled in response to connection priority degrees calculated based on characteristic information including position information, direction information, ID information, directional filter index information, connection establishment index information, and so forth of the self node and the nodes of opposite parties of communication as described above, even if an increased number of controlled terminals are connected, the contents of communication (that is, which one of the controlled terminals should be controlled or the like) can be controlled in response to the connection priority degrees.

Consequently, even where a single controlling terminal is used, since interference between a plurality of controlled terminals and the like are suppressed, a plurality of controlled terminals can be controlled through suitable communication.

Further, since also the connection priority degrees are updated in response to a variation of characteristic information such as position information, direction information, directional filter index information, and connection establishment index information, even if the state of any of nodes such as controlling terminals and controlled terminals changes, this can be coped with readily.

Furthermore, since position information or direction information is inputted in an interlocking relationship with a controlling terminal, the communication balance between a plurality of nodes can be controlled optimally by a simple and natural operation.

It is to be noted that, since, in the foregoing description, the network 2 is divided into the characteristic information communication line 11-1 and the external communication line 11-2 separate from each other for the convenience of description, the characteristic information communication section 55 and the external communication interface 83 of the terminal 1 are formed separately from each other individually for different functions. However, where there is no necessity to divide the terminal 1 into the characteristic information communication line 11-1 and the external communication line 11-2 separate from each other, the characteristic information communication section 55 and the external communication interface 83 may be configured otherwise as a single communication section.

While the series of processes described above can be executed by hardware, it may otherwise be executed by software. Where the series of processes described above are executed by software, for example, each of the terminals 1-1 to 1-3 of FIG. 1 is formed from such a personal computer 401 as shown in FIG. 28.

Figure 28:
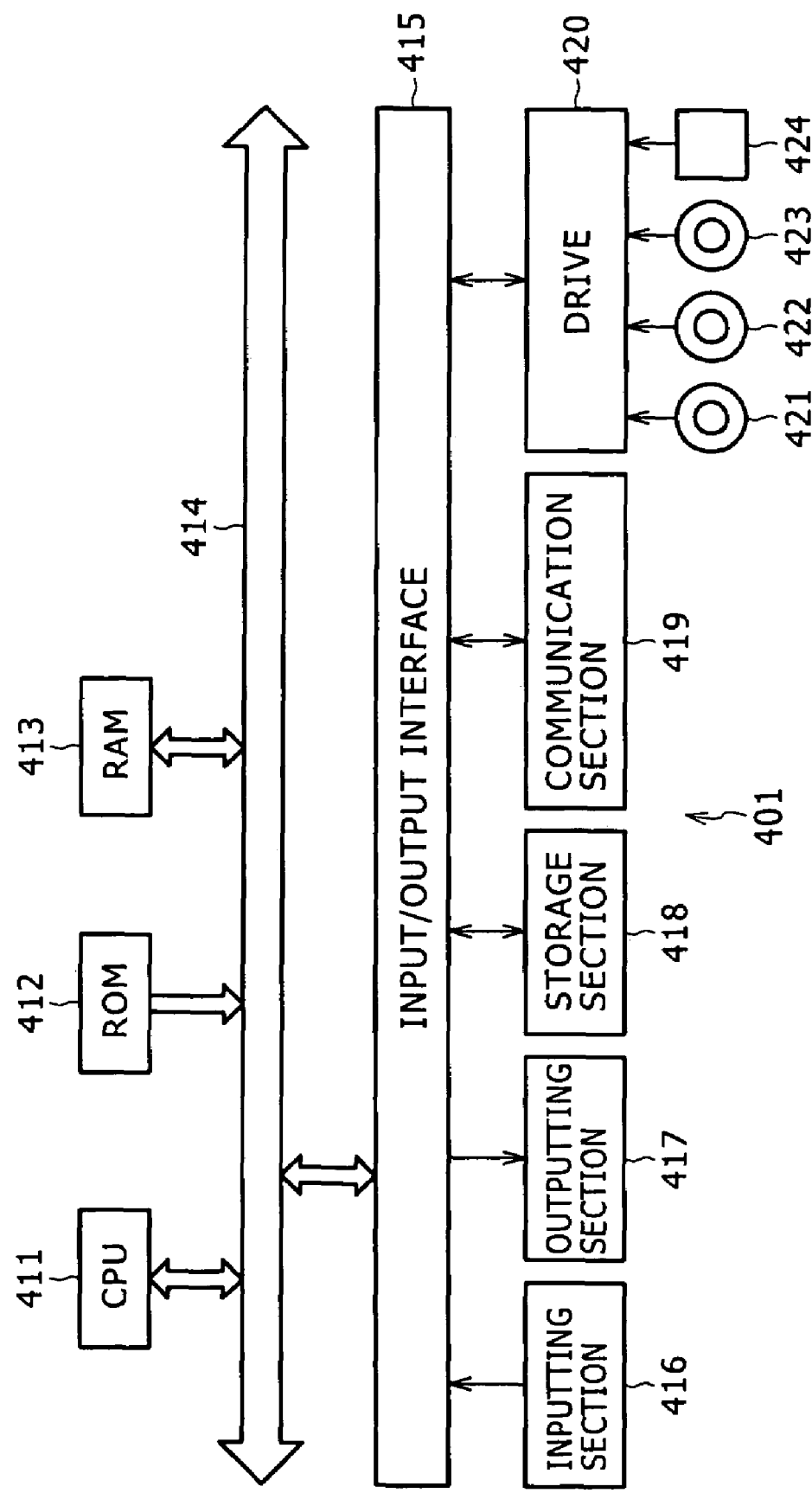
FIG. 28 is a block diagram showing an example of a configuration of a personal computer according to an embodiment of the present invention.

Referring to FIG. 28, a central processing unit (CPU) 411 executes various processes in accordance with a program stored in a ROM (Read Only Memory) 412 or a program loaded from a storage section 418 into a RAM (Random Access Memory) 413. Also data necessary for the CPU 411 to execute the processes are suitably stored into the RAM 413.

The CPU 411, ROM 412, and RAM 413 are connected to one another by a bus 414. Also an input/output interface 415 is connected to the bus 414.

An inputting section 416 including a keyboard, a mouse, and so forth, an outputting section 417 including a display unit which may be a CRT (Cathode Ray Tube) or an LCD (Liquid Crystal Display) unit, a speaker, and so forth, a storage section 418 formed from a hard disk or the like, and a communication section 419 including a modem, a terminal adapter, and so forth are connected to the input/output interface 415. The communication section 419 performs a communication process through a network such as the Internet.

Further, as occasion demands, a drive 420 is connected to the input/output interface 415. A magnetic disk 421, an optical disk 422, a magneto-optical disk 423, a semiconductor memory 424, or the like is suitably loaded into the drive 420, and a computer program read from the loaded medium is installed into the storage section 418 as occasion demands.

Where the series of processes is executed by software, a program which constructs the software is installed from a network or a recording medium into a computer incorporated in hardware for exclusive use or, for example, a personal computer for universal use which can execute various functions by installing various programs.

It is to be noted that the form of the program is not limited particularly only if the series of processes described above can be executed generally in accordance with the program. For example, the program may have a module configuration including modules corresponding to the processing blocks described hereinabove or including modules by which some or all of the functions of several ones of the blocks are combined or modules which have divisional portions of the functions of the blocks. The block may merely have a single algorithm.

The recording medium may be formed as a package medium such as, as shown in FIG. 28, a magnetic disk 421 (including a floppy disk), an optical disk 422 (including a CD-ROM (Compact Disc-Read Only Memory) and a DVD (Digital Versatile Disk)), a magneto-optical disk 423 (including an MD (Mini-Disc) (trademark)), or a semiconductor memory 424 which has the program recorded thereon or therein and is distributed in order to provide the program to a user separately from an apparatus body, or as a ROM 412 or a hard disk included in the storage section 418 which has the program recorded therein or thereon and is provided to a user in a form incorporated in an apparatus body.

It is to be noted here that, in the present specification, the processing steps which describe the program for causing a computer to execute various processes may be but need not necessarily be processed in a time series in the order as described as the flow charts, and include processes which are executed in parallel or individually (for example, parallel processes or processes by objects).

Further, the program may be processed by a simple computer or may otherwise be processed discretely by a plurality of computers. Furthermore, the program may be transferred to and executed by a remote computer.

Further, in the present specification, the term "system" is used to represent an entire apparatus composed of a plurality of apparatus.

While preferred embodiments of the present invention have been described using specific terms, such description is for illustrative purpose only, and it is to be understood that changes and variations may be made without departing from the spirit or scope of the following claims.

The invention claimed is:

1. An information processing apparatus which communicates through a network, comprising:
    updating decision means for deciding whether at least one of a plurality of connection priority degrees between a different information processing apparatus and opposite parties of communication which share a predetermined space and communicate with each other has been updated, the opposite parties of communication including said information processing apparatus, the plurality of connection priority degrees being calculated based on characteristic information including position information and direction information of the different information processing apparatus and the opposite parties of communication relative to each other, connection request degree information representative of a degree of a connection request to each of the opposite parties of communication, and directional information representative of degrees of a connection request for individual azimuths;
    notification information production means for producing notification information when it is decided by said updating decision means that at least one of the plurality of connection priority degrees between the different information processing apparatus and the opposite parties of communication has been updated, the notification information to be used for notification of the connection priority degree between the different information processing apparatus and said information processing apparatus from among the plurality of connection priority degrees;
    output control means for controlling the output of the notification information;
    receiver means for receiving data from the different information processing apparatus; and
    operation control means for controlling the execution of control corresponding to the received data based on the connection priority degree between the different information processing apparatus and said information processing apparatus.

2. The information processing apparatus according to claim 1, wherein said operation control means controls the execution of control corresponding to the data received by said receiver means at a rate according to the connection priority degree between the different information processing apparatus and said information processing apparatus.

3. The information processing apparatus according to claim 1, further comprising comparison decision means for deciding whether the connection priority degree between the different information processing apparatus and said information processing apparatus is highest among the plurality of connection priority degrees between the different information processing apparatus and the other parties of communication, wherein, when said comparison decision means decides that the connection priority degree between the different information processing apparatus and said information processing apparatus is not highest among the plurality of connection priority degrees between the different information processing apparatus and the other parties of communication, the production of the notification information by said notification information production means and the execution of control by said operation control means are inhibited.

4. The information processing apparatus according to claim 1, wherein said output control means controls an output of an indicator, and where a plurality of different information processing apparatus communicate with the opposite parties of communication, when said updating decision means decides that at least one of the plurality of connection priority degrees between the plural different information processing apparatus and the other parties of communication has been updated, said notification information production means produces the notification information so that the notification information is outputted divisionally in different colors or in different directions according to the connection priority degrees between the plural different information processing apparatus and said information processing apparatus from said indicator.

5. The information processing apparatus according to claim 1, further comprising sender means for transmitting the notification information by said notification information production means to the different information processing apparatus.

6. An information processing method for an information processing apparatus which communicates through a network, the method comprising:
    deciding whether at least one of a plurality of connection priority degrees between a different information processing apparatus and opposite parties of communication which share a predetermined space and communicate with each other has been updated, the opposite parties of communication including the information processing apparatus, the plurality of connection priority degrees being calculated based on characteristic information including position information and direction information of the different information processing apparatus and the opposite parties of communication relative to each other, connection request degree information representative of a degree of a connection request to each of the opposite parties of communication, and directional information representative of degrees of a connection request for individual azimuths;
    producing notification information when it is decided that at least one of the plurality of connection priority degrees between the different information processing apparatus and the opposite parties of communication has been updated, the notification information to be used for notification of the connection priority degree between the different information processing apparatus and the information processing apparatus from among the plurality of connection priority degrees;
    controlling the output of the notification information;
    receiving data from the different information processing apparatus; and
    controlling the execution of control corresponding to the received data based on the connection priority degree between the different information processing apparatus and the information processing apparatus.

7. A recording medium recorded with a program for causing an information processing apparatus to execute a process of communicating through a network, the process comprising:
    deciding whether at least one of a plurality of connection priority degrees between a different information processing apparatus and opposite parties of communication which share a predetermined space and communicate with each other has been updated, the opposite parties of communication including the information processing apparatus, the plurality of connection priority degrees being calculated based on characteristic information including position information and direction information of the different information processing apparatus and the opposite parties of communication relative to each other, connection request degree information representative of a degree of a connection request to each of the opposite parties of communication, and directional information representative of degrees of a connection request for individual azimuths;

producing notification information when it is decided that at least one of the plurality of connection priority degrees between the different information processing apparatus and the opposite parties of communication has been updated, the notification information to be used for notification of the connection priority degree between the different information processing apparatus and the information processing apparatus from among the plurality of connection priority degrees;

controlling the output of the notification information;

receiving data from the different information processing apparatus; and controlling the execution of control corresponding to the received data based on the connection priority degree between the different information processing apparatus and the information processing apparatus.

8. A system for communicating through a network, the system comprising:

an information processing apparatus operable to execute instructions; and instructions for executing a process of communicating through the network, the instructions including:

deciding whether at least one of a plurality of connection priority degrees between a different information processing apparatus and opposite parties of communication which share a predetermined space and communicate with each other has been updated, the opposite parties of communication including the information processing apparatus, the plurality of connection priority degrees being calculated based on characteristic information including position information and direction information of the different information processing apparatus and the opposite parties of communication relative to each other, connection request degree information representative of a degree of a connection request to each of the opposite parties of communication, and directional information representative of degrees of a connection request for individual azimuths;

producing notification information when it is decided that at least one of the plurality of connection priority degrees between the different information processing apparatus and the opposite parties of communication has been updated, the notification information to be used for notification of the connection priority degree between the different information processing apparatus and the information processing apparatus from among the plurality of connection priority degrees;

controlling the output of the notification information;

receiving data from the different information processing apparatus; and controlling the execution of control corresponding to the received data based on the connection priority degree between the different information processing apparatus and the information processing apparatus.

9. An information processing apparatus which communicates through a network, comprising:

an updating decision section operable to decide whether at least one of a plurality of connection priority degrees between a different information processing apparatus and opposite parties of communication which share a predetermined space and communicate with each other has been updated, the opposite parties of communication including said information processing apparatus, the plurality of connection priority degrees being calculated based on characteristic information including position information and direction information of the different information processing apparatus and the opposite parties of communication relative to each other, connection request degree information representative of a degree of a connection request to each of the opposite parties of communication, and directional information representative of degrees of a connection request for individual azimuths;

a notification information production section operable to produce notification information when it is decided by said updating decision section that at least one of the plurality of connection priority degrees between the different information processing apparatus and the opposite parties of communication has been updated, the notification information to be used for notification of the connection priority degree between the different information processing apparatus and said information processing apparatus from among the plurality of connection priority degrees;

an output controller operable to control the output of the notification information;

a receiver operable to receive data from the different information processing apparatus; and an operation controller operable to control execution of control corresponding to the received data based on the connection priority degree between the different information processing apparatus and said information processing apparatus.

* * * * *